United States Patent [19]
Kiuchi et al.

[11] Patent Number: 5,870,712
[45] Date of Patent: Feb. 9, 1999

[54] DATA PROCESSING METHOD AND ITS APPARATUS

[75] Inventors: Hiroyoshi Kiuchi, Hachioji; Masaaki Fukumura, Iruma; Nobuyuki Kutsuma, Kawagoe; Shouzo Ohdate, Kodaira; Kazumasa Morichika, Ome; Ryuji Nagano, Akishima, all of Japan

[73] Assignee: Casio Computer Co., Ltd., Tokyo, Japan

[21] Appl. No.: 801,634

[22] Filed: Feb. 18, 1997

[30] Foreign Application Priority Data

Feb. 22, 1996 [JP] Japan ................................... 8-058262

[51] Int. Cl.⁶ .................................................. G09B 19/08
[52] U.S. Cl. .................................. 705/8; 705/8; 707/102; 707/502
[58] Field of Search .......................... 705/8, 10; 707/102, 707/502, 505, 907

[56] References Cited

U.S. PATENT DOCUMENTS

| | | |
|---|---|---|
| 5,202,984 | 4/1993 | Kashio . |
| 5,526,518 | 6/1996 | Kashio . |
| 5,623,658 | 4/1997 | Kiuchi et al. . |
| 5,642,521 | 6/1997 | Kiuchi et al. . |
| 5,712,985 | 1/1998 | Lee et al. ................................... 705/7 |
| 5,765,167 | 6/1998 | Kiuchi et al. . |

*Primary Examiner*—Thomas Peeso
*Attorney, Agent, or Firm*—Frishauf, Holtz, Goodman, Langer & Chick

[57] ABSTRACT

An ordinary person in charge is enabled to easily construct or modify a business processing system only by making a business flow diagram indicating the flow of the business to be adaptable to the contents of the business of the department to which the person in charge belongs if the person in charge understands the business system and slips and vouchers which are daily used without a necessity of requesting a system engineer having exclusive knowledge about programming to design the business processing system. Thus, a required business process can be performed. When the business flow diagram indicating the flow of each business in the own department has been made, a business constructing system analyzes the business flow diagram to make a slip registration card, an original register registration card and a voucher registration card. As a result, a business operating system performs a slip input process in accordance with the slip registration card, a file updating process in accordance with the original register registration card and a voucher output process in accordance with the voucher registration card.

25 Claims, 47 Drawing Sheets

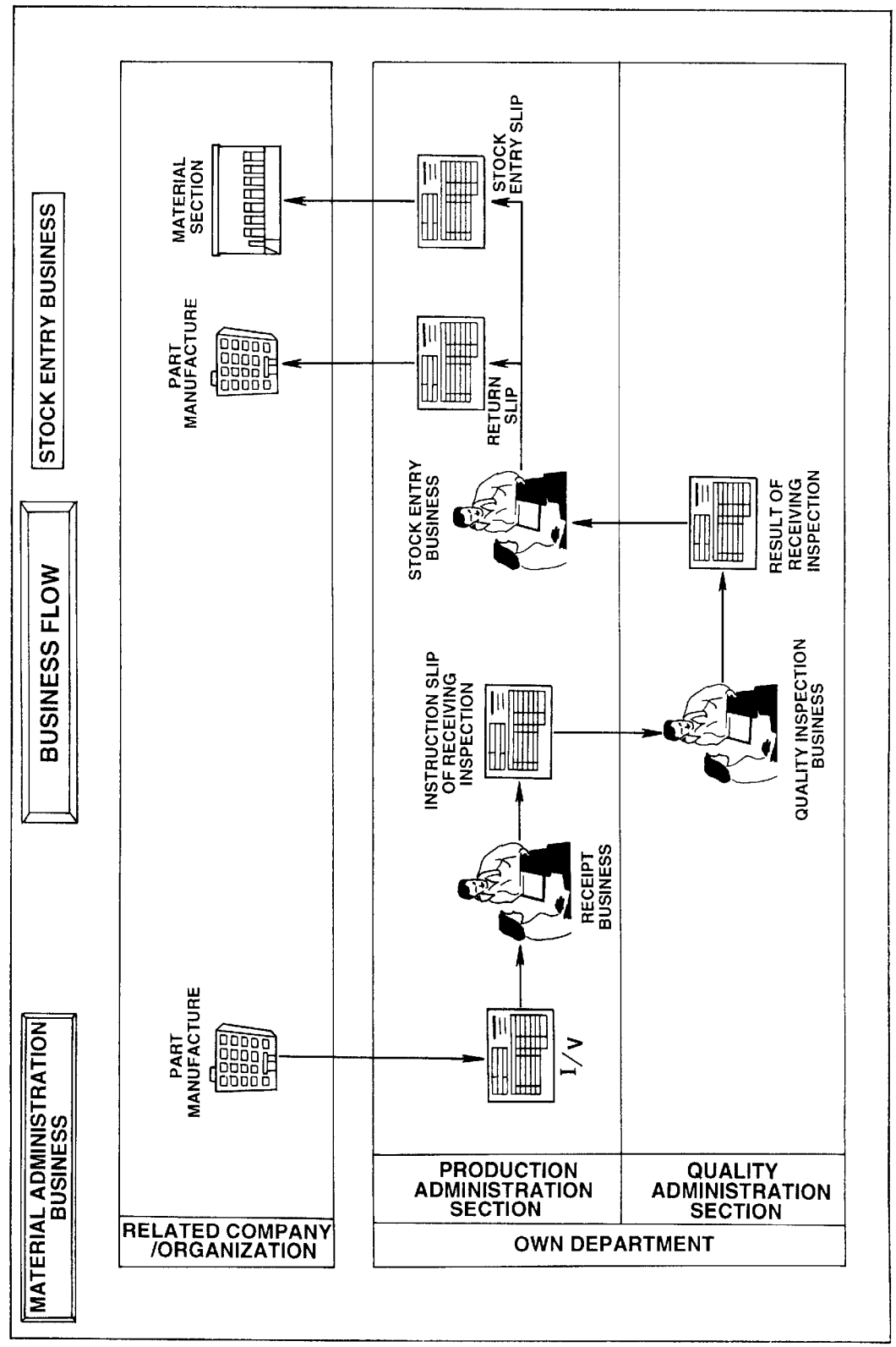

FIG.11B

SET SLIP ITEM

NAME OF SLIP : I/V

ITEMS OF SLIP

```
ORDER NO.
SLIP NO.
DATE OF ISSUE
CODE OF ORGANIZATION
NAME OF ORGANIZATION
CODE OF CUSTOMER
NAME OF CUSTOMER
CODE OF PERSON IN CHARGE
NAME OF PERSON IN CHARGE
LINE NO.
CODE OF PRODUCT
```

NAME OF ORIGINAL
  REGISTER TO BE UPDATED

LEDGER OF ORDER .
  LEDGER OF STOCK ENTRY OF PARTS

OK      CANCEL

FIG.23A

| FIG.23B | FIG.23C | FIG.23D | FIG.23E |

FIG.23B

BASIC DEFINITION TABLE A

| OWN DEPARTMENT | TV BUSINESS ADMINISTRATION DEPARTMENT |
|---|---|
| SUBJECT BUSINESS | MATERIAL ADMINISTRATION DEPARTMENT |

| st | nx | NAME OF DEPARTMENT IN CHARGE | NAME OF BUSINESS | NAME OF DETAILS OF BUSINESS (FLOW OF BUSINESS) |
|---|---|---|---|---|
| st | 01 | PRODUCTION ADMINISTRATION SECTION | RECEIPT BUSINESS | INPUT OF RECEIPT |
| | | | | |
| 01 | 02 | PRODUCTION ADMINISTRATION SECTION | RECEIPT BUSINESS | PRINTING OF INSTRUCTION OF RECEIVING INSPECTION |
| 02 | ed | PRODUCTION ADMINISTRATION SECTION | RECEIPT BUSINESS | PRINTING OF STOCK ENTRY SCHEDULE TABLE |
| st | 01 | QUALITY CONTROL SECTION | QUALITY INSPECTION BUSINESS | QUALITY INSPECTION |
| 01 | 02 | QUALITY CONTROL SECTION | QUALITY INSPECTION BUSINESS | INPUT OF RESULTS OF QUALITY INSPECTION |
| 02 | ed | QUALITY CONTROL SECTION | QUALITY INSPECTION BUSINESS | PRINTING OF RESULTS OF RECEIVING INSPECTION |
| st | 01 | PRODUCTION ADMINISTRATION SECTION | STOCK ENTRY BUSINESS | REPORT TO MANAGER |
| 01 | 02 | PRODUCTION ADMINISTRATION SECTION | STOCK ENTRY BUSINESS | INPUT OF RETURN SLIP |
| | | | | |
| 02 | ed | PRODUCTION ADMINISTRATION SECTION | STOCK ENTRY BUSINESS | PRINTING OF RETURN SLIP |
| 01 | 02 | PRODUCTION ADMINISTRATION SECTION | STOCK ENTRY BUSINESS | INPUT OF STOCK ENTRY SLIP |
| | | | | |
| 02 | 03 | PRODUCTION ADMINISTRATION SECTION | STOCK ENTRY BUSINESS | PRINTING OF STOCK ENTRY SLIP |
| 03 | 04 | PRODUCTION ADMINISTRATION SECTION | STOCK ENTRY BUSINESS | UPDATE OF DETAILS OF PARTS |
| 04 | ed | PRODUCTION ADMINISTRATION SECTION | STOCK ENTRY BUSINESS | PRINTING OF STOCK ENTRY RESULT TABLE |
| st | 01 | PRODUCTION ADMINISTRATION SECTION | PERIODICAL DELIVERY BUSINESS | INSTRUCTION OF DELIVERY |
| 01 | ed | PRODUCTION ADMINISTRATION SECTION | PERIODICAL DELIVERY BUSINESS | PRINTING OF DELIVERY SLIP |
| st | 01 | PRODUCTION ADMINISTRATION SECTION | DELIVERY REGISTRATION BUSINESS | REGISTRATION OF RESULTS OF DELIVERY |
| | | | | |
| 01 | ed | PRODUCTION ADMINISTRATION SECTION | DELIVERY REGISTRATION BUSINESS | PRINTING OF DELIVERY SLIP |
| | | | | |

FIG.23C

| INPUT | | | PROCESS |
|---|---|---|---|
| INPUT DESTINATION | NAME | CLASSIFI-CATION | CYCLE |
| PART MANUFACTURER | I/V | SLIP | ANY TIME |
| | | | |
| | LEDGER OF PART STOCK ENTRY | ORIGINAL REGISTER | CONTENTS |
| | LEDGER OF ORDER | ORIGINAL REGISTER | CONTENTS |
| PRODUCTION ADMINISTRATION SECTION | INSTRUCTION OF RECEIVING INSPECTION | SLIP | ANY TIME |
| | INSTRUCTION OF RECEIVING INSPECTION (RESULTS) | SLIP | ANY TIME |
| | LEDGER OF PART STOCK ENTRY | ORIGINAL REGISTER | ANY TIME |
| QUALITY ADMINISTRATION SECTION | RESULTS OF RECEIVING INSPECTION | SLIP | ANY TIME |
| | RESULTS OF RECEIVING INSPECTION (RETURN) | SLIP | ANY TIME |
| | | | |
| | LEDGER OF PART STOCK ENTRY | ORIGINAL REGISTER | CONTENTS |
| | RESULTS OF RECEIVING INSPECTION (STOCK ENTRY) | SLIP | ANY TIME |
| | | | |
| | LEDGER OF PART STOCK ENTRY | ORIGINAL REGISTER | CONTENTS |
| | LEDGER OF PART STOCK ENTRY | ORIGINAL REGISTER | CONTENTS |
| | DETAILS OF PARTS | ORIGINAL REGISTER | CONTENTS |
| | DELIVERY SCHEDULE | SLIP | CONTENTS |
| | LEDGER OF DELIVERY | ORIGINAL REGISTER | CONTENTS |
| MATERIAL SECTION | DELIVERY RESULT CARD | SLIP | ANY TIME |
| | | | |
| | DELIVERY LEDGER | ORIGINAL REGISTER | ANY TIME |
| | | | |

FIG.23D

| OUTPUT | |
|---|---|
| OUTPUT DESTINATION | NAME OF ORIGINAL REGISTER TO BE UPDATED |
| | LEDGER OF ORDER |
| | LEDGER OF PART STOCK ENTRY |
| QUALITY ADMINISTRATION SECTION | |
| | |
| | |
| | LEDGER OF PART STOCK ENTRY |
| PRODUCTION ADMINISTRATION SECTION | |
| | |
| | LEDGER OF ORDER |
| | LEDGER OF PART STOCK ENTRY |
| PART MANUFACTURER | LEDGER OF PART STOCK ENTRY |
| | LEDGER OF ORDER |
| | LEDGER OF PART STOCK ENTRY |
| MATERIAL SECTION | LEDGER OF PART STOCK ENTRY |
| | DETAILS OF PARTS |
| | |
| | LEDGER OF DELIVERY |
| MATERIAL SECTION | |
| | LEDGER OF DELIVERY |
| | DETAILS OF PARTS |
| FIRST MANUFACTURING SECTION | |
| | |

FIG.23E

| OUTPUT | | OUT OF SUBJECT |
|---|---|---|
| NAME OF VOUCHER | DISPLAY /PRINT | |
| | | |
| | | |
| INSTRUCTION OF RECEIVING INSPECTION | PRINTING | |
| STOCK ENTRY SCHEDULE TABLE | PRINTING | |
| INSTRUCTION OF RECEIVING INSPECTION (RESULTS) | | ○ |
| RESULTS OF RECEIVING INSPECTION | | |
| | PRINTING | |
| | | ○ |
| | | |
| | | |
| RETURN SLIP | PRINTING | |
| | | |
| | | |
| STOCK ENTRY SLIP | PRINTING | |
| | | |
| STOCK ENTRY RESULT TABLE | PRINTING | |
| | | |
| INSTRUCTION OF DELIVERY | PRINTING | |
| | | |
| | | |
| DELIVERY SLIP | PRINTING | |
| | | |

FIG.27A

| FIG.27B | FIG.27C |
|---|---|

FIG.27B
(SLIP REGISTRATION CARD) I/V

NAME OF SLIP: I/V

| SERIAL NUMBERS | NAME OF ITEMS | HIERARCHY | TYPE | NUMBER OF CHARACTERS | NAME OF TABLE |
|---|---|---|---|---|---|
| 01 | ORDER No. | | | 6 | |
| 02 | SLIP No. | | | 4 | |
| 03 | DATE OF ISSUE | | | 8 | |
| 04 | CODE OF ORGANIZATION | | | 8 | OFFICE tb |
| 05 | NAME OF ORGANIZATION | | | 30 | |
| 06 | CODE OF CUSTOMER | | | 8 | CUSTOMER tb |
| 07 | NAME OF CUSTOMER | | | 30 | |
| 08 | CODE OF PERSON IN CHARGE | | | 5 | STUFF tb |
| 09 | NAME OF PERSON IN CHARGE | | | 20 | |
| 10 | LINE No. | I | | 2 | |
| 11 | CODE OF PRODUCT | I | | 8 | PRODUCT tb |
| 12 | NAME OF PRODUCT | I | | 30 | |
| 13 | ACCOUNT | I | | 2 | |
| 14 | DEPARTMENT | I | | 3 | |
| 15 | QUANTITY | I | N | 6 | |
| 16 | UNIT PRICE | I | N | 8 | |
| 17 | SUM | I | N | 8 | |
| 18 | SUMMARY | I | | 10 | |
| 19 | TOTAL QUANTITY | T | N | 6 | |
| 20 | TOTAL PRICE | T | N | 8 | |

FIG. 27C
(SLIP REGISTRATION CARD) I/V

| UPDATE ITEM | | INITIAL SETTING |
|---|---|---|
| LEDGER OF ORDER, LEDGER OF PART STOCK ENTRY | | |
| DEFINITION | | |
| # SERIAL NUMBER | | # DATE (@DATE) |
| # SERIAL NUMBER TABLE (CODE OF ORGANIZATION, NAME) | | |
| # SERIAL NUMBER TABLE (CODE OF COSTOMER, NAME) | | |
| # SERIAL NUMBER TABLE (CODE OF PERSON IN CHARGE, NAME) | | |
| # SERIAL NUMBER TABLE (CODE OF PRODUCT, NAME) | | |
| ₹ | 1 | |
| ₹ | 1 | |
| NUMBER × UNIT PRICE | | |
| # ACCUMULATING TOTALS (QUANTITY) | | |
| # ACCUMULATING TOTALS (PRICE) | | |

FIG.28A

| FIG.28B | FIG.28C |
|---|---|

FIG. 28B (ORIGINAL REGISTER REGISTRATION CARD) LEDGER OF PART

| NAME OF ORIGINAL REGISTER | | | | |
|---|---|---|---|---|
| LEDGER OF PART STOCK ENTRY | | | | |
| SERIAL NUMBERS | NAME OF ITEMS | HIERARCHY | NUMBER OF DIGITS | NAME OF TABLE |
| 01 | ORDER No. | R | 6 | |
| 02 | CODE OF PRODUCT | R | 8 | PRODUCT tb |
| 03 | IDENTIFICATION OF SLIP | | 2 | |
| 04 | SLIP No. | | 4 | |
| 05 | DATE OF ISSUE | | 8 | |
| 06 | CODE OF ORGANIZATION | | 8 | OFFICE tb |
| 07 | CODE OF CUSTOMER | | 8 | CUSTOMER tb |
| 08 | CODE OF PERSON IN CHARGE | | 5 | STUFF tb |
| 09 | ACCOUNT | | 2 | |
| 10 | DEPARTMENT | | 3 | |
| 11 | QUANTITY | N | 6 | |
| 12 | PRICE | N | 8 | |
| 13 | SUMMARY | | 10 | |
| 14 | DATE OF REGISTRATION | | 8 | |
| 15 | CLASSIFICATION OF SITUATION | | 1 | |

| NAME OF INPUT ORIGINAL REGISTER | |
|---|---|
| NAME OF BUSINESS | |
| NAME OF FUNCTION | |
| TYPE OF UPDATE | DEFINITION |
| | |
| | |
| | |
| | |
| | |
| | |
| | |
| | |
| | |
| | |
| | |
| | |
| | |
| | |
| | |

FIG. 28C
(ORIGINAL REGISTER REGISTRATION CARD) LEDGER OF PART

| IV | INSTRUCTION OF RECEIVING INSPECTION (RESULTS) | RESULTS OF RECEIVING INSPECTION (RETURN) |
|---|---|---|
| INPUT OF RECEIPT | INPUT OF RESULTS OF QUALITY INSPECTION | INPUT OF RETURN SLIP |
| SLIP | SLIP | SLIP |
| ADDITION | CORRECTION | CORRECTION |
| ITEMS IN SLIP | ITEMS IN SLIP | ITEMS IN SLIP |
| ORDER No. | ORDER No. | ORDER No. |
| CODE OF PRODUCT | CODE OF PRODUCT | CODE OF PRODUCT |
| "20" | | |
| # CONNECTION (SLIP No., LINE No.) | | |
| DATE OF ISSUE | | |
| CODE OF ORGANIZATION | | |
| CODE OF CUSTOMER | | |
| CODE OF PERSON IN CHARGE | | |
| ACCOUNT | | |
| DEPARTMENT | | |
| QUANTITY | | |
| PRICE | | |
| SUMMARY | | |
| "0" | "1" | "2" |

FIG.29

| | | ADMINISTRATION UNIT ↓ | | | | |
|---|---|---|---|---|---|---|
| TABLE A | | | | | | |

| | CUMULATIVE LEVEL | | | | | | | DETAILS OF PARTS | | | | ← NAME OF FILE |
|---|---|---|---|---|---|---|---|---|---|---|---|---|
| | | | | | | | | CODE OF CUSTOMER | | | | ← NAME OF ITEM |
| | A | B | C | D | E | F | | | | | | |
| 01 | TOTAL | | | | | | | | | | | |
| 02 | | PART X | | | | | | | | | | |
| 03 | | | a | | | | | ○ | 101 | 102 | | |
| 04 | | | b | | | | | ○ | 412 | | | |
| 05 | | PART Y | | | | | | | | | | |
| 06 | | | c | | | | | ○ | 410 | | | |
| 07 | | | d | | | | | ○ | 551 | 552 | | |
| 08 | | | e | | | | | ○ | 611 | | | |

FIG. 30

TABLE B

| | A | B | C | D | E |
|---|---|---|---|---|---|
| EXPENSES | | PLANNED AT START OF PERIOD | MODIFIED PLAN | TOTAL RESULTS | DIFFERENCE FROM PLAN |
| FORMAT | | #,###,##0 | #,###,### | #,###,##0 | #,##0 |
| SUBJECT FILE | | DETAILS OF PARTS | DETAILS OF PARTS | | |
| COMULATIVE ITEMS | | ESTIMATED COST + | ESTIMATED COST + | | |
| | | | | D+E | |
| EQUATION | | B/1000 | C/1000 | F1/1000 | C-F1 |
| | | | | | G2/1000 |
| CONDITIONS | | TYPE OF PLAN | TYPE OF PLAN | | |
| CONDITION VALUE | | 1 | 2 | | |
| | | | 3 | | |
| | | | 4 | | |

FIG.31

RESULTS OF STOCK ENTRY

| ENTRY OF PARTS | | PLAN ST START OF PERIOD | MODIFIED PLAN | TOTAL RESULTS | DIFFERENCE FROM PLAN |
|---|---|---|---|---|---|
| TOTAL | | 2,000,000 | 1,800,000 | | |
| PART X | a | 1,200,000 | 1,100,000 | | |
| | b | 1,000,000 | 900,000 | | |
| | | 200,000 | 200,000 | | |
| PART Y | c | 800,000 | 700,000 | | |
| | d | 400,000 | 300,000 | | |
| | e | 300,000 | 250,000 | | |
| | | 100,000 | 150,000 | | |

DATA PROCESSING METHOD AND ITS APPARATUS

BACKGROUND OF THE INVENTION

The present invention relates to a data processing method and a data processing apparatus for processing data in a business processing field for performing a variety of works on the basis of slips.

This application is based on Japanese Patent Application No. 08-058262, filed Feb. 22, 1996, the content of which is incorporated herein by reference.

When a variety of works in an office work are systematized, exclusive knowledge about computers are required. Therefore, the systematizing operation must be performed by a system engineer having the exclusive knowledge. The system engineer analyzes the contents of each work to design the outline and program. On the other hand, a person in charge of the business has no knowledge of programming and the like. Thus, the outline of the system of the business and the contents of the process of the same have been in the form of a black box.

Hitherto, a system engineer fully takes charge of constructing the business processing system as described above. Therefore, the contents of the design depends upon the system engineer, thus resulting in that the system maintenance becomes too complicated and raising the cost. What is worse, since the design of the system has been individually and independently performed for each business, the satisfactory connection among businesses cannot be established. Thus, there arises problems of unsatisfactory system productivity and quality control. Moreover, the procedure and the contents of the business are sometimes required to be changed as time elapses. Thus, the business processing system cannot sometimes be adaptable to the actual state and, therefore, a required process cannot be performed adequately to the actual state of the business flow.

When the business flow must be changed, a portion of the business processing system has been changed. However, if the outline and the program are designed whenever required, a complicated task must be performed. As a result, the outline of the business processing system and the contents of the same cannot be recognized. Thus, the program itself must be decoded.

BRIEF SUMMARY OF THE INVENTION

An object of the present invention is to enable an ordinary person in charge to easily construct or modify a business processing system only by making a flow diagram indicating the flow of the business to be adaptable to the contents of the business of the department to which the person in charge belongs if the person in charge understands the business system and slips and vouchers which are daily used without a necessity of requesting a system engineer having exclusive knowledge about programming to design the business processing system. Thus, a required business process can be performed.

When a person in charge draws a flow diagram indicating the flow of the business in accordance with slips which are daily used, a business processing system can be constructed in accordance with the flow diagram. If the contents of the business must be changed, only a partial change of the flow diagram enables the business processing system to be modified. Therefore, the person in charge is able to fully construct and improve the business processing system. As a result, a fine and precise system adaptable to the actual business system can be designed. Thus, a significant advantage in performing the system maintenance and reducing the cost can be obtained. Moreover, the respective business operations can organically be connected to one another in accordance with the flow diagram. When the flow diagram is output as a document, the overall business process which has been systematized into a latest form can easily be recognized. Thus, significantly advantageous data processing method and an apparatus therefor can be provided.

According to the present invention, there is provided a data processing method comprising the following steps of:

drawing a business flow diagram for a predetermined department by disposing slips/files in accordance with a flow of businesses in the predetermined department, the slips/files being selected in accordance with the predetermined department;

analyzing the flow diagram to make slips/files which are input in each business and slips/files which are output in each business to correspond to one another in each business so as to make a basic definition table including the contents to be processed with each of the slips/files; and performing a data processing operation in response to an instruction to perform the business based on the contents of the slips/files which are set in the basic definition table corresponding to the business.

The present invention enables an ordinary person in charge to easily construct or modify a business processing system only by making a flow diagram indicating the flow of the business to be adaptable to the contents of the business of the department to which the person in charge belongs if the person in charge understands the business system and slips and vouchers which are daily used without a necessity of requesting a system engineer having exclusive knowledge about programming to design the business processing system. Thus, a required business process can be performed.

That is, when a person in charge draws a flow diagram indicating the flow of the business in accordance with slips which are daily used, a business processing system can be constructed in accordance with the flow diagram. If the contents of the business must be changed, only a partial change of the flow diagram enables the business processing system to be modified. Therefore, the person in charge is able to fully construct and improve the business processing system. As a result, a fine and precise system adaptable to the actual business system can be designed. Thus, a significant advantage in performing the system maintenance and reducing the cost can be obtained. Moreover, the respective business operations can organically be connected to one another in accordance with the flow diagram. When the flow diagram is output as a document, the overall business process which has been systematized into a latest form can easily be recognized. Thus, significantly practical advantage can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B show the contents of an administration table Tb, in which FIG. 4A shows an organization table and FIG. 4B shows a business table;

FIG. 11A is a diagram showing an example of the business flow map;

FIG. 11B is a diagram showing a details of the I/V slip shown in FIG. 11A;

Figures 23A, 23B:
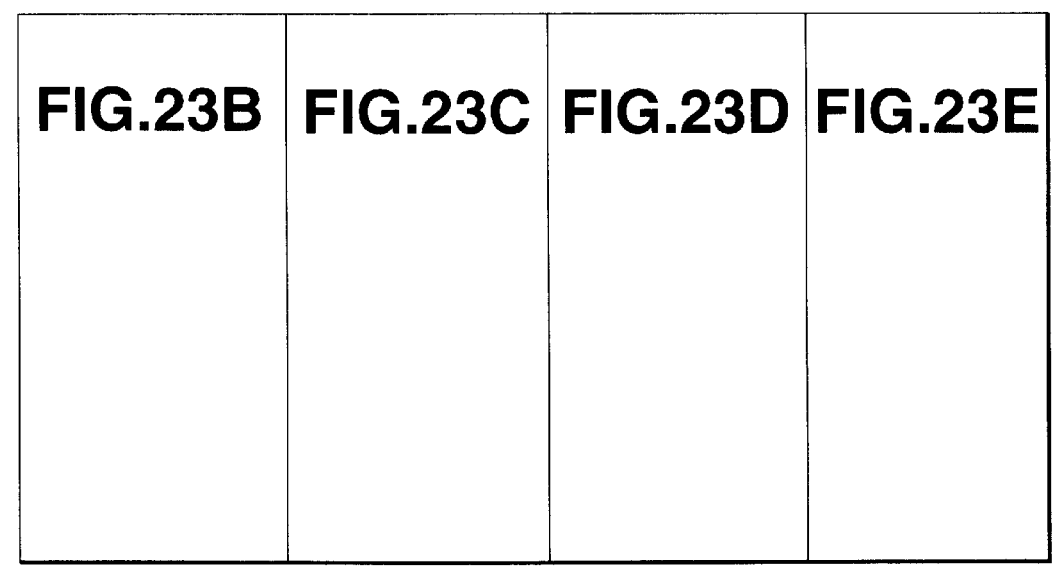

FIGS. 23A to 23E show the contents of basic definition table A obtained by analyzing the flow diagrams shown in FIGS. 9 to 17;

FIGS. 27A to 27C show a slip registration card in an I/V voucher;

FIGS. 28A to 28C show the original register registration card in a voucher of part stock entry;

FIG. 29 is a diagram showing Table A forming the voucher registration card;

FIG. 30 is a diagram showing Table B forming the voucher registration card;

FIG. 31 is a diagram showing a voucher printed out in accordance with the defined contents of the Tables A and B shown in FIGS. 29 and 30;

DETAILED DESCRIPTION OF THE INVENTION

Referring to FIGS. 1 to 37, an embodiment of the present invention will now be described. General

System Configuration

Figure 1:
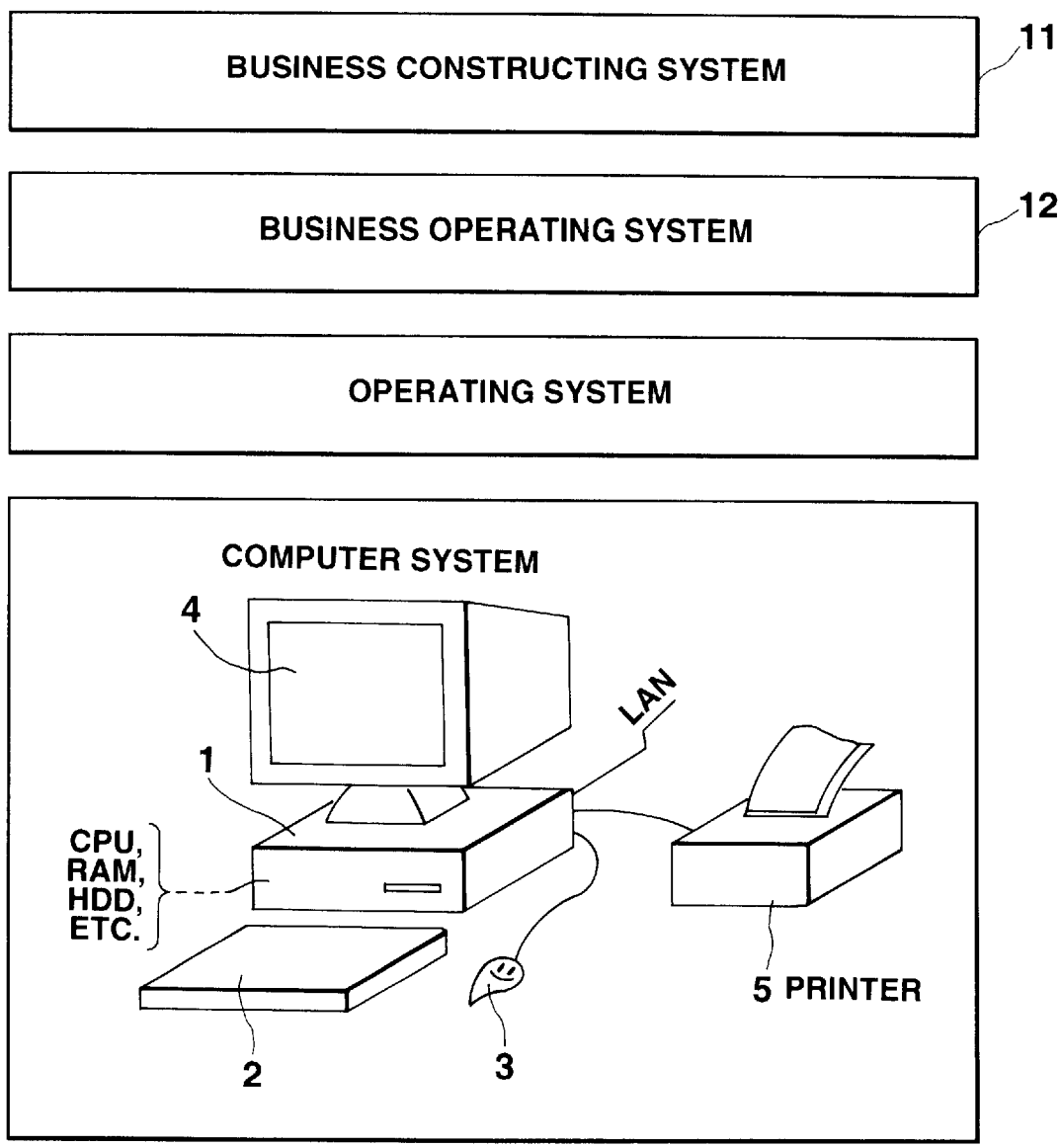
FIG. 1 is a diagram schematically showing the overall configuration of a data processing system according to the present invention.

FIG. 1 is a diagram showing the overall configuration of a system according to the present invention.

A data processing apparatus 1 is an office computer or a personal computer forming a local area network (LAN) in an office. The data processing apparatus 1 is disposed in a predetermined department (for example, a TV Business Division/Administration Division) in the company and, through exclusive line in the office connected to data processing apparatuses disposed in other departments. The data processing apparatus 1 is able to perform a variety of processes, for example, a process for generating a slip record by processing input slip data, a process for updating records of predetermined files in accordance with the record of the slips and accumulating records of the predetermined files to printing out results of accumulating as voucher data. In a case where terminal apparatuses serving as client machines are connected to one another through the exclusive lines in the office, records of slips transmitted from each terminal apparatus may be received and a process for updating files may be performed in accordance with the records of the records of the slips.

A keyboard 2, a pointing device (a mouse) 3, a display unit 4 and a printer 5 serving as input/output peripheral units are connected to the data processing apparatus 1. The data processing apparatus 1 includes a CPU (Central Processing Unit) for controlling the overall operation of the data processing apparatus 1, a RAM (Random Access Memory), a HDD (Hard Disc Device), a storage medium for storing programs and the like, the units being included as basic elements (not shown).

The storage medium stores programs, data and the like, and comprises a magnetic or optical storage medium or a semiconductor memory. The storage medium may be fixedly provided for a storage unit or detachably mounted on the same. The program, data and the like, which are stored in the storage medium, may be received and stored from another unit connected through a communication line or the like. Another configuration may be employed in which storage unit having the storage medium is provided for the other unit connected through the communication line so as to use the programs and data stored in the storage medium are used through the communication line.

Figure 2:
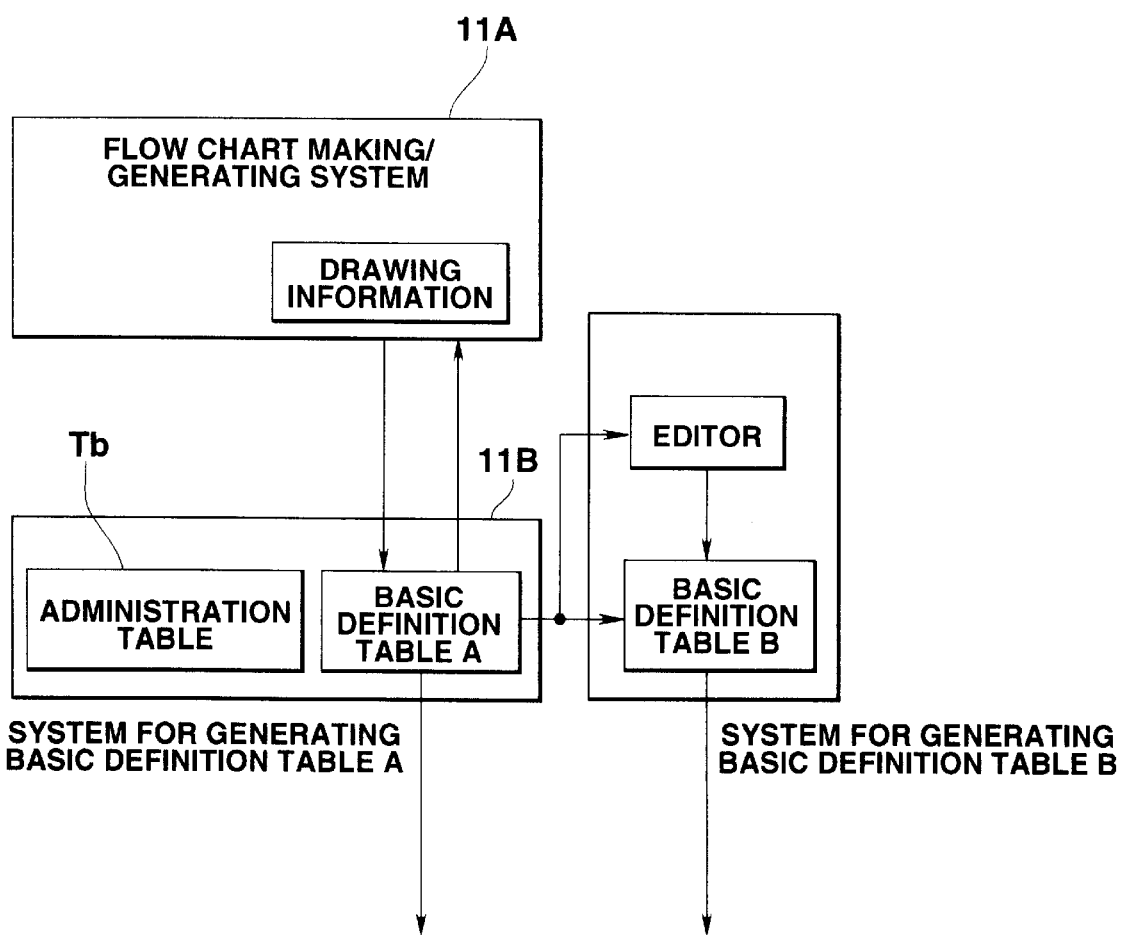
FIG. 2 is a diagram showing the basic configuration and operation concept of a business constructing system 11.
Figure 3:
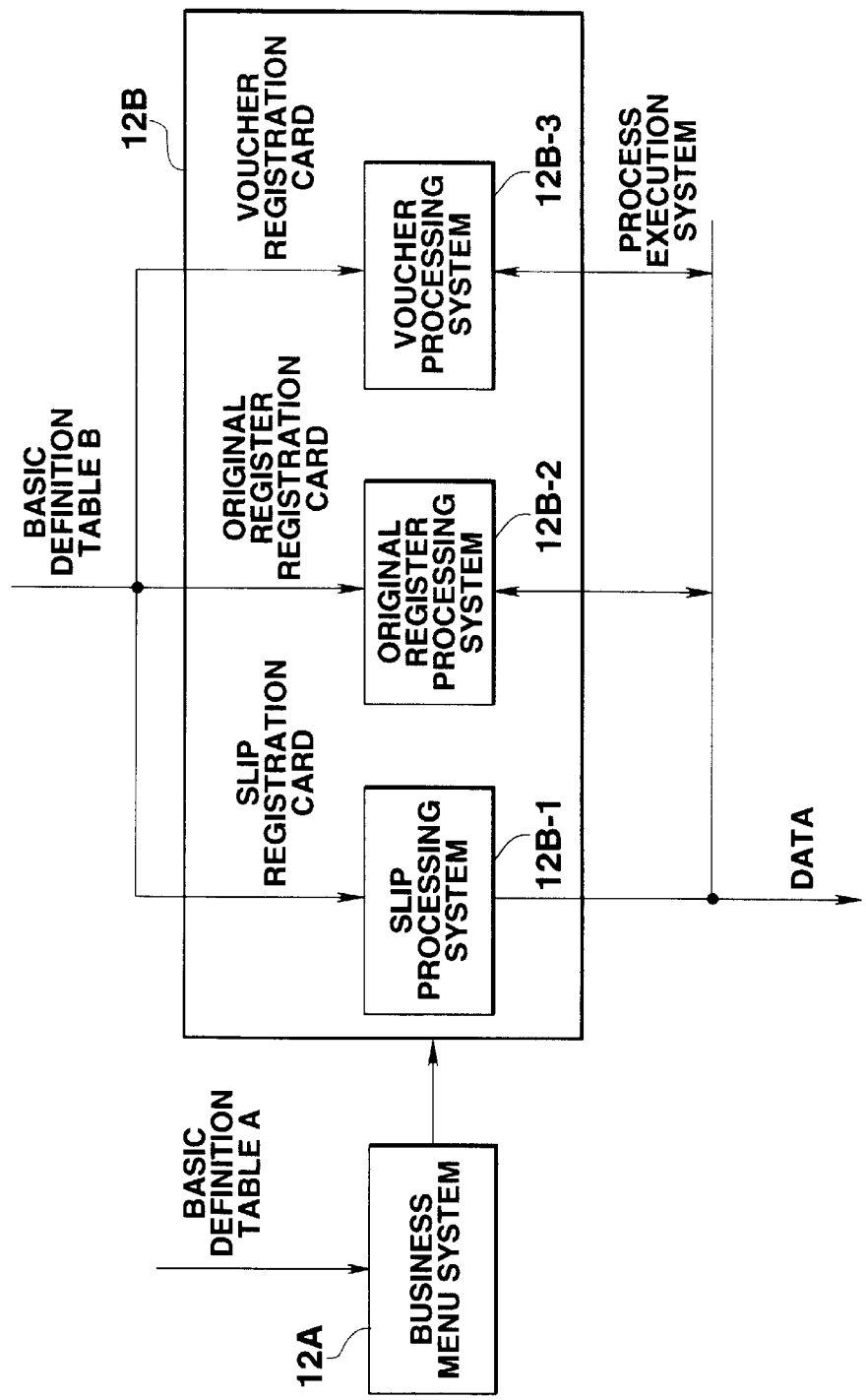
FIG. 3 is a diagram showing the basic configuration and operation concept of a business operating system 12.

In addition to basic software, such as an operating system and various application software, which are usually stored in the data processing apparatus 1, a business constructing system 11 and a business operating system 12 which are peculiar to the present invention are stored. FIG. 2 shows the basic configuration and the concept of the operation of the business constructing system 11. FIG. 3 shows those of the business operating system 12.

Referring to FIG. 2, the functions of the business constructing system 11 consists of a flow diagram making/creating system 11A, a system 11B for generating basic definition table A and a system 11C for generating basic definition table B, the systems being related to one another. A person in charge makes a flow diagram indicating the procedure of businesses of the department of the person in order to construct a business processing system of the department (a department of the company to which the person belongs). At this time, the CPU starts the flow diagram making/creating system 11A to perform a process for making the flow diagram. The flow diagram consists of, for example, a business role map, a business physical distribution map, a business flow map and a business process map as shown in FIGS. 9 to 12.

Figure 9:
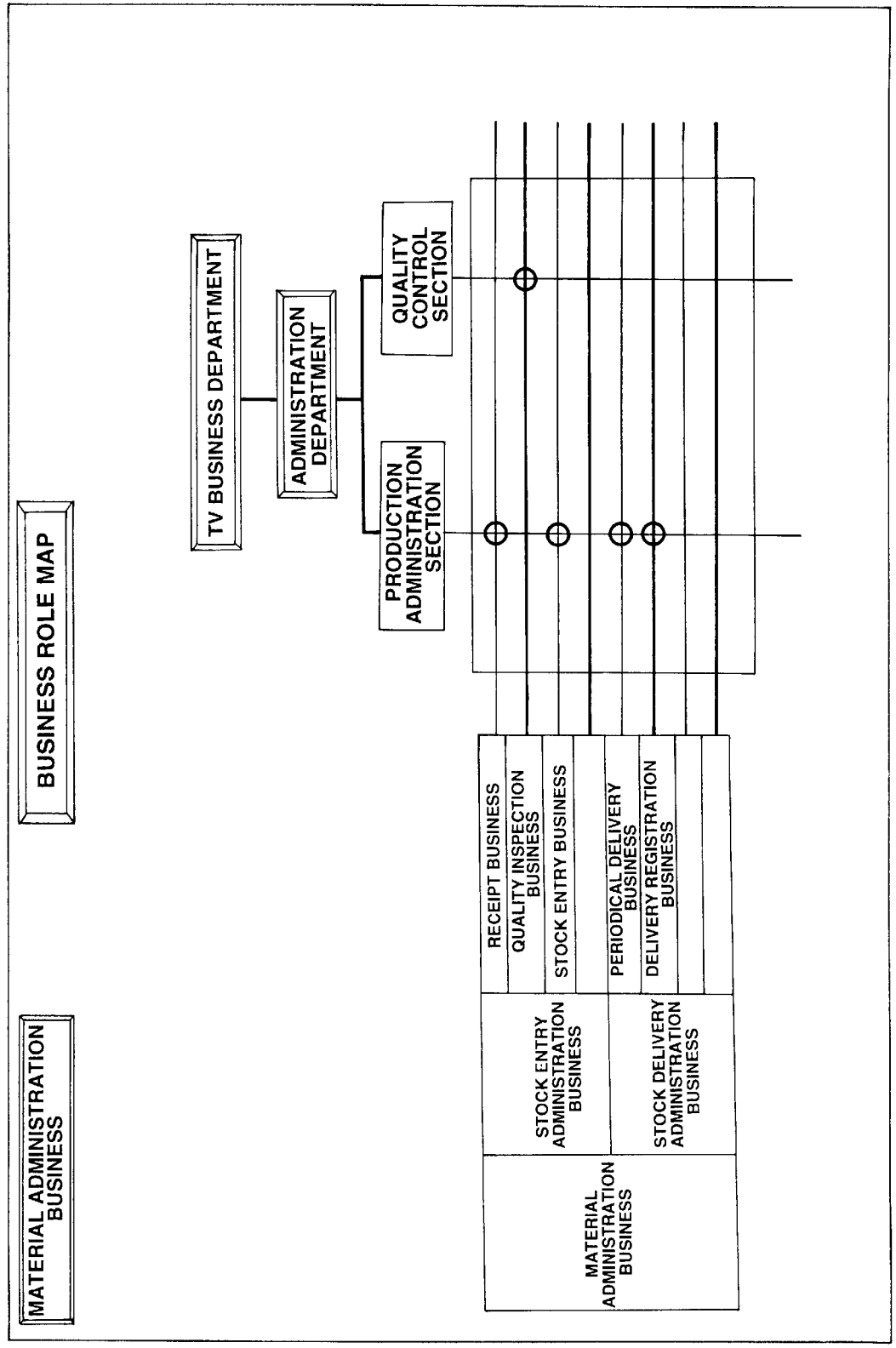
FIG. 9 is a diagram showing an example of the business role map.

The schematic configuration of each of the flow diagrams will now be described. The business role map is, for example, as shown in FIG. 9, formed such that the own department name "TV Business Division/Administration Division", names of sections belonging to the own department, that is, "Production Administration Section" and "Quality Control Section" are located in accordance with the hierarchy configuration. Moreover, the business names classified into hierarchy sections including, for example, major classes, intermediate classes and minor classes in accordance with slips handled in each of the departments/sections are disposed. In addition, corresponding information (circles provided at intersections on a matrix) indicating the correspondences between the departments/sections names and businesses is disposed. Thus, the business role map indicates the businesses and departments/sections in charge. That is, the business role map indicates the roles of the businesses and the departments/sections in charge. Hereinafter, the business names hierarchically classified as shown in FIG. 9 are sometimes called such that name of the uppermost (the major classification) business is called as "Subject Business Name" and name of the lowermost (the minor classification) business is simply called as "Business Name". Therefore, the "Material Administration Business" is sometimes called as the subject business name and the "Reception Business" and the "Quality Inspection Business" are sometimes simply called as the business names.

When the circles are provided for the intersections of the matrix, numerals, alphabets or the like indicating the procedure (the sequential order) of the business may be input into the area in the circle in order to easily confirm the flow of the business.

Figure 10:
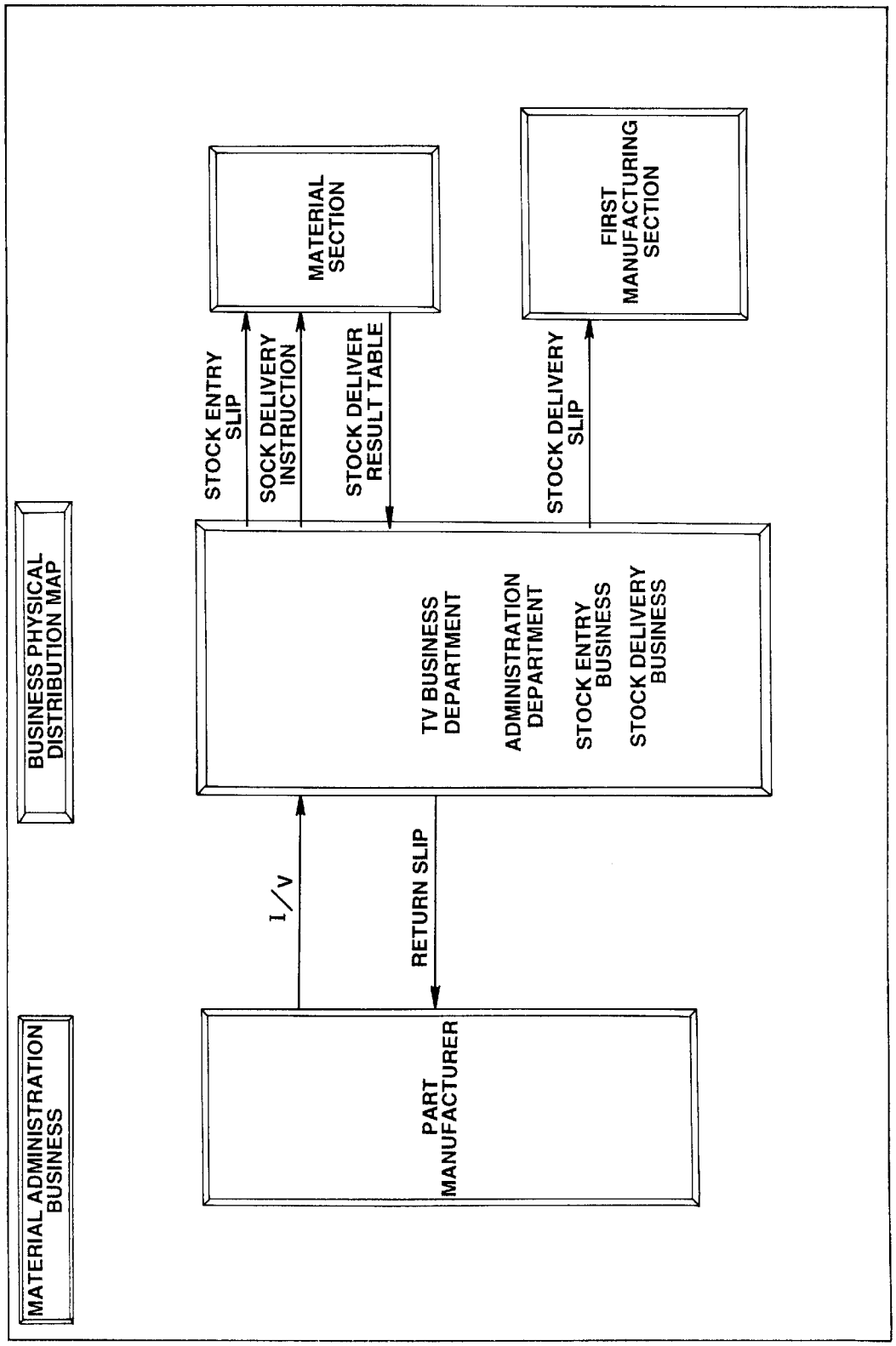
FIG. 10 is a diagram showing an example of the business physical distribution map.

The business physical distribution map is, as shown in FIG. 10, configured such that the own department name is disposed in the center thereof. Moreover, names "Part Manufacturer", "Material Section" and "First Manufacturing Section" which are relative departments (other departments and other companies) which supplies/receives slips to and from the own department are disposed. In addition, the own department and the relative departments are connected with lines in accordance with the flow of the slips. Moreover, the slip names are included in the map. Thus, the business physical distribution map indicates the transmission/receipt of slips between the own department and the relative departments.

The business flow map is, as shown in FIG. 11A, a map of the businesses handled by each division/section belonging to the own department and the flow of slips. In the business flow map, the business name for each department and the slip is disposed such that the business names and the slip names are connected to one another in accordance with the flow of the business. Thus, the business system of the own department is indicated in such a manner that the businesses and the flows of the slips are mainly indicated. Moreover, correspondences to the relative departments which transmit and receive slip to and from the own department are indicated. Note that the item name in the slip can be set for each slip when the business flow map is made.

Figure 12:
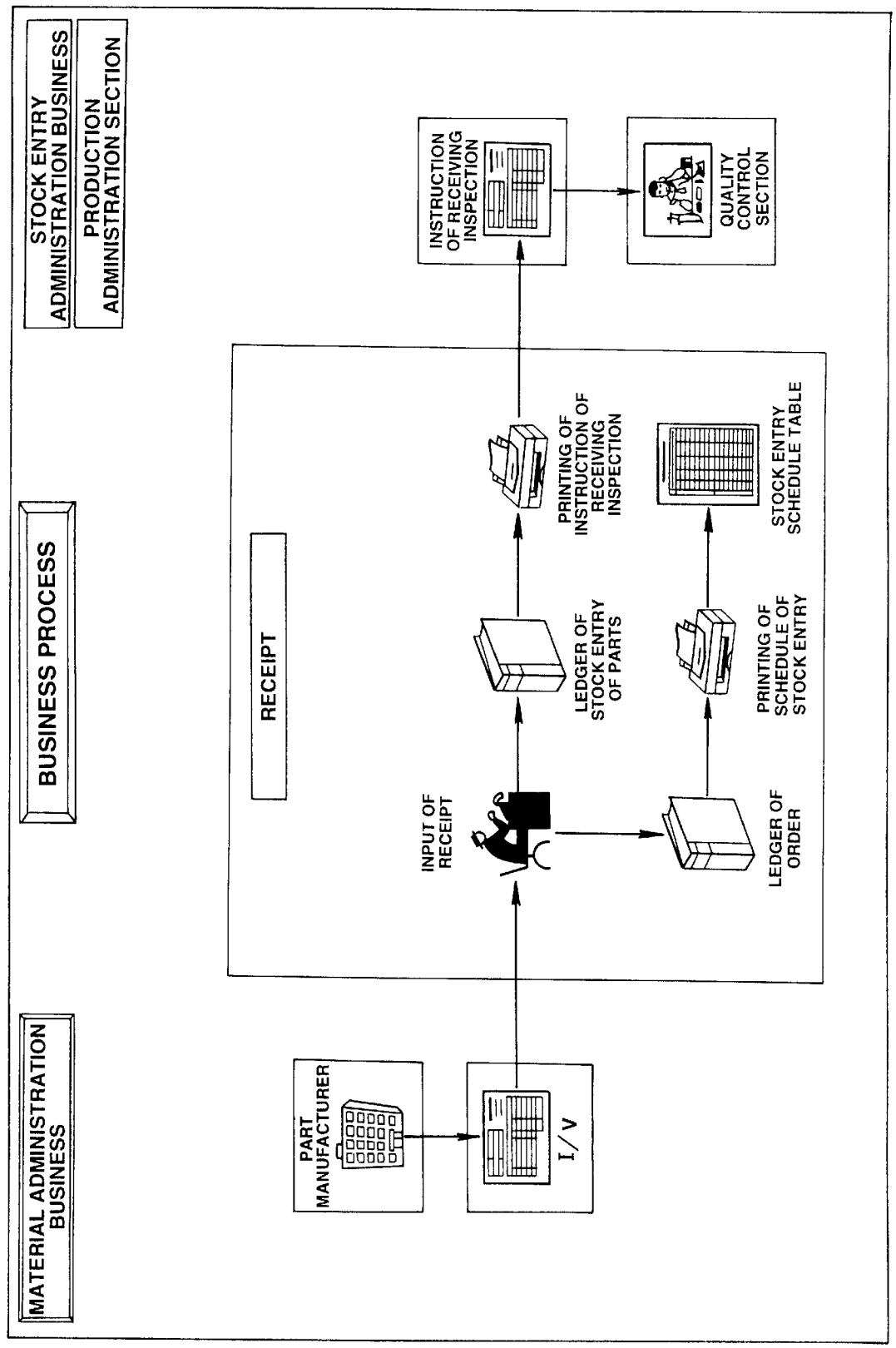
FIG. 12 is a diagram showing a business process map in which "Reception Business" shown in FIG. 11A is described.

The business process map indicates the flow of details of each business (details of the business) defined in the above-mentioned business flow map. For example, a sequential procedure from input of a slip to output of a voucher is, as shown in FIG. 12, indicated such that names of specific details of the businesses, such as "Input of Reception", "Printing of Receiving Inspection Instruction" and "Printing of Stock Entry Schedule" and file names, which are the subjects of inputs and outputs in each of the details of the businesses, such as a "Part Stock Entry Ledger" and a "Order Ledger", names of vouchers, such as "Stock Entry Schedule Table" and "Receiving Inspection Instruction" and the input slip name, such as "Slip for I/V (Delivery)", are connected to one another in accordance with the flow of the details of the businesses.

When each of the above-mentioned flow diagram has been generated and drawn, each flow diagram is, as drawing information, stored in the flow diagram making/creating system 11A. Drawing information above, for each element forming the flow diagram, consists of coordinate information indicating the position of the element, name of each element, information of an icon graphically indicating each element, and information about ruler lines. Moreover, information about a variety of forms required to generate and draw the flow diagram is included in drawing information above. When drawing information above is received by the system 11B for generating basic definition table A, the CPU starts the system 11B for generating basic definition table A to perform process for generating the basic definition table A.

The system 11B for generating basic definition table A performs a process for analyzing drawing information in each flow diagram. The basic definition table A is a table to which results of analysis obtained by analyzing drawing information in the flow diagram are set. The basic definition table A has a configuration in which names of slips, original registers and vouchers which must be input and those of slips, original registers and vouchers which must be output among all of the slips, original registers and vouchers required for each business performed by the own department are made to correspond to one another for each business. FIGS. 23A to 23E show the specific contents of the basic definition table A. The schematic configuration of the basic definition table A will now be described.

The basic definition table A is generated for each subject business in the own department. The basic definition table A has the contents consisting of results of analysis obtained by analyzing each flow diagram shown in FIGS. 9 to 17 and data arbitrarily input by depressing the keys. In the column items of the basic definition table A, "st". "nx", "Name of Department in Charge", "Business Name" and "Name of Details of Business" to be described later, "Input Destination", "Name", "Classification" and "Process" which must be input, and "Output Destination", "Original Register Name to be Updated", "Voucher Name", "Display/Print" and "Out of Subject" which must be output. Although all items except "Process", "Out of Subject" and "Display/Print" can be obtained by analyzing the flow diagram, they may be set by inputs by using the keys and may be added/modified.

Figure 4A:
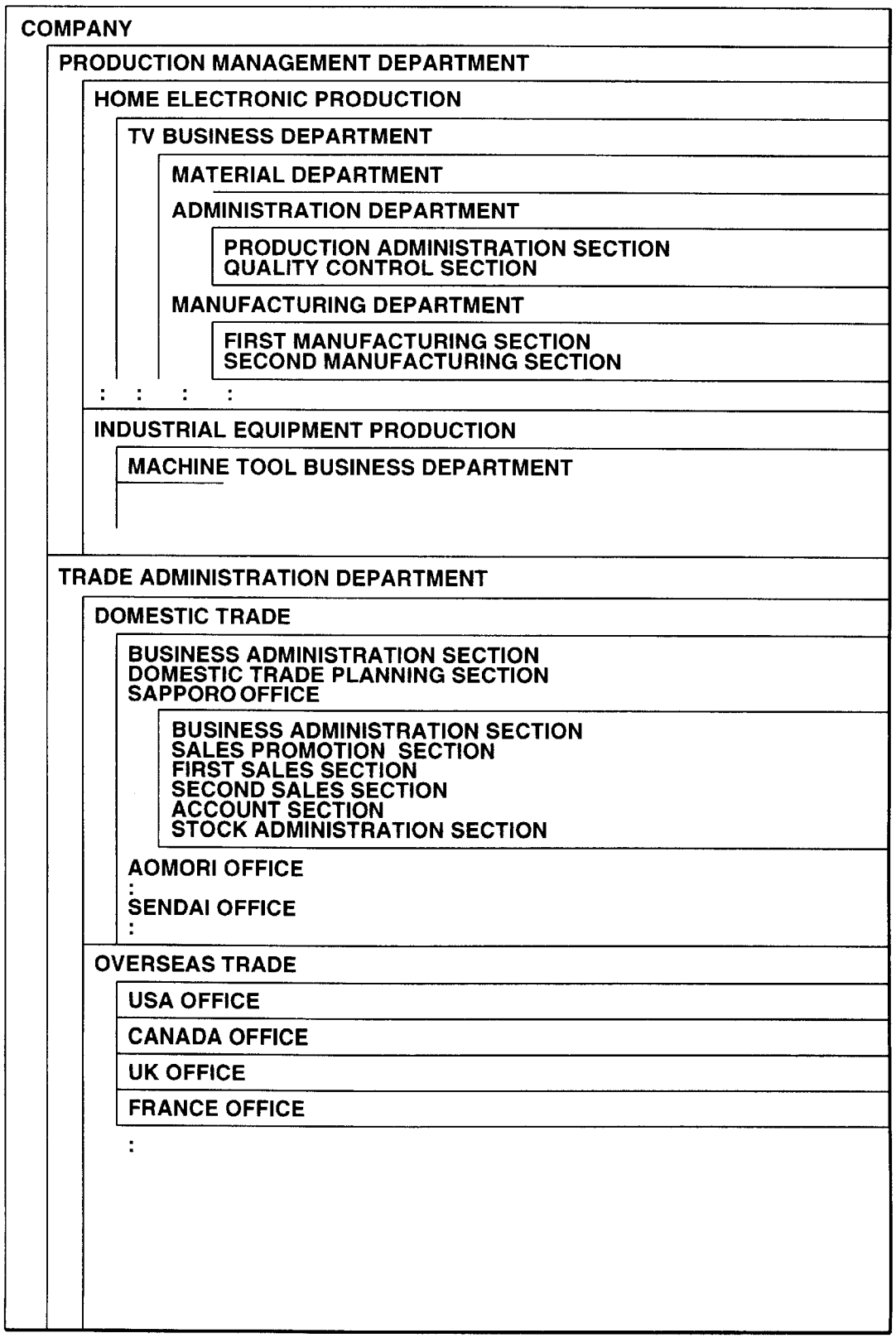
Figure 4B:
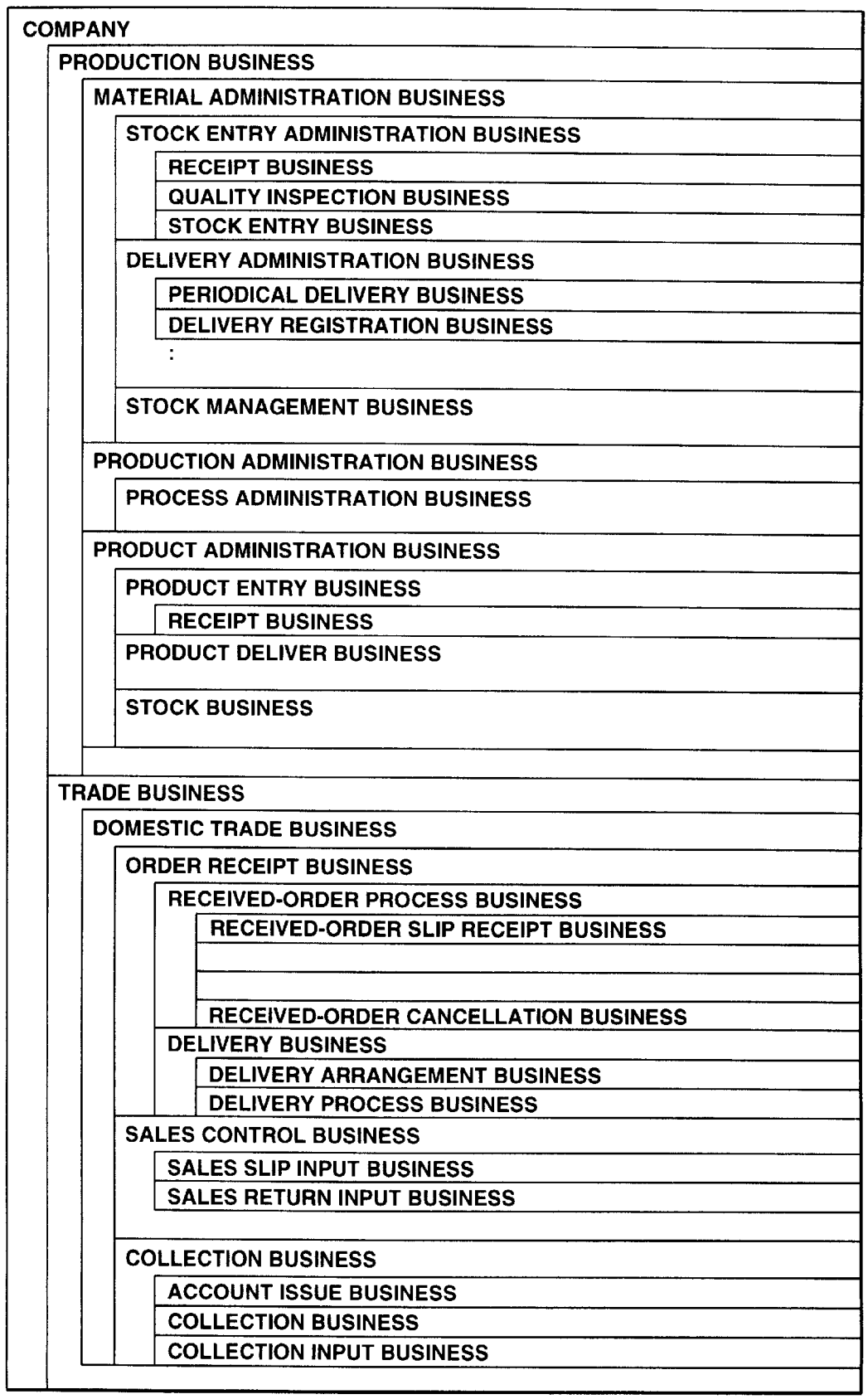

The system 11B for generating basic definition table A includes an administration table Tb. FIGS. 4A and 4B show a schematic example of the administration table Tb. The system 11B for generating basic definition table A has an organization table (FIG. 4A) for hierarchically defining names of the departments and names of the departments/sections and defining names of business connections in accordance with the configured organization of the company; and a business table (FIG. 4B) for hierarchically dividing all of the businesses in the company, such as the major classification, the intermediate classification and the minor classification, and defining the business names corresponding to the classified businesses. A reference is made to the administration table Tb if necessary when the basic definition table A is generated. Note that the contents of the administration table Tb have arbitrarily been set while permitting later addition and modification.

The flow diagram making/creating system 11A has a function that the basic definition table A generated by the system 11B is read out so that drawing information is automatically generated in accordance with the contents of the basic definition table A and form information of the predetermined flow diagram. Moreover, the flow diagram making/creating system 11A has a function of automatically generating a flow diagram such that the flow diagram is drawn on a display screen in accordance with drawing information above and the flow diagram is printed out as a document. On the other hand, the basic definition table A is supplied to the system 11C for generating basic definition table B. At this time, the CPU starts the system 11C for generating basic definition table B to perform the process for generating the basic definition table B.

Figures 27A, 27B:
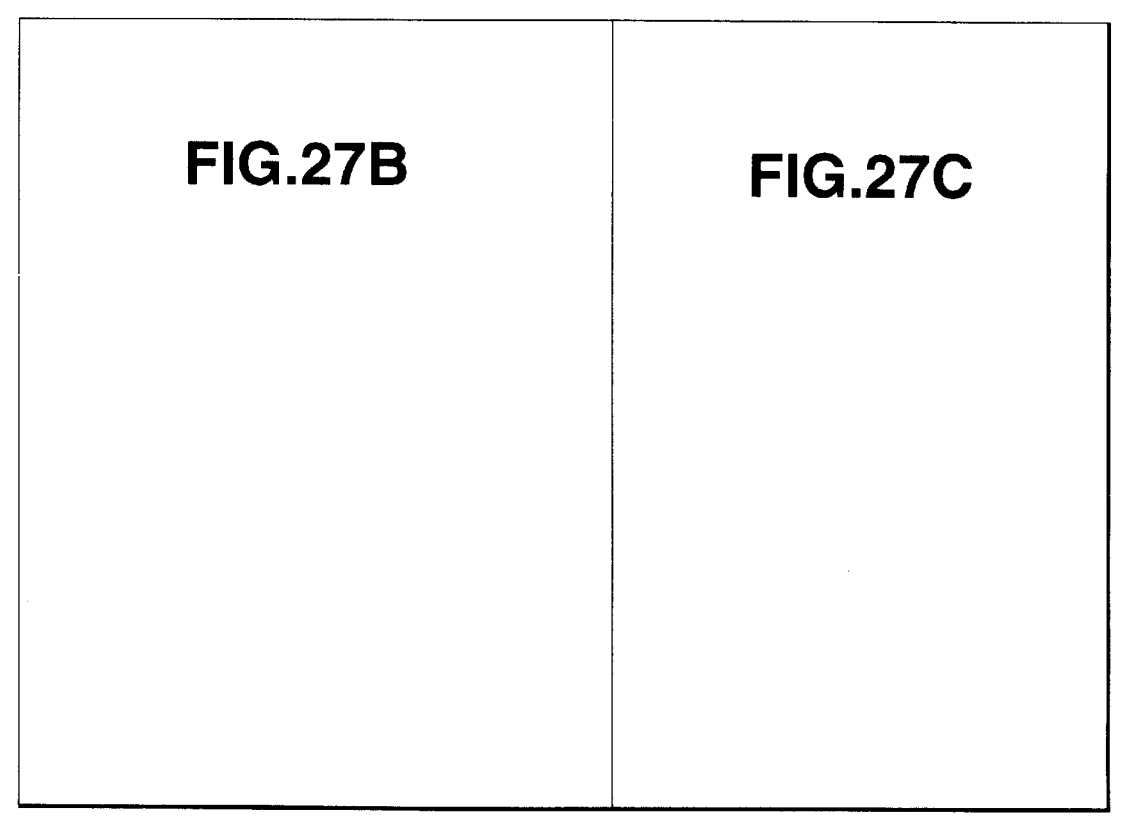
Figures 28A, 28B:
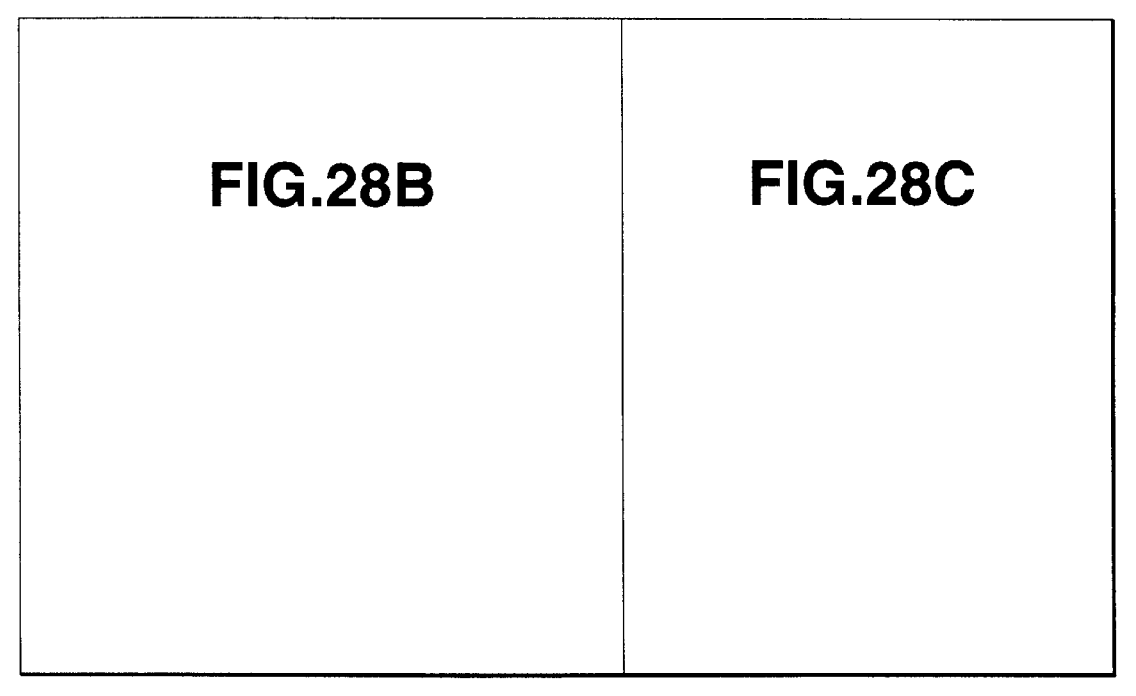

The basic definition table B consists of three types of registration cards, that is, a slip registration card, an original register registration card and a voucher registration card. The basic definition table B is generated by an editor for generating, changing, deleting character data and on the basis of the contents of the basic definition table A. The slip registration card, the original register registration card and the voucher registration card forming the basic definition table B have configurations, for example, as shown in FIGS. 27A to 30. The slip registration card, the original register registration card and the voucher registration card will now be described in brief. The slip registration card is set for each slip. FIGS. 27A to 27C show the slip registration card of the I/V slip. The slip registration card is a definition table for setting the slip name and items in the slip. Moreover, the slip registration card sets name of the file updated in accordance with the foregoing slip. The original register registration card is set for each file. FIGS. 28A to 28C show an original register registration card of a ledger of part stock entry. The original register registration card is a definition table for making a name of slip/file (an input original register name) and the item name, a name of the file (the original register name) which is updated in accordance with the slip/file and the item name to correspond to one another. FIGS. 29 and 30 show the voucher registration card. The voucher registration card consists of tables A and B. The tables A and B are definition tables set in accordance with an output image of a voucher, for example, the voucher "Stock Entry Result Table" as shown in FIG. 31.

On the other hand, the business operating system 12 consists of a business menu system 12A and a process execution system 12B. The process execution system 12B, in terms of the functions, consists of a slip processing system 12B-1, an original register processing system 12B-2 and a voucher processing system 12B-3. When a subject business of the own department has been instructed, the business menu system 12A makes an access to the corresponding basic definition table A to read and display a list of names of the various businesses and names of details of the businesses defined in the basic definition table A. When arbitrary details of the business has been selected and instructed from the displayed list, the business menu system 12A reads the slip name, a file or a voucher defined in the basic definition table A to correspond to the name of the details of the business. In this case, references to the slip registration card, the original register registration card and the voucher registration card corresponding to the slip, the file and the voucher are made. Then, the slip processing system 12B-1 performs the process for inputting the slip. Then, the original register processing system 12B-2 performs the process for outputting the voucher or the voucher processing system 12B-3 performs the process for outputting the voucher.

I. Business Construction System

The specific operation of the data processing apparatus will now be described with reference to flow diagrams. The program for realizing the functions written in each of the flow diagrams has been stored in the storage medium while being formed into a program code which can be read by the CPU.

Flow Map Making/Generating System

Figure 5:
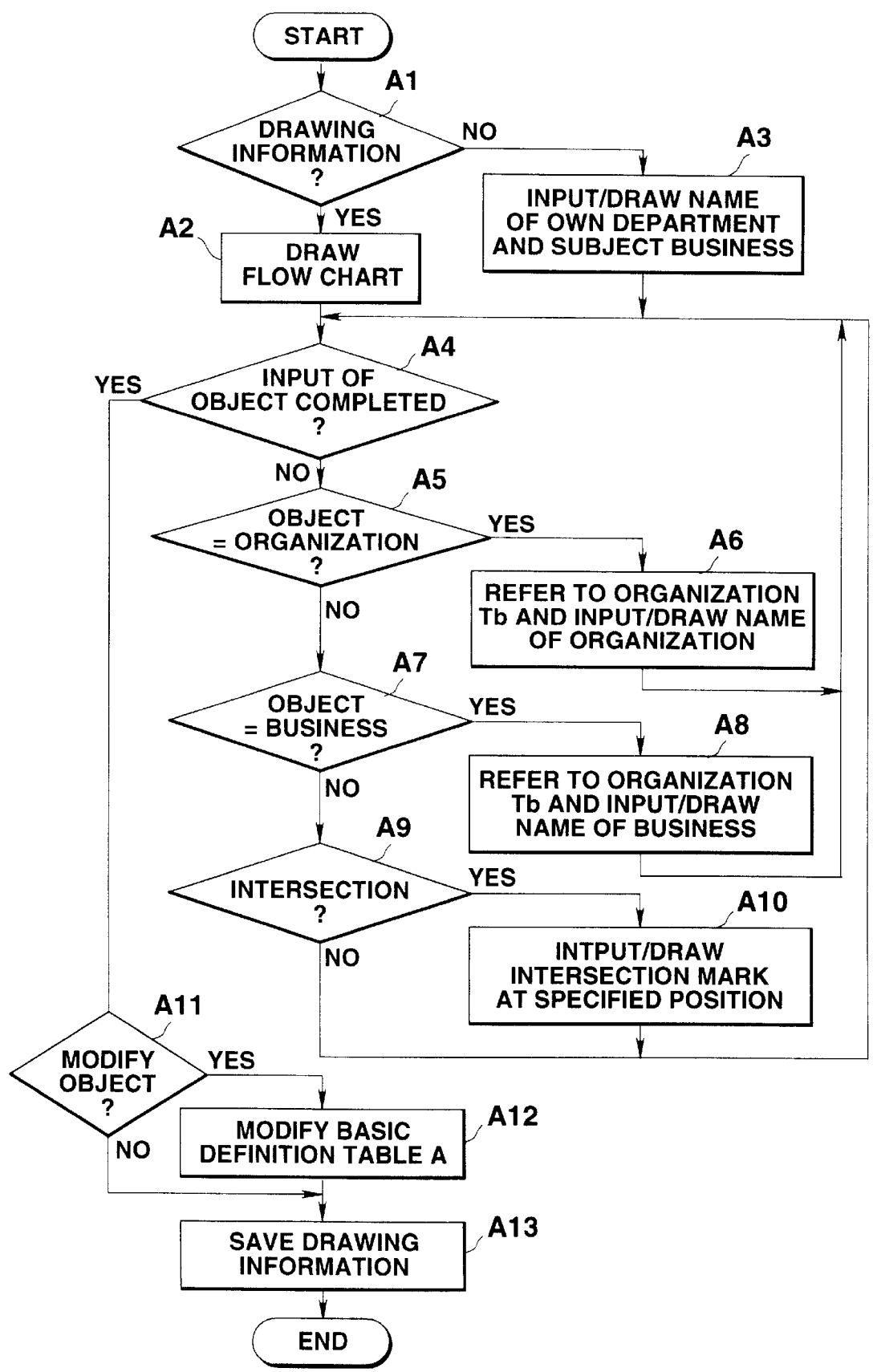
FIG. 5 is a flow chart showing a drawing/modifying operation of a business role map in a flow diagram making/creating system 11A.

FIGS. 5 to 8 are flow charts showing the operation which is performed when a person in charge makes a required flow diagram in accordance with the system of the business and the flow of slips in the own department. FIG. 5 shows the operation which is performed when a business role map is drawn/modified. The CPU starts the flow diagram making/creating system 11A forming the business constructing system 11 to perform the operation in accordance with the flow chart shown in FIG. 5.

That is, when the flow diagram making/creating system 11A has been started, department names and names of subject businesses of the own company are displayed on the menu. The menu display is performed such that the organization table (see FIG. 4A) and the business table (see FIG. 4B) forming the administration table Tb are read out and the display is performed in accordance with the contents of the tables above. When, for example, "TV Business Division, Administration Division" and the "Material Administration Business" shown in FIG. 9 are selected as the own department name and the subject business name by clicking operations with the mouse, whether setting of corresponding drawing information has been performed is determined (step A1). If setting has been performed, a flow chart, for example, as shown in FIG. 9, (a business role map) is drawn in the display screen in accordance with drawing information (step A2). If no setting has been performed, the business role map must be made by outputting a predetermined standard form (title of the flow diagram, a rectangular frame for inputting name, a ruler line and the like) of the business role map on the display screen. Moreover, selected the own department name and the subject business name are read out to draw names above at predetermined positions in the standard form (step A3). When, for example, the business role map as shown in FIG. 9 is created, "TV Department" and "Administration Division" are drawn in the upper and lower portions in the rectangular frame for inputting name. Moreover, "Material Administration" is, as the subject business name, drawn at a predetermined position (in this case, it is drawn at two portions as illustrated).

Then, whether or not all of other input subjects (hereinafter called "Objects" except the own department name and that of the subject business have been input is determined (step A4). If input has not been completed but "Organization" has been instructed as the object (step A5), the administration table Tb (the organization table) in the system 11B for generating basic definition table A is displayed in the form of a window. When names of the organizations are, one by one, instructed and selected by making a reference to the contents of the foregoing table, selected names of organization "Production Administration Section" and "Quality Control Section" respectively are drawn at instructed positions on the display screen (in the frame for inputting organization name previously defined in the standard form) without delay. If the number of the frames for inputting names of organizations is previously determined to be "2", three or more names of organizations can be input by adding/modifying the frames for inputting names of organizations and the ruler line in the standard form with using keys.

If "Business" has been instructed as the object, the administration table Tb (the business table) in the system 11B for generating basic definition table A is displayed in the form of a window. When a reference is made to the business table and, subject businesses are, one by one, instructed and selected, selected the business names are respectively drawn at instructed positions on the display screen (step A8) without delay. Assuming that the "Material Administration Business" selected/drawn in step A2 is made to be the business name in the major classification as shown in FIG. 9, "Stock Entry Business" and "Delivery Administration Business" which are intermediate classification belonging to the major classification, are drawn in a form of a hierarchy with respect to names of business in the major classification. Names of businesses "Reception Business", "Quality Inspection Business" and "Stock Entry Business" which are in the minor classification belonging to the "Input Administration Business" which is the intermediate classification and the business names "Periodical Delivery Business" and "Delivery Registration Business" which are in the minor classification belonging to the business name "Delivery Administration Business" which is the intermediate classification are drawn in the hierarchy configuration.

When the subject business name (business in the major classification) has been selected, the organization table in the administration table Tb may be retrieved to read the subject the business names in the intermediate classification and the business names in the minor classification so as to be automatically drawn in a hierarchy configuration in accordance with the standard form. If the business names are input by a number lager than the standard form, the standard form may be modified/added with a frame for inputting the business name and a ruler line by using keys.

The standard form is formed by a ruler line matrix composed of a longitudinal ruler lines connected to the frame for inputting names of the organizations and lateral ruler lines connected to the frame for inputting the business names in the minor classification. When an input to the intersection on the matrix has been instructed (step A9), an intersection mark (a circle) is drawn at the instructed position (step A10). As a result, the subject businesses to be performed by the corresponding departments are indicated. Therefore, facts are indicated that the "Production Administration Section" takes charge of "Reception Business", "Stock Entry Business", "Periodical Delivery Business" and "Delivery Registration Business" among the "Material Administration Business", while the "Quality Control Section" takes charge of "Quality Inspection Business".

When completion of the input of the objects has been instructed, the operation proceeds to step A11 so that whether or not the object has been modified is determined. Since a business role map has been created in this case, the operation proceeds to step A13 so that drawing information is made to correspond to the own department name and the subject business name so as to be saved.

Since improvement in the business causes the department in charge to be changed as the time elapses, the objects of the generated business role map must be modified. In this case, when the own department name and that of the subject business are required to be instructed to, the corresponding and pre-modification drawing information is called and the business role map is automatically generated and drawn (step A12). Thus, the drawn map is confirmed and required modification is performed (steps A6, A8 and A10). Since a fact is detected in step A11 that the object is modified, information about the modification is transferred from the flow diagram making/creating system 11A to the system 11B for generating basic definition table A. As a result, the system 11B for generating basic definition table A modifies the corresponding basic definition table A in accordance with modification information above (step A12). Then, the flow diagram making/creating system 11A saves drawing information after the modification has been performed (step A13). When improvement of the business has been required, a portion of the flow diagram is modified as described above. Thus, the basic definition table A is modified.

Figure 6:
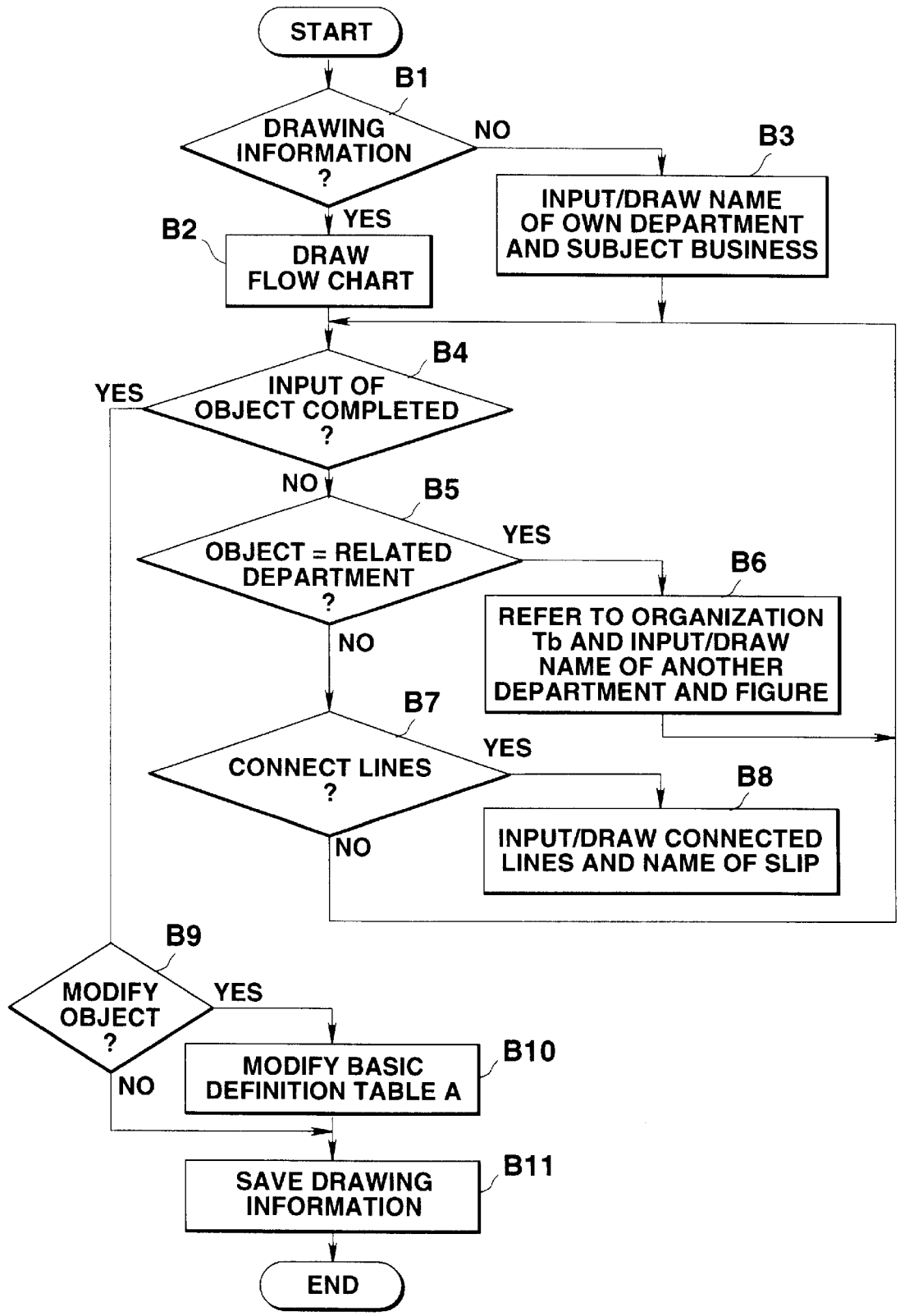
FIG. 6 is a flow chart showing a drawing/modifying operation of a business physical distribution map in a flow diagram making/creating system 11A.

FIG. 6 is a flow chart showing drawing/modifying operations of the business physical distribution map. Note that steps B1 to B4 correspond to steps A1 to A4 shown in FIG. 5, while steps B9 to B11 correspond to steps A11 to A13 shown in FIG. 5. Since the foregoing steps are similar to those shown in FIG. 5, a characteristic portions of the drawing/modifying operation in the business physical distribution map will mainly be described.

In a case where a business physical distribution map is created, the own department name and the subject business name are selected from displayed menu, the own department name and name of subject business are, in addition to a standard form of the business physical distribution map, drawn at predetermined positions (step B3). In this case, since "Stock Entry/Delivery Administration" has been defined in the administration table Tb (the business table) to correspond to "Material Administration Business", the "Stock Entry/Delivery Administration" being defined as an intermediate classification. Therefore, the business name in the intermediate classification is called from the business table so as to be drawn in the frame for inputting the own department name (see FIG. 10).

If a relative department, that is, another department of the own company or another company is instructed as the object (step B5), a reference is made to the organization table so as to select name of another department of the own company or name of another company. Thus, the selected name of the related department is drawn at the instructed position. If name of the subject relative department is not set in the organization table, it may arbitrarily be input by using keys.

In a case where the frame for inputting the own department name and the frame for inputting name of a related department are connected to each other in accordance with the flow of the slips (step B7), a ruler line having an arrow is drawn so that the departments are connected with the lines. Moreover, names of slips to be transmitted/received among the subject departments are input/drawn. Thus, a business physical distribution map as shown in FIG. 10 is generated. Note that the relative departments may be increased or decreased by modifying the standard form. The generated business physical distribution map is saved as drawing information (step B11). If the generated business physical distribution map is modified (step B9), also its basic definition table A is modified similarly to the above-mentioned case.

Figure 7:
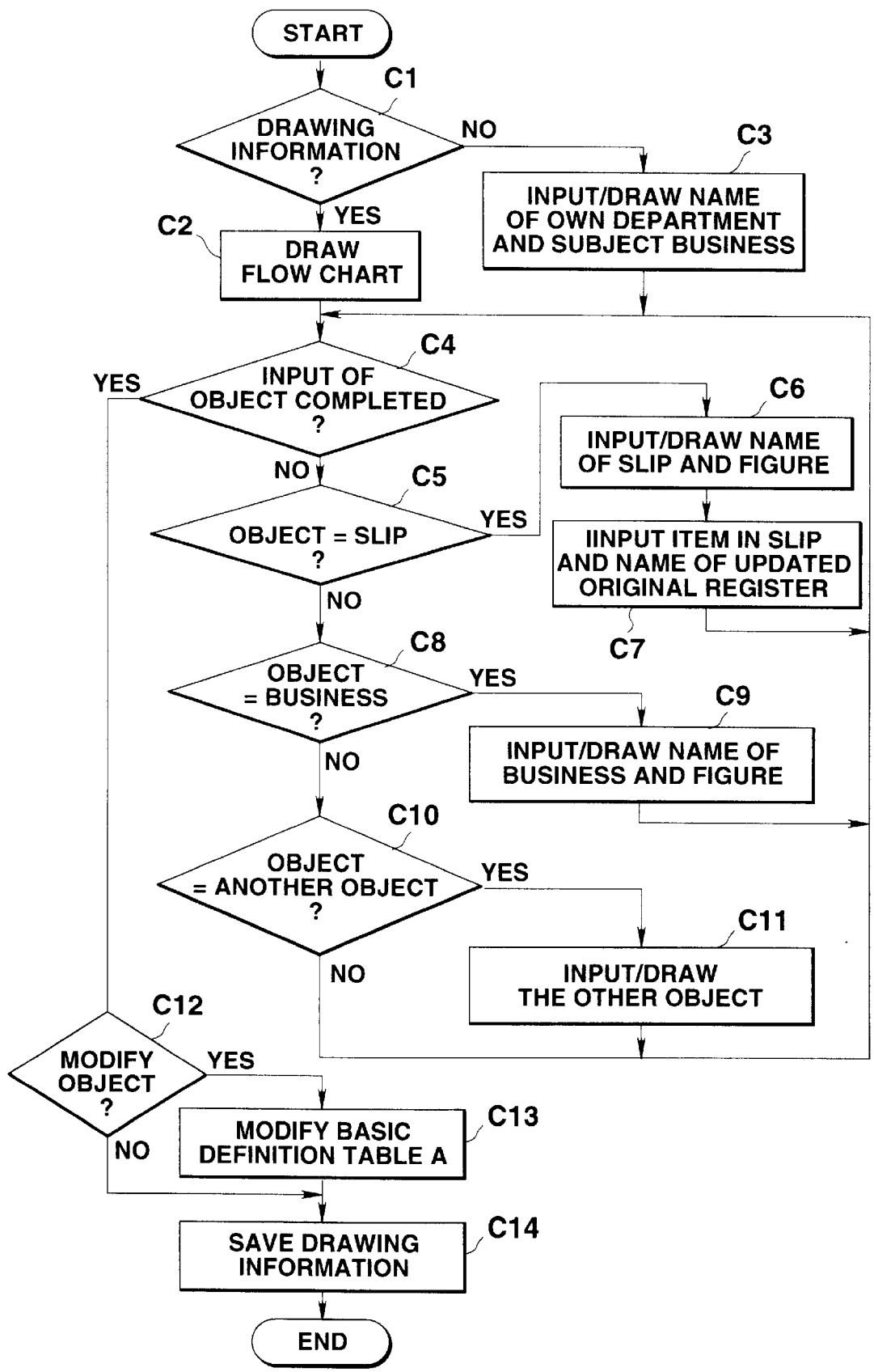
FIG. 7 is a flow chart showing a drawing/modifying operation of a business flow map in a flow diagram making/creating system 11A.

FIG. 7 is a flow chart showing an operation for drawing/modifying the business flow map. Also in this case, steps C1 to C4 correspond to steps A1 to A4 shown in FIG. 5 and steps C12 to C14 correspond to steps A11 to A13 shown in FIG. 5. Since the steps are basically similar to those shown in FIG. 5, the characteristic portions will mainly be described.

When the business flow map is generated, the own department name and the subject business name are selected so that the own department name and the subject business name are, in addition to the standard form of the business flow map, drawn at predetermined positions (step C3). Since name of the department "Production Administration Section" and "Quality Control Section" have been defined in the administration table Tb (the organization table) to correspond to name of the instructed own department "TV Business Division/Administration Division", names of the departments are read from the organization table so as to be drawn while being made to correspond to the own department name. If a reference is made to the organization table and name of relative company/organization is selected in step C3, the above name is drawn at a predetermined position in the standard form.

Then, icons of the "Slip" and "Business" formed as objects are disposed on the business flow map. Though not shown, the icons are displayed in the form of a list in a window or the like on the screen on which the business flow map is displayed. Among the displayed icons, required ions are selected by using a mouse or the like so as to be located at predetermined positions on the business flow map. The foregoing method is similar for the other maps.

When it is instructed to locate the "Slip" at a predetermined position on the business flow map as an object (step C5), the slip name is read from a predetermined index table so as to be displayed as a menu from which an arbitrary the slip name can be selected. Thus, selected the slip name is, together with its icon, drawn at a predetermined position in the standard form (step C6). In this case, a slip item setting window is opened to permit setting of slip item name to be set. That is, FIG. 11A shows a window for setting an I/V slip. Names of items in the slip are set to the setting window, and the original register name for instructing a file in which the slip is updated is set. In the window for setting items of the slip, the item names of the slip have been initially set in a predetermined sequential order. If modification is attempted, only required items are selected and the item names are set in a required sequential arrangement order. In this case, a scroll bar is pressed by the mouse to vertically scroll the screen displaying the item names. Moreover, an "OK" key or a "Cancel" key is clicked with the mouse to select required items. FIG. 11A shows an example in which "Order Ledger" and "Part Stock Entry Ledger" has been input and set as names of the original register to be updated which correspond to the I/V slip.

If "Business" is instructed as an object (step C8), the business name ("Reception Business", "Quality Inspection Business" and the like which are businesses in the minor classification in the example shown in FIG. 9) and icons graphically indicating the businesses are read from a predetermined index table so as to be displayed as a menu. When an arbitrary name of a business is selected from the menu, selected the business name and its icon are drawn at predetermined positions in the standard form (step C9).

If another object is instructed (step C10), an inputting/drawing process corresponding to the instructed object are performed (step C11). That is, a connection process using ruler lines having arrows is performed in accordance with the respective slips and the flow of the business. Since two types of slips, that is, "Return Slip" and "Stock Entry Slip" are issued in the "Stock Entry Business" as shown in FIG. 11A, the connection line is branched into two sections in accordance with the number of the slips. Since slips are transmitted/received to and from the own department and the relative company/organization, line connection between the above-mentioned departments is performed in accordance with the flow of the slips. Moreover, name of the relative company/organization and its icon are input/drawn.

The thus-generated business flow map is saved as drawing information (step C14). If a generated business flow map is modified (step C12), also its basic definition table A is modified similarly to the above-mentioned process (step C13).

Figure 8:
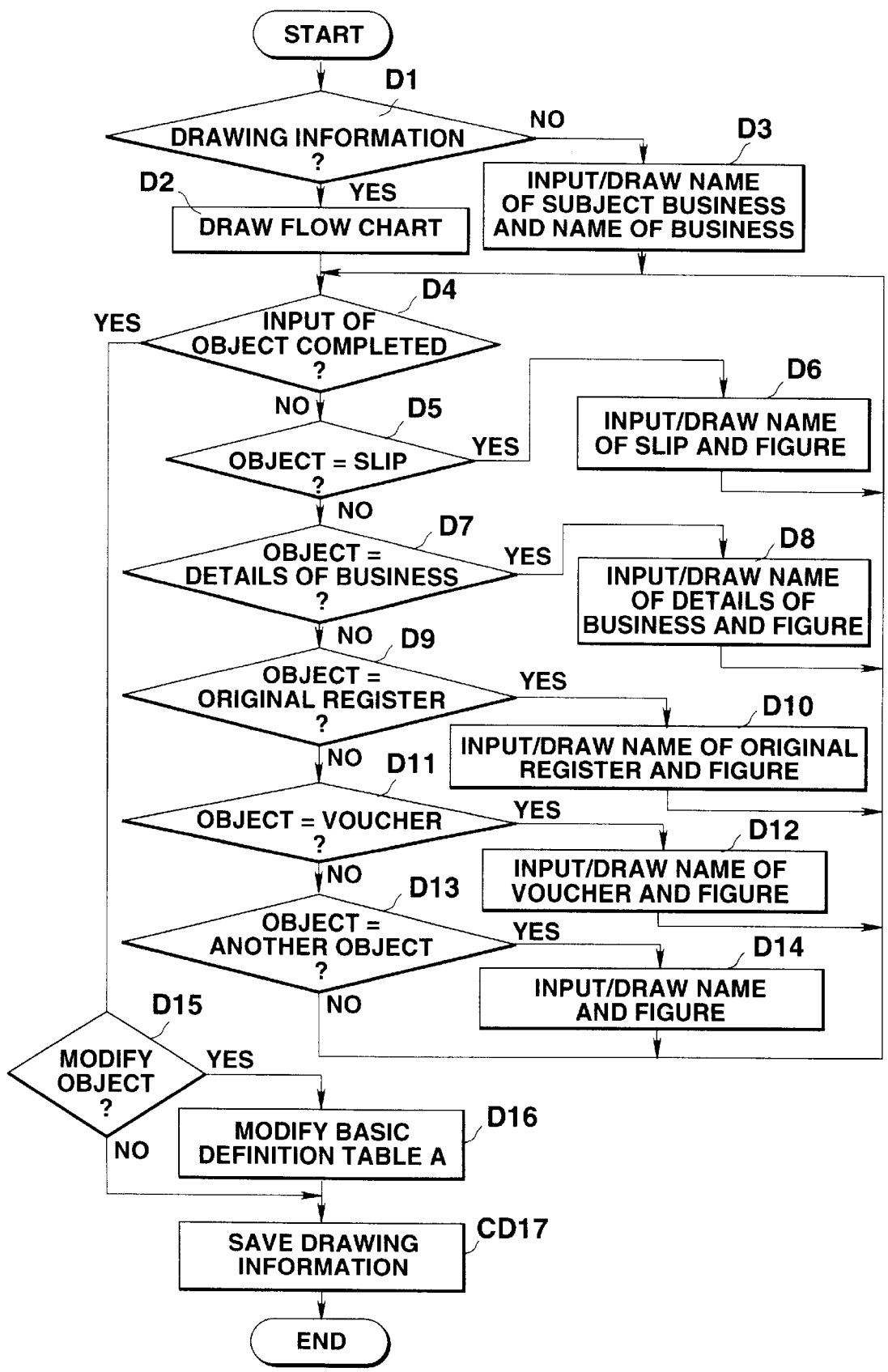
FIG. 8 is a flow chart showing a drawing/modifying operation of a business process map in a flow diagram making/creating system 11A.

FIG. 8 is a flow chart showing operations for drawing/modifying the business process map. Note that steps D1, D2 and D4 correspond to steps A1, A2 and A4 shown in FIG. 5, while steps D15 to D17 correspond to steps A11 to A13 shown in FIG. 5. The foregoing steps are basically similar to those shown in FIG. 5. Moreover, steps D5 and D6 corresponds to steps C5 and C6 shown in FIG. 7, while steps D13 and D14 correspond to steps C10 and C11 shown in FIG. 7. Since the foregoing steps are similar to those shown in FIG. 7, the characteristic portions for the operation for drawing/modifying the business process map will mainly be described.

When the business process map is created, the business name is instructed by double-clicking of the mouse or the like on the displayed business flow map. Thus, the process for drawing/modifying the business process map corresponding to instructed the business name is started. If the "Reception Business" is instructed, the subject business name and the business name in the minor classification are, together with the business flow map of the business process map, are drawn at predetermined positions, as shown in FIG. 12 (step D3). In this case, "Stock Entry Administration Business" which is business name in the intermediate classification which is upper than the minor classification and to which the minor classification belongs is drawn at a predetermined position, as shown in FIG. 12. Moreover, a reference is made to the business role map shown in FIG. 9 so that name of department in charge of "Reception Business" in the minor classification, that is, "Production Administration Section" is drawn at a predetermined position.

Then, an inputting/drawing process corresponding to the type of the object is performed. In this case, the business ("Reception Business" in the case shown in FIG. 12) which is performed by the department belonging to the own department is fined in accordance with the actual contents of the business. Names of a sequence of fined businesses "Reception Business", "Printing of Receiving Inspection Instruction" and "Printing of Stock Entry Schedule Table" are, as details of the businesses, input/drawn at instructed positions. Moreover, icons indicating the details of the businesses are made to correspond to names above so as to be input/drawn (steps D7 and D8). Slips, files (original registers), names of vouchers and icons indicating the foregoing factors, which are the subjects which must be input in each of the details of the businesses are input/drawn at predetermined positions. In this case, the process for inputting/drawing the slips is performed in steps D5 and D6, the process for inputting/drawing the original registers is performed in steps D9 and D10, and the process for inputting/drawing the vouchers is performed in steps D11 and D12. If another object is instructed (step D13), an inputting/drawing process corresponding to the object is performed (step D14). That is, the details of the businesses and slips/original registers/vouchers which are subjects which must be input/output are connected to one another with lines each having an arrow in accordance with the flow of the business. Moreover, names of the related departments and icons are input/drawn.

The thus-generated business process map is saved as drawing information (step D17). When a generated business process map has been modified (step D15), also its basic definition table A is modified.

Figure 13:
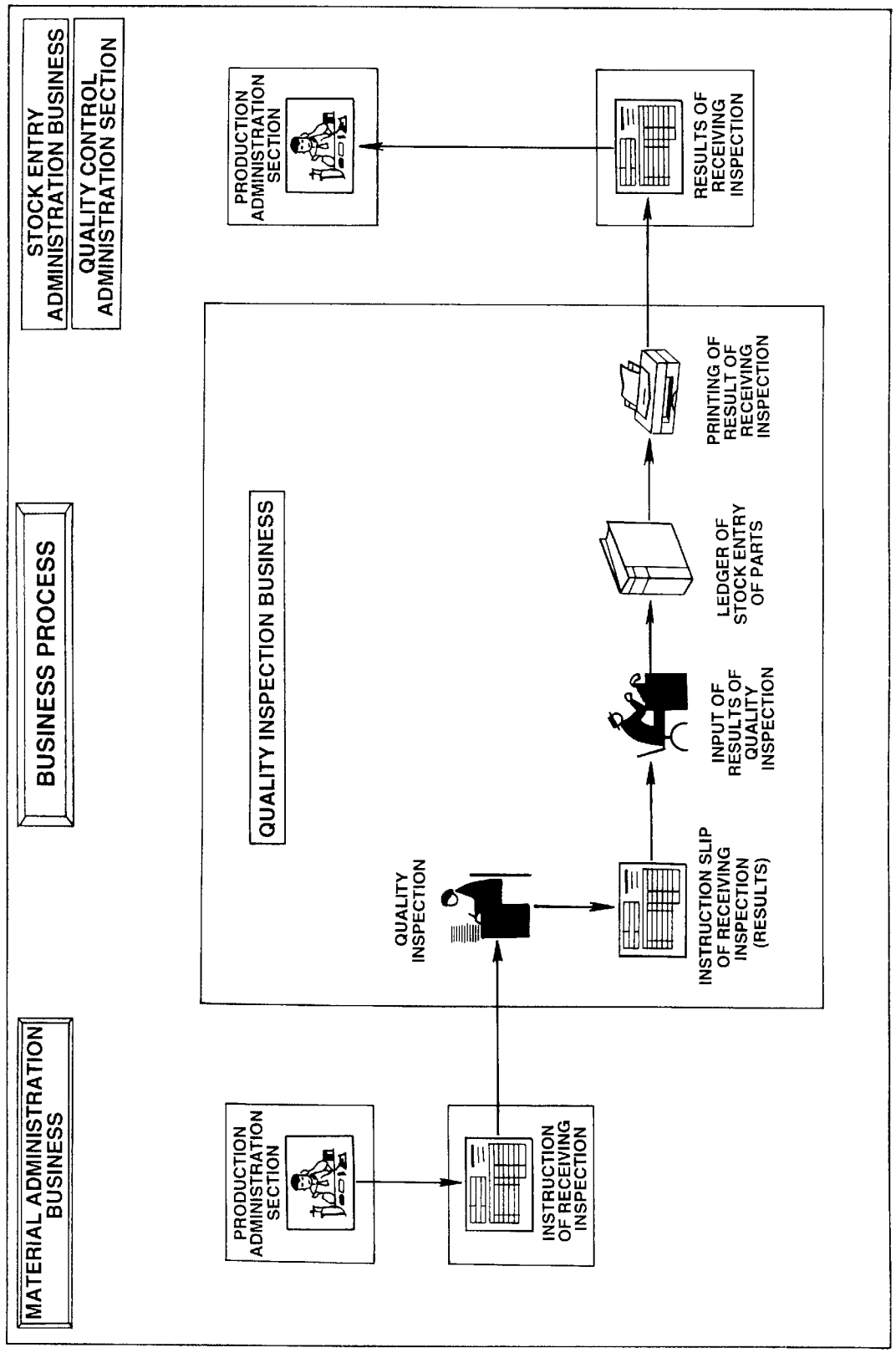
FIG. 13 is a diagram showing the business process map in which "Quality Inspection Business" shown in FIG. 11A is described.
Figure 14:
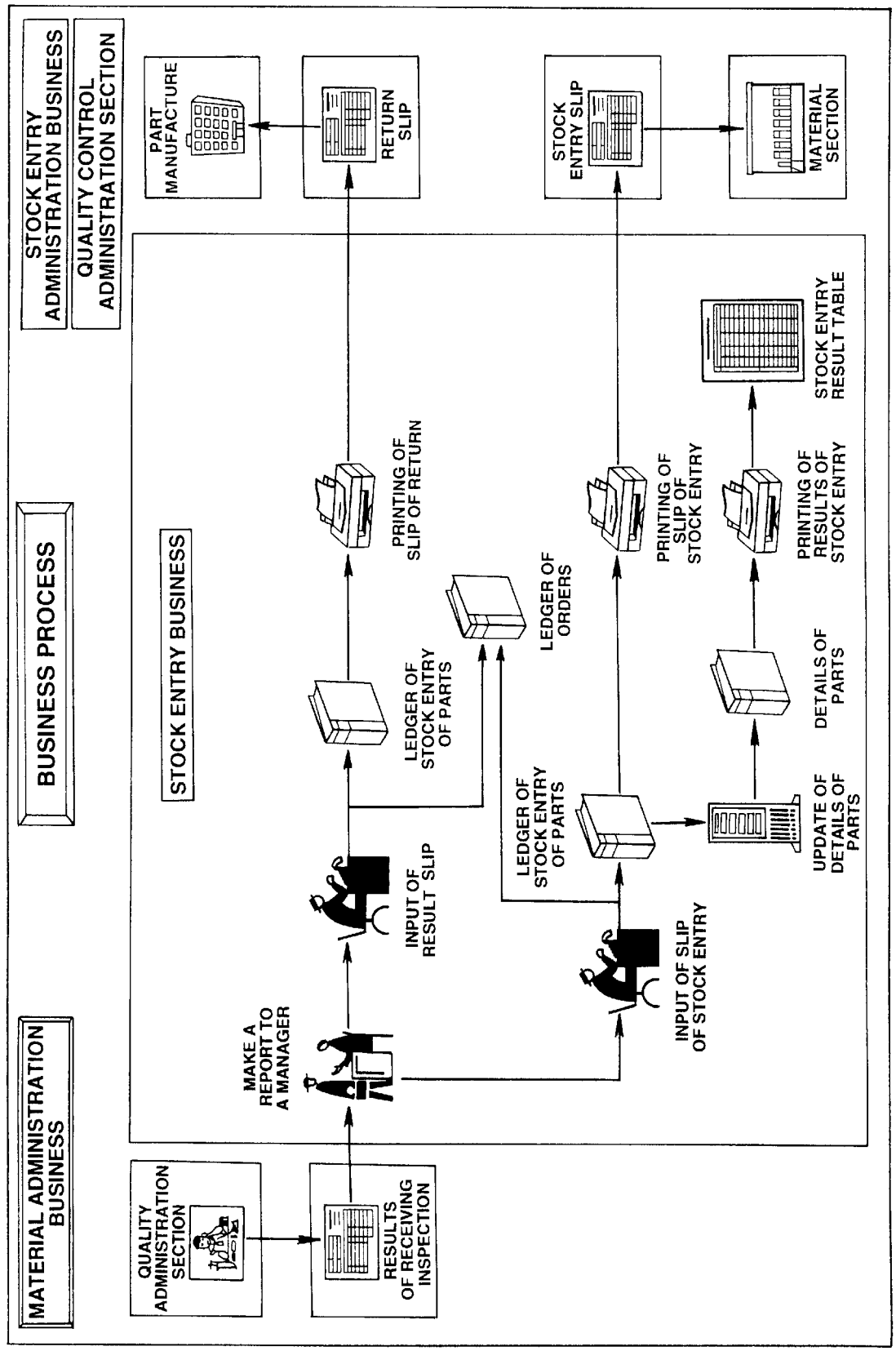
FIG. 14 is a diagram showing the business process map in which "Stock Entry Business" shown in FIG. 11A is described.

The business process map is generated for each business set in the business flow map shown in FIG. 11A. FIG. 13 shows a business process map for the "Quality Inspection Business", and FIG. 14 shows a business process map for the "Stock Entry Business".

Although each business process map has files, such as the various ledgers, it is probable that the person in charge does not have thorough knowledge to input/update data to the files. In this case, one object graphically indicating the shape of the computer may be disposed in place of individually disposing the foregoing files. In this case, a map in which files, which are subjects which must be input/updated, and which correspond to objects of the computer, are disposed on the basis of a suggestion from an expert who knows the contents of the system.

Figure 15:
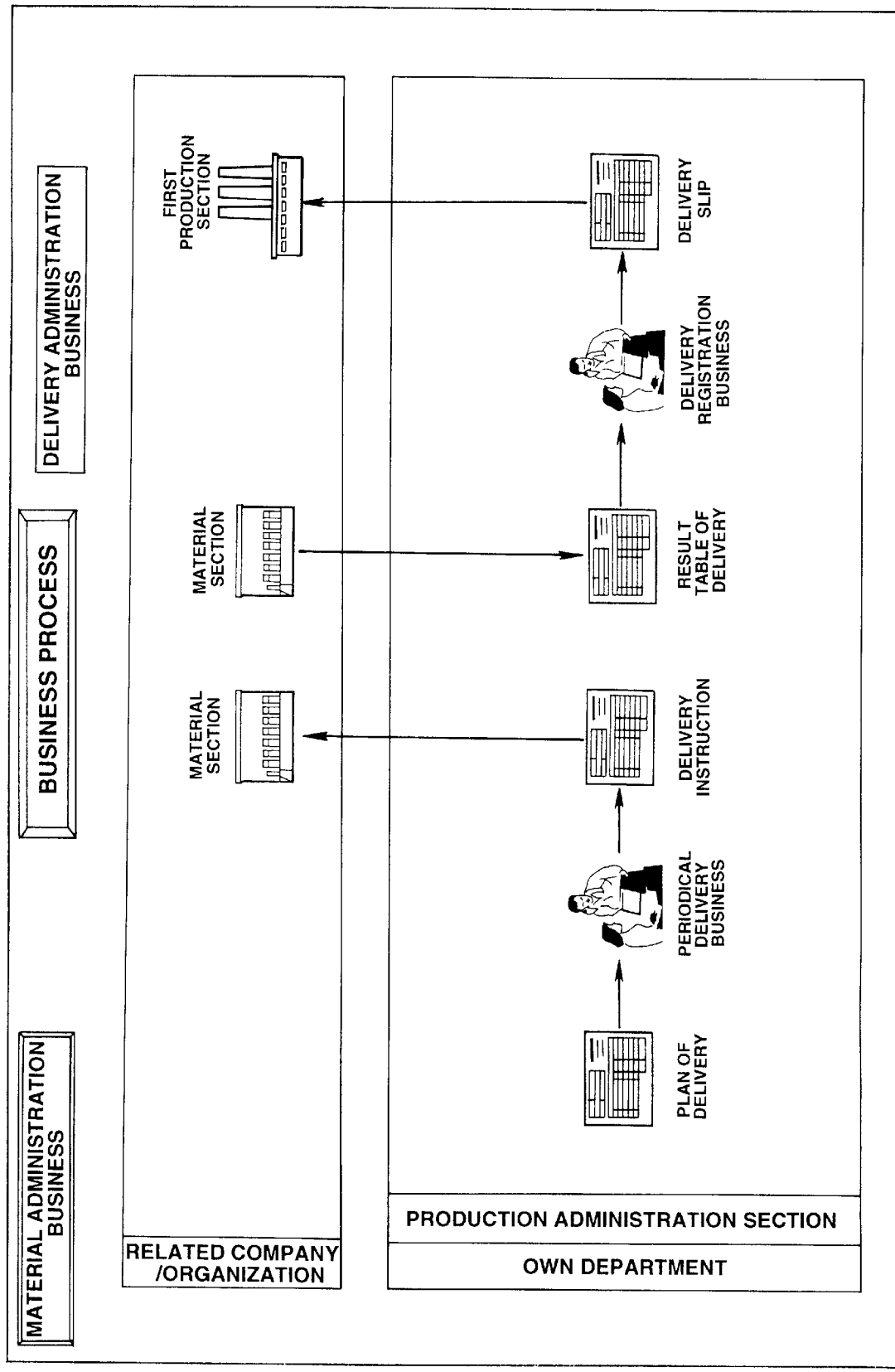
FIG. 15 is a diagram showing another business flow map.
Figure 16:
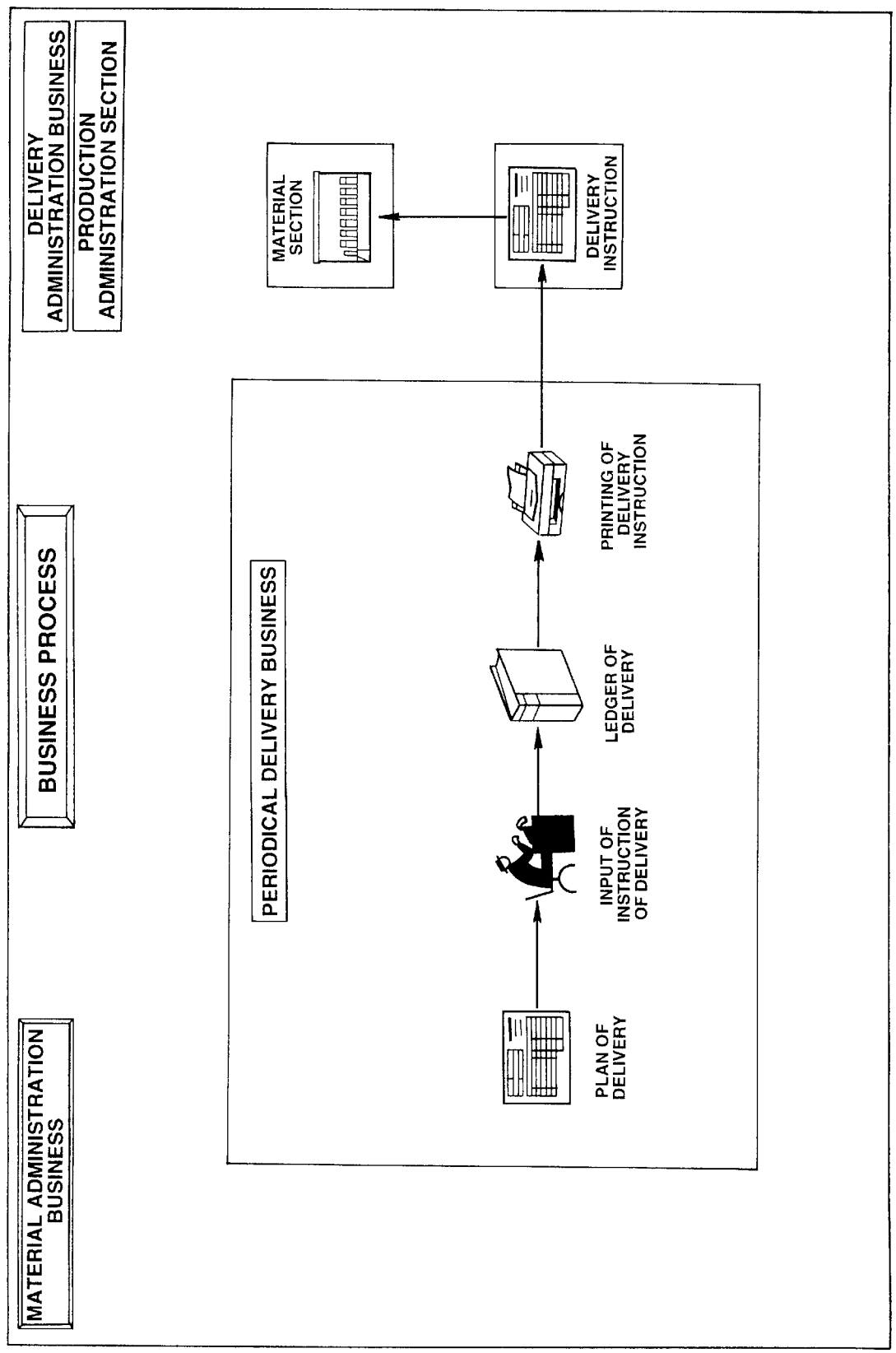
FIG. 16 is a diagram showing the business process map in which "Periodical Delivery Business" is described.
Figure 17:
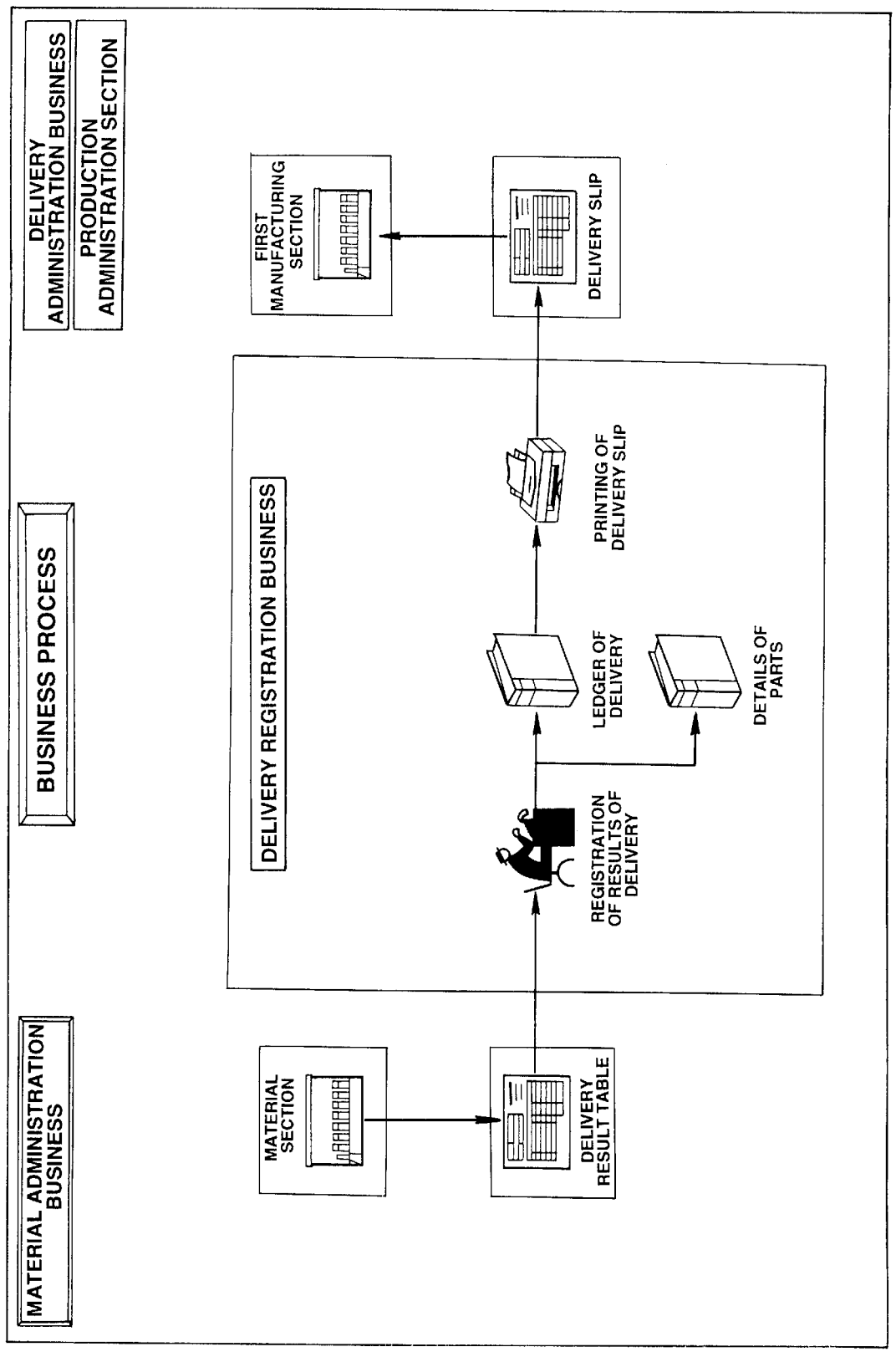
FIG. 17 is a diagram showing the business process map in which "Delivery Registration Business" is described.

FIG. 11A shows the business flow map of the "Stock Entry Administration Business" among the Material Administration Businesses which is performed by the own department "TV Business Division/Administration Division". FIG. 15 shows a business flow map of the "Delivery Administration Business". That is, if the subject business "Material Administration Business" is classified into "Stock Entry Administration Business" and "Delivery Administration Business" as shown in FIG. 9, business flow maps are generated to correspond to the number of the classified businesses. FIGS. 16 and 17 show business process maps corresponding to the businesses set in the business flow map for the "Delivery Administration Business". FIG. 16 shows the business process map for the "Periodical Delivery Business", and FIG. 17 shows the business process map for the "Delivery Registration Business". Also the business flow map and the business process map are generated similarly to the foregoing case.

When the various flow diagram have been generated, drawing information is analyzed so that the basic definition table A is generated. The process for generating the basic definition table A will be described later. The basic definition table A can be generated by inputting the contents of the basic definition table A by using keys. As an alternative to this, a portion of the basic definition table A obtained by analyzing drawing information is added/modified by using keys so that the basic definition table A is generated. That is, the basic definition table A can be generated by analyzing the flow diagram or by performing the key inputting operation.

Figure 18:
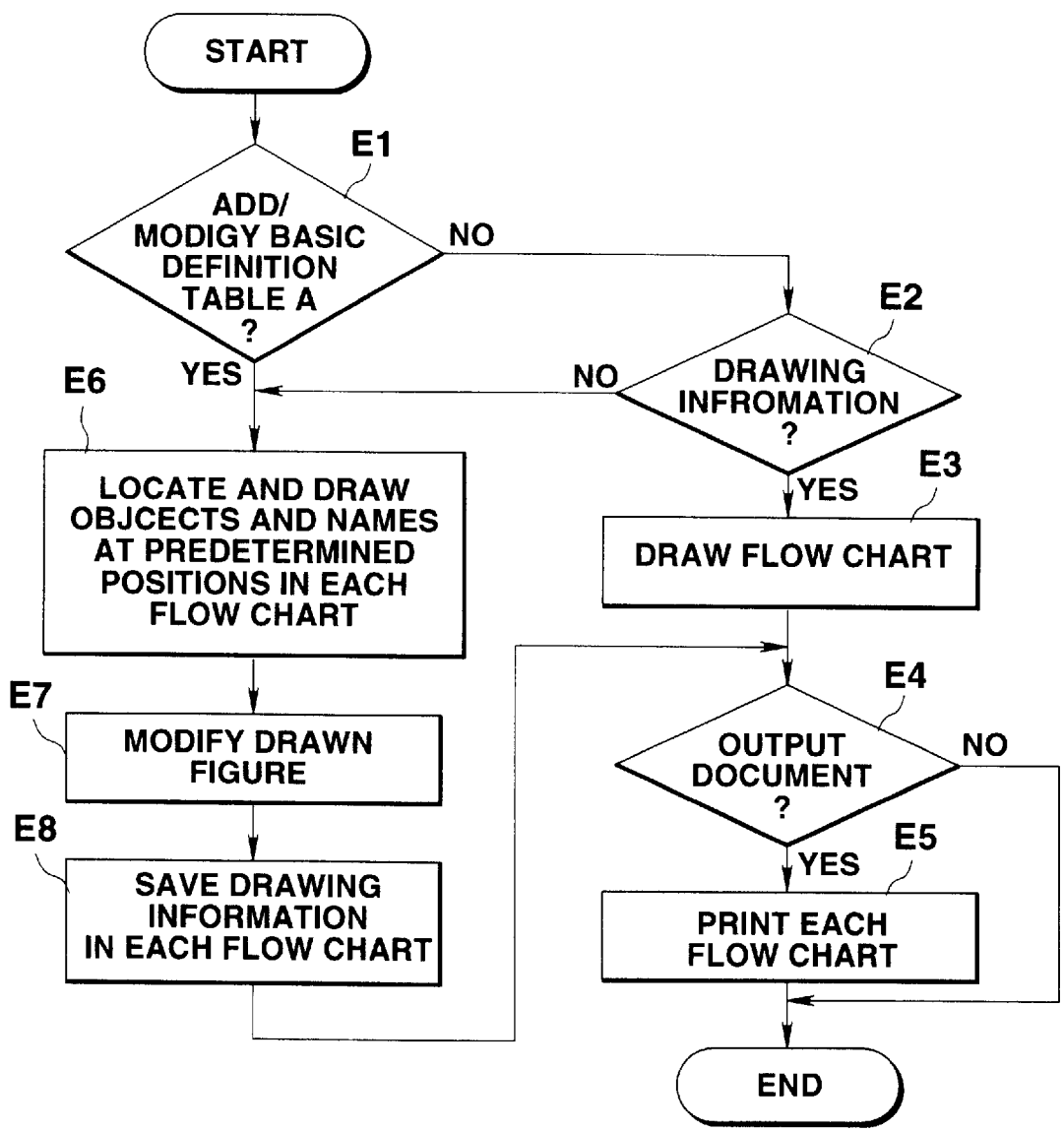
FIG. 18 is a flow chart of an operation which is performed when each flow diagram is automatically generated in accordance with basic definition table A.

FIG. 18 is a flow chart showing the operation which is performed when each flow diagram is automatically generated in accordance with the basic definition table A.

Initially, whether or not a portion of the basic definition table A has been added/modified by using keys is determined (step E1). If the basic definition table A has not been changed, whether or not drawing information corresponding to the basic definition table A has been set is determined (step E2). Since it is determined that drawing information exists where each flow diagram has been generated in the above manner, the respective flow diagrams are sequentially drawn on the display screen in accordance with drawing information above (step E3). When an output of a document of the flow diagram has been instructed (step E4), each flow diagram is printed out in accordance with drawing information (step E5).

If a portion of the basic definition table A is changed by the key inputting operation, it is determined in step E1 that addition/modification has been performed. If the whole basic definition table A has been generated by the key inputting operation, no addition/modification is detected in step E1 and no drawing information is detected in step E2. In the foregoing cases, the operation proceeds to step E6 so that each flow diagram is automatically generated in accordance with the contents of the basic definition table A and the standard form of each flow diagram so as to be drawn on the display screen. Since the own department name, the subject business name and name of each object have been set to the basic definition table A as shown in FIG. 23A to 23E, names above are read, and icons indicating the respective objects and connection lines are set at the corresponding positions in the standard form. If the form is not adaptable to the standard form, a form changing process is performed such that the standard form is expanded in accordance with the contents of the basic definition table A or the same is deleted.

When the confirmed flow diagram which has been automatically generated is modified, a portion of the flow diagram, such as the configuration and positions of the objects, may be modified (step E7). Then, drawing information of each flow diagram is saved (step E8). If output of a document is instructed (step E4), each flow diagram is printed out in accordance with drawing information.

In a case where the business system of the own department is indicated for each hierarchy in a descending order, the business role map, business physical distribution map, the business flow map and the business process map are generated in this sequential order. The generating order is not limited to this. In a case in which indication in the ascending order is employed, the business process map may be generated first. In this case, entry to the business process map is performed, and then this data is used to generate a range in which the business flow map, the business physical distribution map and business role map can be generated. Then, modification is performed to complete each map. Although the standard form which has been prepared to correspond to each flow diagram is used to generate the flow diagram, a free form satisfying an image of a person in charge may be employed to generate the flow diagram in place of using the standard form. If the flow diagram is drawn in a multicolor image, satisfactory visibility and identification characteristic can be obtained. If a plurality of business flow maps and business process maps are generated in such a manner that their overall shapes and the like are similar to one another, copying of the flow diagram generated previously is permitted to add/modify a portion of the flow diagram above so that the flow diagram is generated easily.

System for Generating Basic Definition Table A

An operation for generating the basic definition table A by analyzing each flow diagram will now be described with reference to a flow chart shown in FIGS. 19 to 22.

Figure 19:
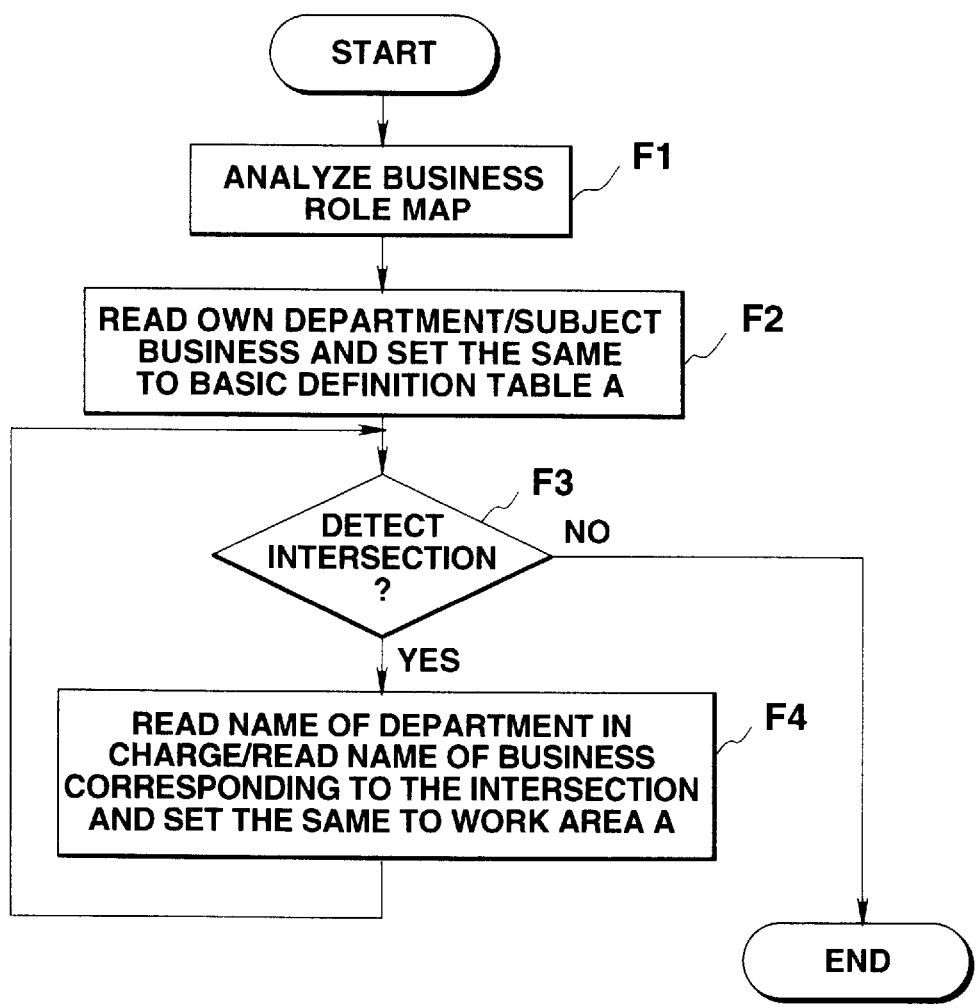
FIG. 19 is a flow chart of an operation which is performed when the business role map is analyzed.

FIG. 19 is a flow chart of a process for analyzing the business role map. The drawing information of the business role map is accessed to be analyzed (step F1). Then, the own department name and name of subject business are set to a predetermined position in the basic definition table A (step F2). The basic definition table A shown in FIG. 23A to 23E has been generated in accordance with each of the flow diagrams shown in FIGS. 9 to 17. "TV Business Division/Administration Division" is set as the own department name and "Material Administration Business" is set as name of subject business. Then, the position of the intersection of the business role map is searched for (step F3). If the position of the intersection has a circle, name of the department in charge (name of the division/section in charge) and the business name (business name in a minor classification) corresponding to the intersection are read so as to be set in work region A in the RAM (step F4). As a result, the business names, such as "Reception Business", "Stock Entry Business", . . . , corresponding to name of the department in charge, that is, "Production Administration Section", are set in the work region A. Moreover, the business name, that is "Quality Inspection Business" corresponding to "Quality Control Section" is set.

Figure 20:
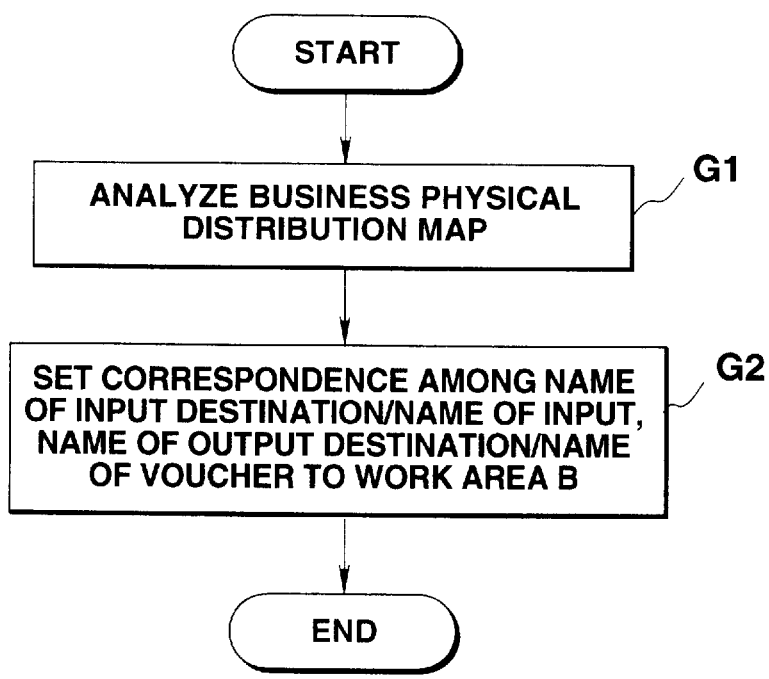
FIG. 20 is a flow chart of an operation which is performed when the business physical distribution map is analyzed.

FIG. 20 is a flow chart showing a process for analyzing the business physical distribution map. The drawing information of the business physical distribution map is accessed be analyzed (step G1). As a result, names of relative departments, which are subjects of inputs, that is, names of other departments and names of other companies are made to be input destination names and the slip names, which are subjects of inputs, are made to be names of inputs in accordance with the flow of slips relative to the own department. The input destination names and the names of inputs are set in the work region B in the RAM. Moreover, names of the relative departments, which are subjects of outputs with respect to the own department, are made to be names of output destinations, and names of slips, which are subjects of outputs, are made to be names of vouchers. Thus, names above are set in the work region B (step G2). As a result, "I/V Slip" corresponding to the "Part Manufacturer" and "Delivery Result Table" corresponding to "Material Section" are stored in the work region B as the names of input destination/input name. Moreover, "Return Slip" corresponding to "Part Manufacturer" and "Stock Entry Slip" corresponding to "Material Section" are, as name of output destination/name of voucher, stored in the work region B.

Figure 21:
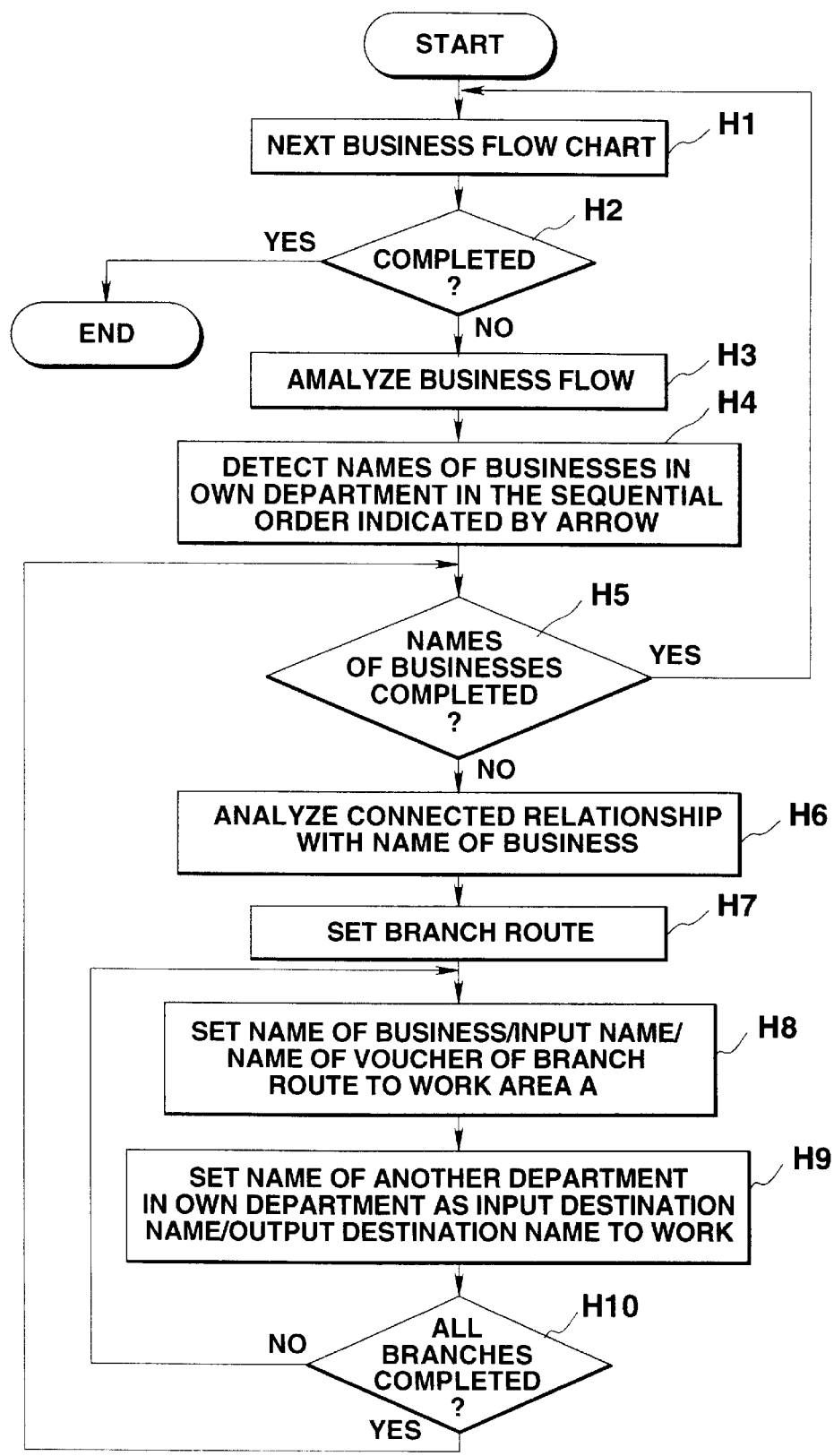
FIG. 21 is a flow chart of an operation which is performed when the business flow map is analyzed.

FIG. 21 is a flow chart showing a process for analyzing the business flow map. Since two types of the business flow maps exist as shown in FIGS. 11 and 15, a business flow map (FIG. 11A) of the Stock Entry Administration Business is first specified (step H1). Then, whether or not all of the business flow maps have been specified is determined (step H2). Since the first business flow map has been specified here, its drawing information is accessed to be analyzed (step H3). Then, one business in the own department is detected in accordance with the flow (in the sequential order of the arrows) (step H4). Then, whether or not all of the businesses in the business flow map have been detected is determined (step H5). Since "Reception Business" has been detected as the first business in the business flow map shown in FIG. 11A, the operation proceeds to step H6 so that the connective relationship (state of branching) with the business is analyzed and the number of branch routes is set (step H7). When the branching to two sections is made, the number of the branched routes is "2". Therefore, the foregoing number is set. Then, the first branched route is specified, and the business name in the specified route is read out so as to be set in the work region C in the RAM. Moreover, the slip name, which is the subject of input in this business is, as input name, made to correspond to the subject business name and set in the work region C. Moreover, the slip name, which is the subject of the output, is made to correspond to the subject business and set to the work region C as name of the voucher (step H8). In this case, correspondence among the business name "Reception Business", input name "I/V Slip" and name of voucher "Receiving Inspection Instruction" is set to the work region C. In a case where slips are transmitted and received between the own department and other departments, name of input destination department/name of output destination department are, as name of input destination/name of output destination, made to correspond to names of the subject businesses and set to the work region C (step H9). In this case, "Quality Control Section" is, as name of the output destination of "Receiving Inspection Instruction" corresponding to the Reception Business work, is set to the work region C. The foregoing processes (steps H8 and H9) are repeated for the number of the branched routes (step H10).

After the process for analyzing one business has been completed, the operation returns to step H4 so that "Quality Inspection Business" is detected as name of a next business. Therefore, correspondence among the business name "Quality Inspection Business", input name "Receiving Inspection Instruction" and name of voucher "Results of Receiving Inspection" is set to the work region C. Moreover, name of output destination "Production Administration Section" is set as name of another department. Then, "Stock Entry Business" is detected as the business name. Since the output is branched into two routes in this case, the process in step H8 is repeated by the number corresponding to the number of the branched routes. As a result, correspondence among the business name "Stock Entry Business", input name "Results of Receiving Inspection", name of the voucher "Return Slip" and name of input destination "Quality Inspection Business Section", which is name of the other department, is set to the work region C. Moreover, correspondence among the business name "Stock Entry Business", input name "Results of Receiving Inspection", name of the voucher "Stock Entry Business" and name of input destination "Quality Inspection Business Section" is set.

When the process for analyzing the business flow map in the Stock Entry Business work has been completed, completion is detected in step H5. Then, the operation returns to step H1 so that a business flow map (FIG. 15) in the next delivery administration is specified. Then, similar processes are repeated.

Figure 22:
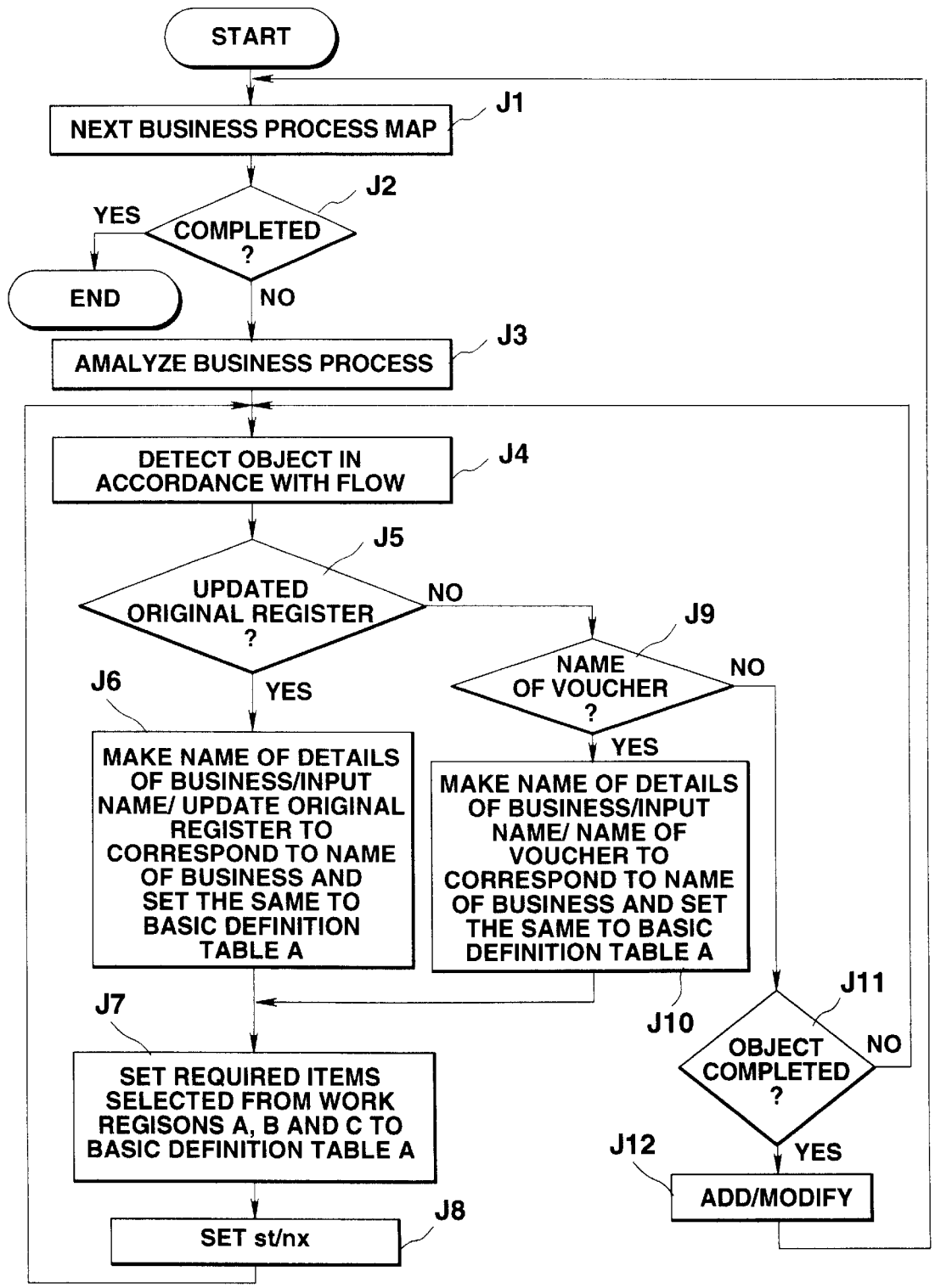
FIG. 22 is a flow chart of an operation which is performed when the business process map is analyzed, and the basic definition table A is generated in accordance with results of analysis of the business role map, the business physical distribution map, the business flow map and the business process map.

FIG. 22 is a flow chart of a process for analyzing the business process map. Since five types of business process maps as shown in FIGS. 12 to 14 and FIGS. 16 and 17 exist, the business process map for "Reception Business" (FIG. 12) is specified in accordance with the flow of the business (step J1). Then, whether or not all of the business process maps have been specified is determined (step J2). Since the first business process map has been specified in this case, its drawing information is accessed to be analyzed (step J3). In accordance with the flow of the business process map, one object (an original register to be update or name of the voucher) is detected (step J4). Since "Order Ledger" is detected as the original register to be updated (step J5), name of details of the business to be input and name of input are detected. Moreover, input name is used to determine whether the document is a slip or an original register so as to determine "Input Classification". Thus, name of details of the business "Input of Reception Business", input name "I/V Slip" and input classification "Slip" are, together with name of the original register "Order Ledger", made to correspond to the business name "Reception Business" to which attention is paid at present to set the same at the position of the leading record in the basic definition table A (step J6). Then, required items are retrieved in the work regions A, B and C corresponding to the business name "Reception Business" to set it to the position of the leading record in the basic definition table A (step J7).

That is, the business names for the respective departments in charge have been set to the work region A, name of the department in charge "Production Administration Section" corresponding to "Reception Business" is read to set the same to the position of the leading record in the basic definition table A. Name of input destination/input name relative to the own department and output destination/name of the voucher are set to the work region B. Moreover, input name/name of the voucher for each business is set to the work region C. Since attention is paid to the original register of the business process map at present, input name "I/V Slip" corresponding to name of the present business "Reception Business" is retrieved from the work region C. Moreover, corresponding name of input destination "Part Manufacturer" is retrieved from the work region B to set name of the input destination to the position of the leading record in the basic definition table A. As a result, the leading record of the basic definition table A is generated, as shown in FIG. 23A to 23E. Thus, "ST/01" is, as procedure code ST/nx, to the basic definition table A (step J8). Note that "ST" is a start code of one business process map and nx "01" is a next code for instructing a next object in the subject business process map.

Then, the operation returns to step J4. In this case, "Ledger of Part Entry" is detected as the original register to be updated. Therefore, name of details of the business is similar to the previous case. Thus, only name of the original register to be updated is set to the position of the next record in the basic definition table A. Moreover, processes in next steps J7 and J8 are skipped. Thus, the contents of the subject record in the basic definition table A are made as shown in FIG. 23A to 23E such that the contents are similar to those of the previous record. In this case, "Name of Department in Charge", "Business Name", "Name of Details of Business", "Name of Input Destination", "Input Name" and "Input Classification" are remained to be blank.

Then, name of the voucher "Instruction of Receiving inspection" is detected (step J9). As a result, name of the details of the business "Printing of Receiving Inspection Instruction" and input name "Part Stock Entry Ledger" are detected to be made correspond to the business name "Reception Business" to which attention is paid at present so as to be set to the position of the next record in the basic definition table A (step J10). Then, whether the document is a slip or an original register is determined in accordance with input name to decide the input classification. In this case, "Original Register" is set to the input classification in the basic definition table A. Then, name of the department in charge "Production Administration Section" corresponding to "Reception Business" is read from the work region A so as to be set to the position of the subject record in the basic definition table A. Since voucher "Receiving Inspection Instruction" is paid attention at present, name of the voucher corresponding to name of the present business "Reception Business" is retrieved from the work region C. In accordance with name of the voucher, the work region B is retrieved. If name of the output destination exists in the work region C as name of another department, name of output destination "Quality Inspection Business Section" is read so as to be set to the position of the subject record in the basic definition table A (step J7). In step J8 procedure code "01/02" is, as procedure code st/nx, to the basic definition table A. Then, the operation returns to step J4.

Since "Stock Entry Business Schedule Table" is detected as name of the next voucher (step J9), name of details of the business "Printing of Stock Entry Schedule Table", input name "Order Ledger" and name of the voucher "Stock Entry Business Schedule Table" are set to the basic definition table A (step J10). Then, name of the department in charge "Production Administration Section" read from the work region A is set to the basic definition table A (step J7). Since name of the output destination corresponding to name of the voucher "Stock Entry Business Schedule Table" is not set to the work region C, name of the output destination is not set. Then, the procedure code st/nx is set. Since it is the final object in this case, final code "ed" indicating end of one business process map is set as "nx".

When completion of the object has been detected in step J11, the operation proceeds to step J12 so that the contents of the basic definition table A may be added/modified by key inputting operation. In this case, predetermined data is input to "Process", "Display/Print" and "Out of Subject" in the basic definition table A by using keys. Note that "Process" indicates the execution cycle for the process. When the process is performed any time, "Any Time" is input and set. When the same is performed daily, "Index" is input and set. If the voucher is printed out, "Print" is input and set to the column "Display/Print". The column "Out of Subject" is a column indicating whether or not the generation of the basic definition table B is out of the subject when the basic definition table B is generated in accordance with the basic definition table A. If the generation is out of the subject, a circle is provided to the subject position. Also the contents of the basic definition table A obtained by analyzing each flow diagram can arbitrarily be changed by the key inputting operation. Then, the operation returns to step J1, "Quality Inspection Business" shown in FIG. 13 is specified as the next business process map. Then, a similar process is repeated. The contents for three records having the business name "Quality Inspection Business" shown in FIG. 23A to 23E are data items obtained by analyzing the subject business process map. When the business process maps shown in FIGS. 14, 16 and 17 have been analyzed, a basic definition table A as shown in FIG. 23A to 23E is completed.

System for Generating Basic Definition Table B

An operation for generating the slip registration card, the original register registration card and the voucher registration card serving as the basic definition table B in accordance with the basic definition table A will now be described with reference to a flow chart shown in FIGS. 24 to 26.

Figure 24:
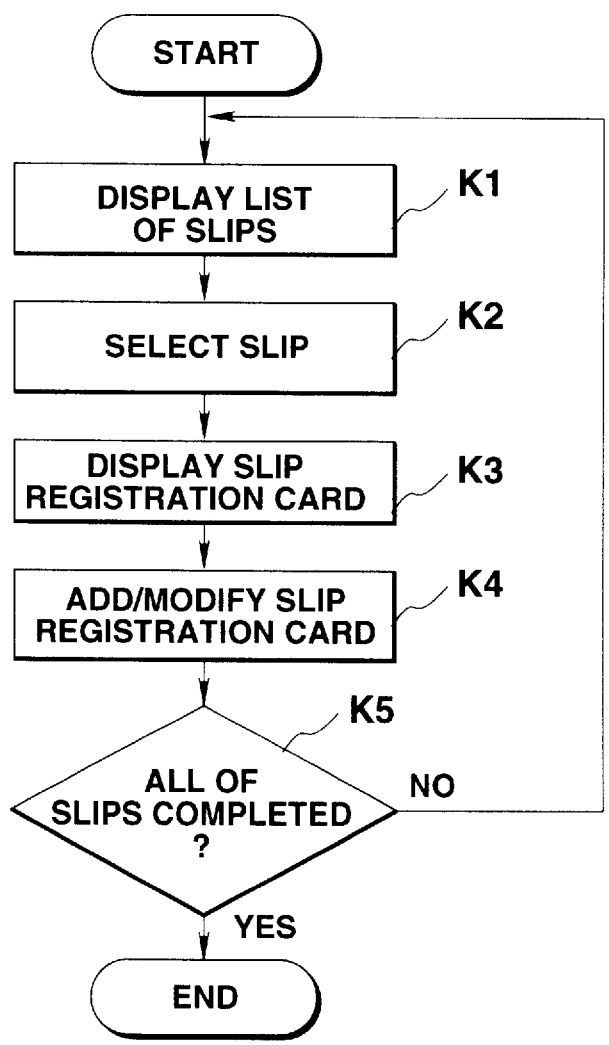
FIG. 24 is a flow chart of an operation which is performed when a slip registration card which is the basic definition table B is generated/modified.

FIG. 24 shows a process for generating the slip registration card. Initially, a reference to "Classification" in the basic definition table A is made. If it is "Slip", the corresponding input name is read to display a list of the slips (step K1). If an arbitrary slip is selected from the displayed list (step K2), the slip registration card is displayed (step K3). Since the window for setting items in the slip has been opened as described above when the business flow map has been generated and thus the item names of the slip and names of the original registers to be updated have been set, they are read so that the item names in the slip and names of the original registers to be updated are set to predetermined positions in the form together with the form of the slip registration card.

FIGS. 27A to 27C show a slip registration card for the I/V slip. As the slip name, "I/V" is set, and "Order Ledger" and "Part Stock Entry Ledger" are set as update destinations. Moreover, "order No., slip No., issue date, organization name, . . . , total sum" are set as items of the slip. By sequentially inputting predetermined items to the space for entry in the "hierarchy", "type", "number of characters", "table name", "definition" and "initial setting", addition/modification of the slip registration card are performed (step K4).

The column "hierarchy" indicates the regions, to which the item is included, the regions being the heading region, the item region and the tailer region on the slip. In a case where the entry region for the "hierarchy" is blank, the item is included in the heading region on the slip. In a case where "I" is written, the item is included in the item region. In a case where the "IT" is written, the item is included in the tailer region. The column "Type" indicates the attribute of the item. For example, "N" indicates numeral data. The column "Number of Characters" indicates the number of digits of the corresponding items. The column "Table Name" indicates name of the index table to which a reference is made when data of the corresponding item is generated. Description "Office tb" indicates that a reference to an index table indicated with table name "Office tb" must be made to perform code/character conversion to generate data for the item. The column "Definition" is a space for writing conditions for generating data item while making a reference to the index table if necessary. For example, "# table (organization code, name)" indicates that data item of the item name (organization code) of the previous line must be used as the key to make a reference to the index table to read name so as to generate the above name as organization name. The column "Initial Setting" is a space for generating data item similar to the column "Definition". For example "#day and time" indicates information about the time measured by the time counting function must be used as issue date.

When the slip registration card has been generated to correspond to the I/V slip, the operation proceeds to step K5. If the process for generating the slip registration card for all of the slips set in the basic definition table A has not been completed, the operation returns to step K1. Then, similar operations are repeated. As a result, the slip registration cards corresponding to "Receiving Inspection Instruction", . . . , "Delivery Result Table" are generated.

Figure 25:
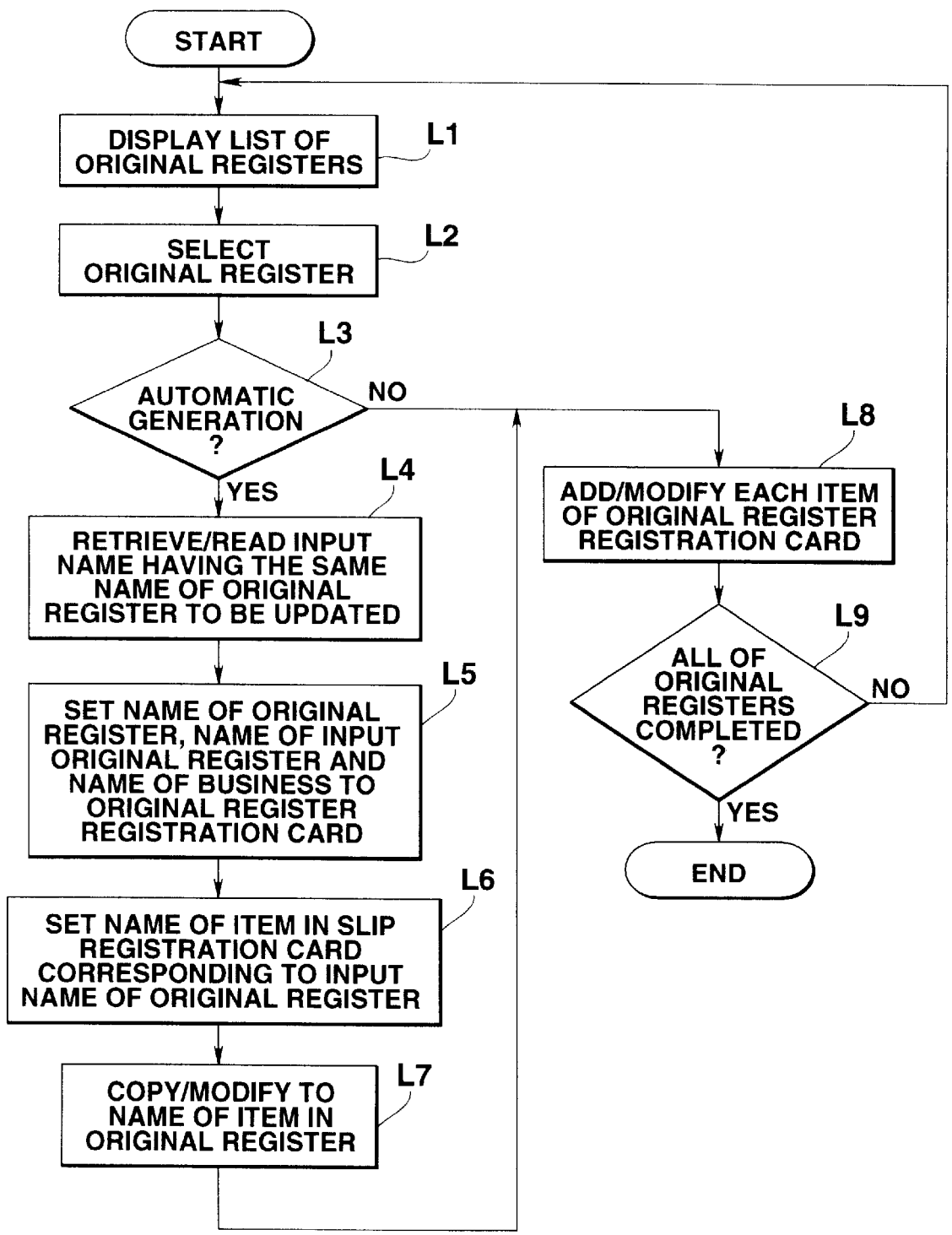
FIG. 25 is a flow chart of an operation which is performed when an original register registration card which is the basic definition table B is generated/modified.

FIG. 25 shows a process for generating the original register registration card. Initially, name of the original register to be updated is read from the column "Original Register Name to be Updated" of the basic definition table A (in a case where a plurality of same names are set, one of the same names is read) to display a list (step L1). Then, an arbitrary name of the original register is selected from the displayed list (step L2). If the automatic generation of the original register registration card has been specified by the key inputting operation (step L3), the operation is shifted to a process in which a reference to the basic definition table A is made to automatically generate a portion of the original register registration card (steps L4 to L7).

That is, in step L4, the basic definition table A is retrieved in accordance with selected name of the original register to be updated so as to read corresponding input name. If "Part Stock Entry Ledger" has been selected as name of the original register to be updated, six types of documents, that is, "I/V Slip", "Receiving Inspection Instruction (Results)", "Results of Receiving Inspection (Return)", "Part Stock Entry Ledger", . . . , are read from the basic definition table A as input names corresponding to the "Part Stock Entry Ledger". In step L5 the selected name of original register to be updated is made to be "Original Register Name" and input name is made to be "Input Original Register Name" so as to be set to the original register registration card of the Part Stock Entry Business Ledger shown in FIGS. 28A to 28C. Moreover, name of details of business corresponding to each of the input name is read from the basic definition table A so as to be set to the original register registration card as "Business Name". Note that six types of names of input original registers, which are set to the original register registration card shown in FIGS. 28A to 28C, include a file name, for example, "Part Stock Entry Ledger", as well as the slip name. In step L6, the slip registration card corresponding to the input original register name is accessed so as to set the item name of the slip as an item of the subject slip of the original register registration card. In this case, the item name of the slip set to the slip registration card may be remained when copied to permit modification of the contents if necessary. However, the contents are displayed as a window to permit selection of the item names of the required items so as to be set to the original register registration card. In a case where name of each item corresponding to name of another input original register is set, only required items may be selected and set from names of items of input original register names which have been set to the original register registration card. In step L7, a process is performed when name of each item is set to correspond to the original register name. In this step, the contents which have been set as names of items of the input original register name are, as it is, copied as the item names of the name of the original register, and then copied, if necessary so that each of the items corresponding to name of the original register is modified.

Then, the operation proceeds to step L8 so that addition/ modification of required items of the original register registration card are performed by key operation.

That is, input of one predetermined item to each of columns "Attribute", "Number of Digits", "Table Name" and "Definition" corresponding to the items of the name of the original register is performed. The "Attribute" indicates the attribute of the corresponding item. For example, "R" indicates right justify and "N" indicates a numeral. The "Number of Digits" indicates the number of digits of the corresponding items. The "Table Name" indicates name of an index table to which a reference is made when data of corresponding item is generated. For example, "Product cd" indicates that a reference to an index table indicated with corresponding table name must be made to perform code/ character conversion so as to generate data of the item. The column "Definition" is a space in which conditions for generating data of the corresponding item are written while making a reference to the index table or the like, if necessary. For example, definition "# the day" corresponding to "Registration Date" indicates that the present date on which the file has been registered must be the registration date.

Predetermined items are input to each column of "Function Name" and "Type of Update" corresponding to each input original register name. The "Function Name" defines whether the subject of the process is a slip and a special process is required if the subject is a file. If the subject of the process is a slip, "Slip" is input to the column of "Function Name". The "Type of Update" indicates the type of update when the record of the film is updated. For example, total of records and addition of a record are input.

When addition/modification of the original register registration card has been completed, the operation proceeds to step L9 so that whether or not a process for generating an original register registration card for all of names of original register to be updated, which have been set to the basic definition table A has been completed is determined. If the process has not been completed, the operation returns to step L1. Then, a similar process is repeated. If the automatic generation is not specified, the operation proceeds to step L8 so that a process for setting the contents of the original register registration card by only the key inputting operation is performed. As described above, the original register registration card is generated for each of names of original registers to be updated, which have been set in the basic definition table A. As a result, the original register registration cards of the "Order Ledger" and "Details of Part" are generated as well as the "Part Stock Entry Ledger".

Figure 26:
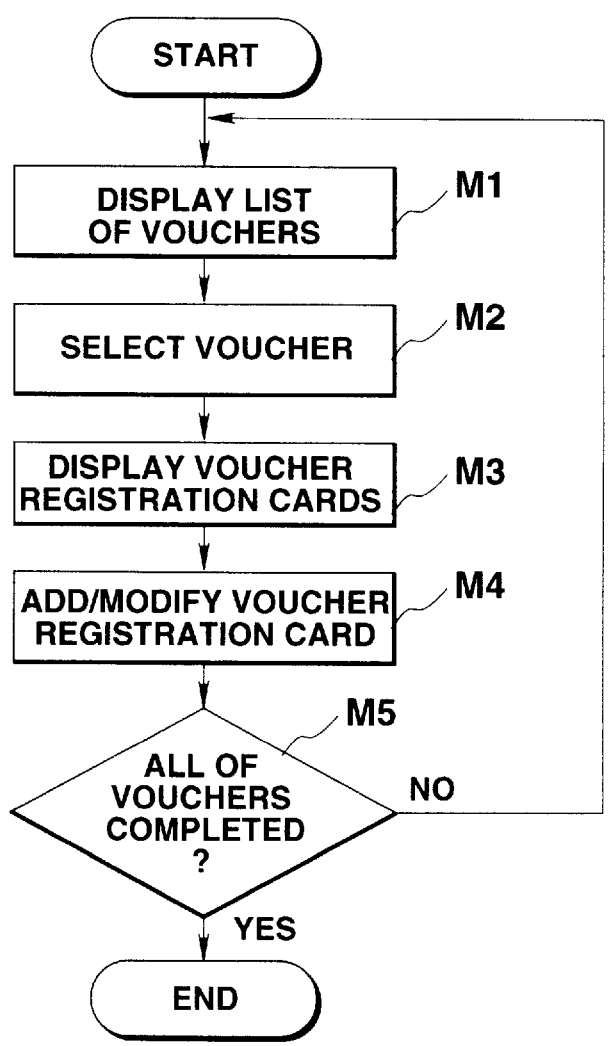
FIG. 26 is a flow chart of an operation which is performed when a voucher registration card which is the basic definition table B is generated/modified.

FIG. 26 shows a process for generating a voucher registration card. Initially, "Voucher Name" is read from the basic definition table A so that a list is displayed (step M1). When an arbitrary name of a voucher is selected from the displayed list (step M2), a predetermined form of the voucher registration card is displayed. Moreover, data of a required item is read from the basic definition table A so as to be set to a predetermined position in the foregoing form (step M3). Then, addition/modification of the contents of the voucher registration card is performed (step M4). In this case, the voucher registration card is generated to be divided into Table A and Table B.

To print out a voucher "Stock Entry Business Result Table" as shown in FIG. 31, the Tables A and B, which are predetermined voucher registration cards in accordance with an output image of the voucher, are used. The voucher shown in FIG. 31 formed such that names of records of the total record (an output record) are located in the form of row items and names of data items of the output record are located in the form of column items. The Table A defined to obtain the foregoing voucher has a configuration as shown in FIG. 29, while the Table B has a configuration as shown in FIG. 30. The Table A is a definition table for defining name of output records for each item and the contents of items which are extracted as output records. The Table B is a definition table for defining names of items which are extracted as data items of output records, output subject items which are extracted as data items to correspond to the item names or format for use when a voucher is printed and accumulation conditions.

That is, arbitrary name is defined in the head line portion in the row direction of Table A to correspond to each accumulation level. Moreover, file names and item names are defined in the Table A. In the Table A shown in FIG. 29, file name "Details of Part" is input. Thus, a subject file name from which an output record must be extracted is defined. To correspond to file the above name, item name "Customer Code" is input. Thus, subject item name which must be extracted as the output record is defined. Moreover, specific contents of the item (the item code) of the subject item of the accumulation are input to each of the matrix input areas formed by head lines in the row and column directions of Table A. As for line No. "03", that is, record name "a" corresponding to the accumulation level C, "101" and "102" are input. As a result, a fact is defined that records corresponding to the item codes "1101" and "1102" among the items of the customer codes forming the detail part file must be extracted.

Name of an item to be printed out as a data item of the output record is input to the head line in the column drawing information of the Table B. For example, "Expenses" is input to the item position "A" and "Plan at Initial Stage of Period" is input to the item position "Business". As print format of data item, the width of the column, font type and font size are input to "Format". Moreover, "Details of Part" are input to "Subject File" to correspond to the column positions of items "B" and "C". Moreover, "Accumulation Item" defines that data item must be accumulated among the records extracted as the subject of the accumulation. In addition, "Equation" defines output units for outputting results of accumulation and equations for use in the accumulation calculations. The "Condition Item" defines items of extracting conditions for further narrowing the extracted record in accordance with the contents of the definition of the Table A.

II. Business Operating System

Figure 32:
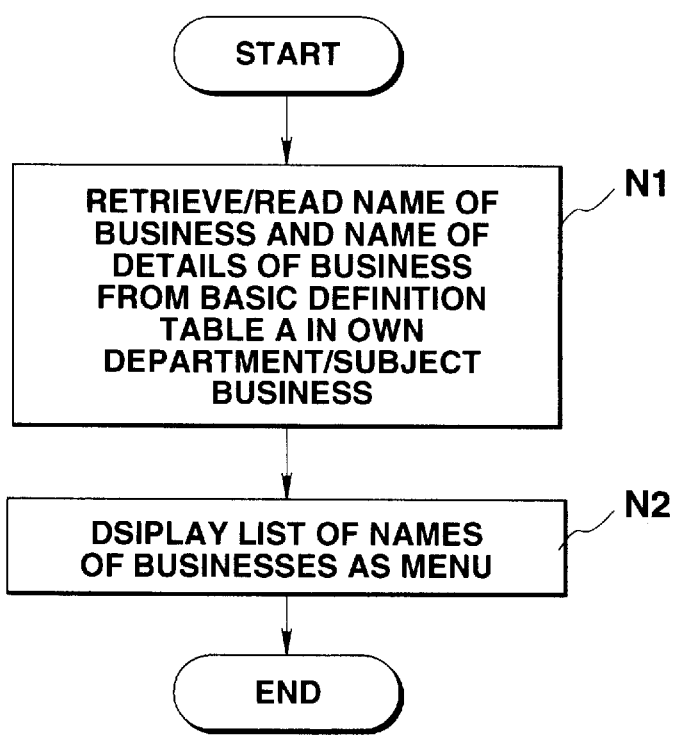
FIG. 32 is a flow chart of an operation which is performed when name of a business is displayed as a menu by a business menu system 12A.

When the business operating system 12 has been started in a state where the slip registration card, the original register registration card and the voucher registration card, which form the basic definition table B, have been generated, the menu display process is performed in accordance with a flow chart shown in FIG. 32.

Business Menu System

Figure 33:
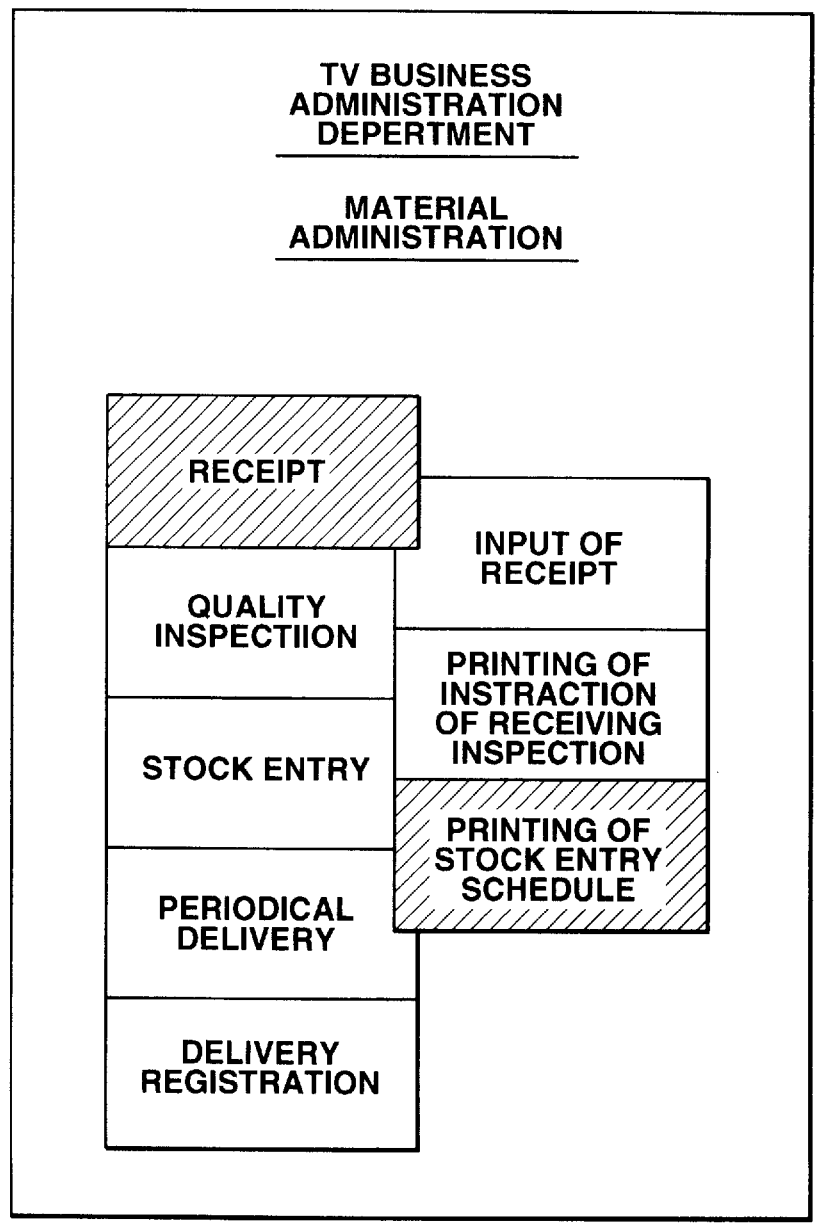
FIG. 33 is a diagram showing a state of display when an arbitrary name of a business is selected on a displayed menu screen of the business names.

When the own department and the subject business have been specified, an access to the corresponding basic definition table A is made so that the business name and name of details of the business are read (step N1). Initial, a list of businesses is displayed. When an arbitrary business name is selected, a list of names of corresponding details of businesses is displayed (step N2). FIG. 33 shows an example of a displayed menu in the foregoing case. Hatched portions indicate the selected business name and the name of the details of the business. In this case, "Reception Business" has been selected as the business name and "Printing of Stock Entry Schedule Table" has been selected as name of the details of the business.

Figure 34:
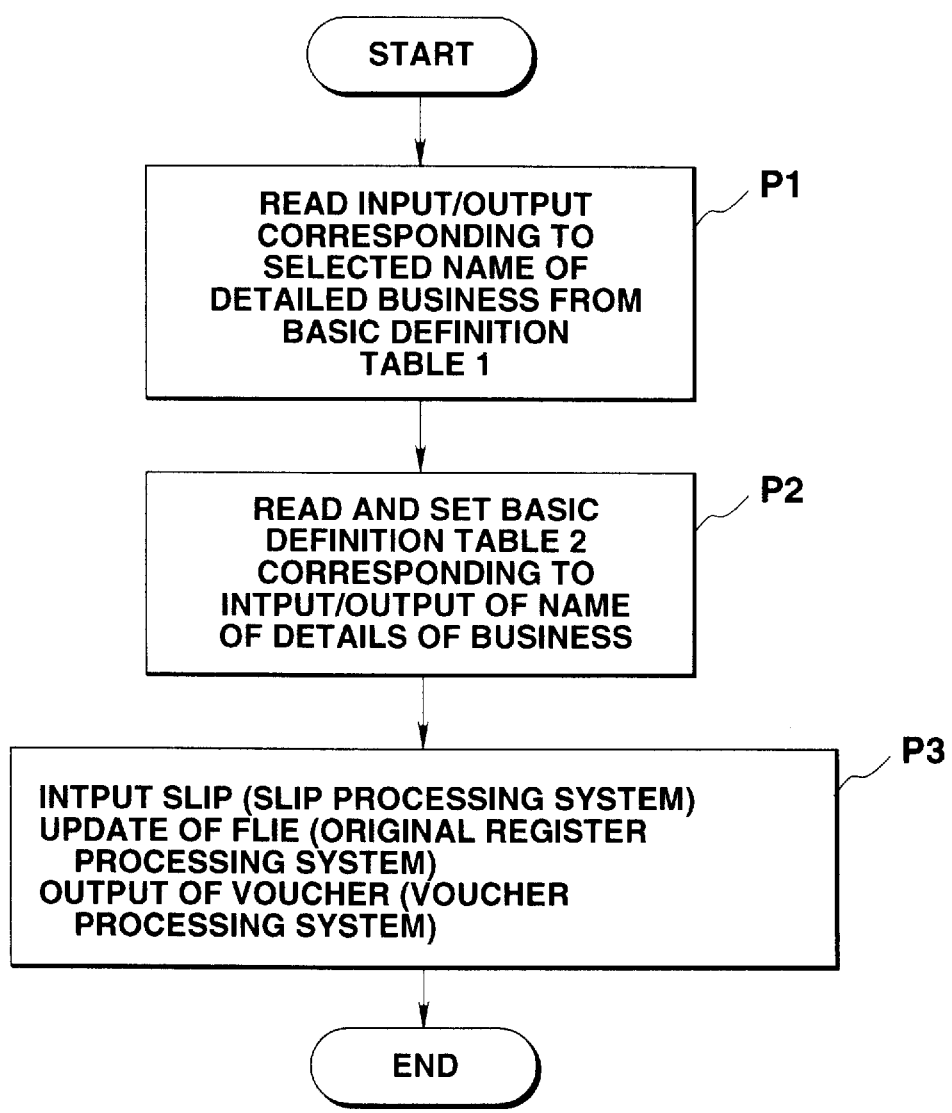
FIG. 34 is a flow chart showing a menu start process for starting a slip processing system 12B-1, an original register processing system 12B-2 and a voucher processing system 12B-3 in accordance with selected the business name.

When name of the details of the business has been selected, the menu start process is performed in accordance with a flow chart shown in FIG. 34.

That is, the input/output subject defined in the basic definition table A is read to correspond to the selected name of the details of the business (step P1). If "Input of Reception Business" is selected as name of the details of the business, "I/V Slip" is read as input name defined in the basic definition table A. Moreover, "Order Ledger" and "Part Stock Entry Ledger" is read as names of original registers to be updated. Thus, a slip registration card corresponding to "I/V Slip" and original register registration cards corresponding to "Order Ledger" and "Part Stock Entry Ledger" are read out from the basic definition table B so as to be set to the corresponding slip processing system 12B-1 and the original register processing system 12B-2 in the process execution system 12B (step P2). As a result, the slip processing system 12B-1 and the original register processing system 12B-1 are started so that the slip input process and the file update process are sequentially performed (step P3). Therefore, the slip input process and the file update process are performed in synchronization with each other.

If printing, for example, "Printing of Receiving Inspection Instruction" is selected as the details of the business, corresponding "Receiving Inspection Instruction" is read as name of voucher defined in the basic definition table A (step P1). Thus, a voucher registration card corresponding to name of the voucher is read from the basic definition table B so as to be set to the voucher processing system 12B-3. Thus, the voucher processing system 12B-3 is started so that the voucher output process is performed. When the printing work has been selected as the details of the business, only the corresponding name of the voucher is read from the basic definition table A.

Slip Processing System

Figure 35:
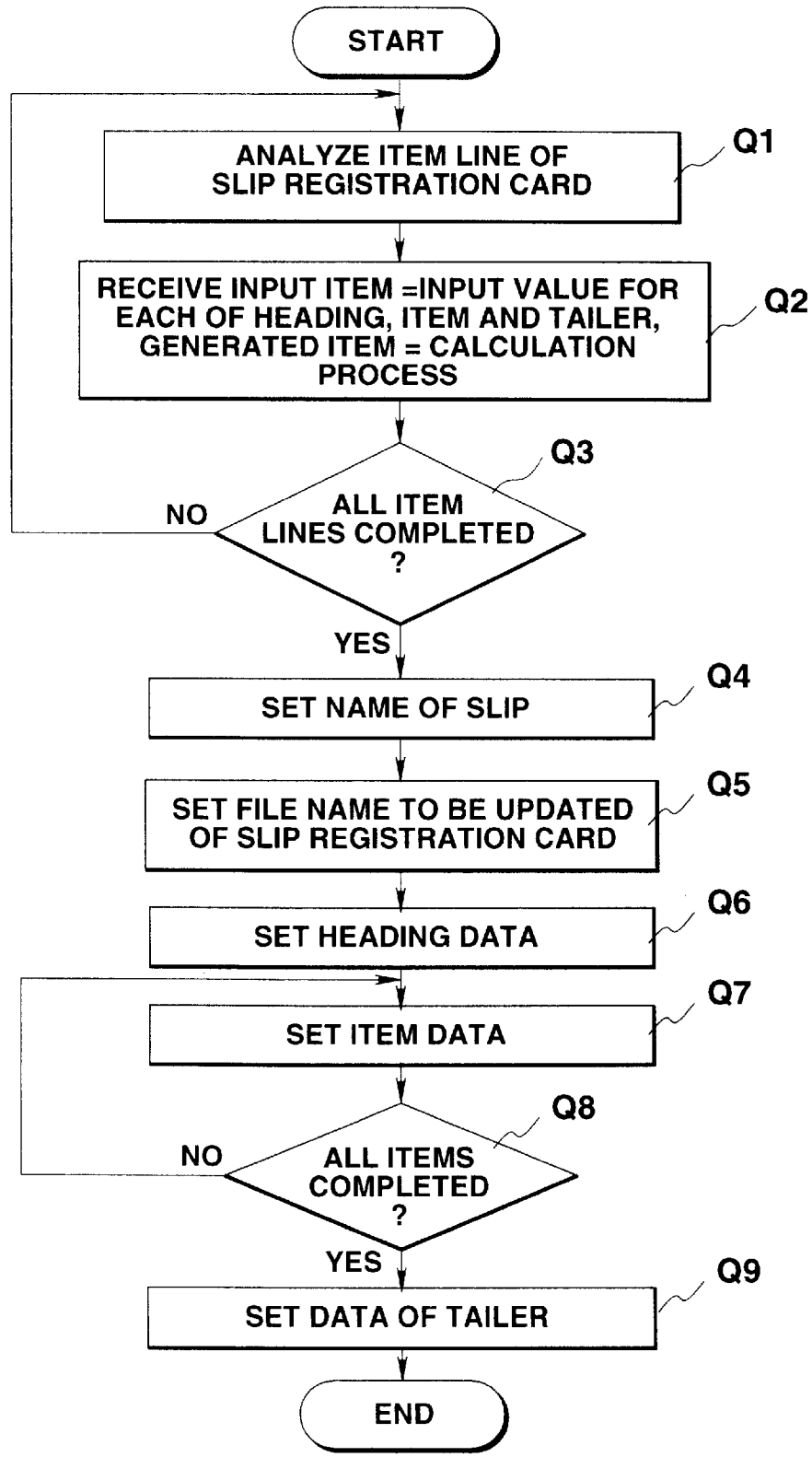
FIG. 35 is a flow chart of a slip input process in the slip processing system 12B-1.

FIG. 35 is a flow chart showing the slip input process. The slip processing system 12B-1 pays attention to the leading end of the item row of the slip registration card to analyze the contents (step Q1). In accordance with the contents of the description of the column "Hierarchy", whether the item row includes the heading region, the item region or the tailer region of the slip is determined. Moreover, whether the subject item row is an item for automatically generating data or an input item is determined in accordance with the contents of the columns "Table Name", "Definition" and "Initial Setting". If the item is the input item, an input value is received for each of the heading, item and tailer regions. If the item is a generating item, a calculation process is performed in accordance with the contents of definition in the slip registration card for each of the heading, item and tailer regions (step Q2). Then, attention is paid to a next item row. The foregoing operation is repeated until all of the item rows have been processed (step Q3).

When the slip input process has been completed, the slip processing system 12B-1 start performing registration card slip record generating process (steps Q4 to Q9). That is, the slip name is read from the slip registration card to set it to the leading end of the slip record and a punctuation code is inserted (step Q4). Then, a name of file to be updated is read from the slip registration card to set it to the slip record (step Q5). If a plurality of name of files to be updated are described in the slip registration card, name of files to be updated are sequentially set while inserting the punctuation code. Then, name of each item of the heading is sequentially read from the leading end of the slip registration card, and then the item name and data item (the input item/data of the generated item) are combined with each other so that each item is, together with the punctuation code, set in the slip record (step Q6). Then, the item name and corresponding data item (input item/data of the generated item) are combined with each other so as to sequentially be set together with the punctuation code in the slip record (steps Q7 and Q8). When data item has been sequentially set from the leading item to the final item, the operation proceeds to step Q9 so that item names of the tailers are sequentially read from the slip registration card. Then, the item names and corresponding data item are combined with each other so as to be set to the slip record together with the punctuation code. As a result, a slip record for one slip is generated. Thus, the slip processing system 12B-1 transfers the generated record to the original register processing system 12B-2.

Original Register Processing System

Figure 36:
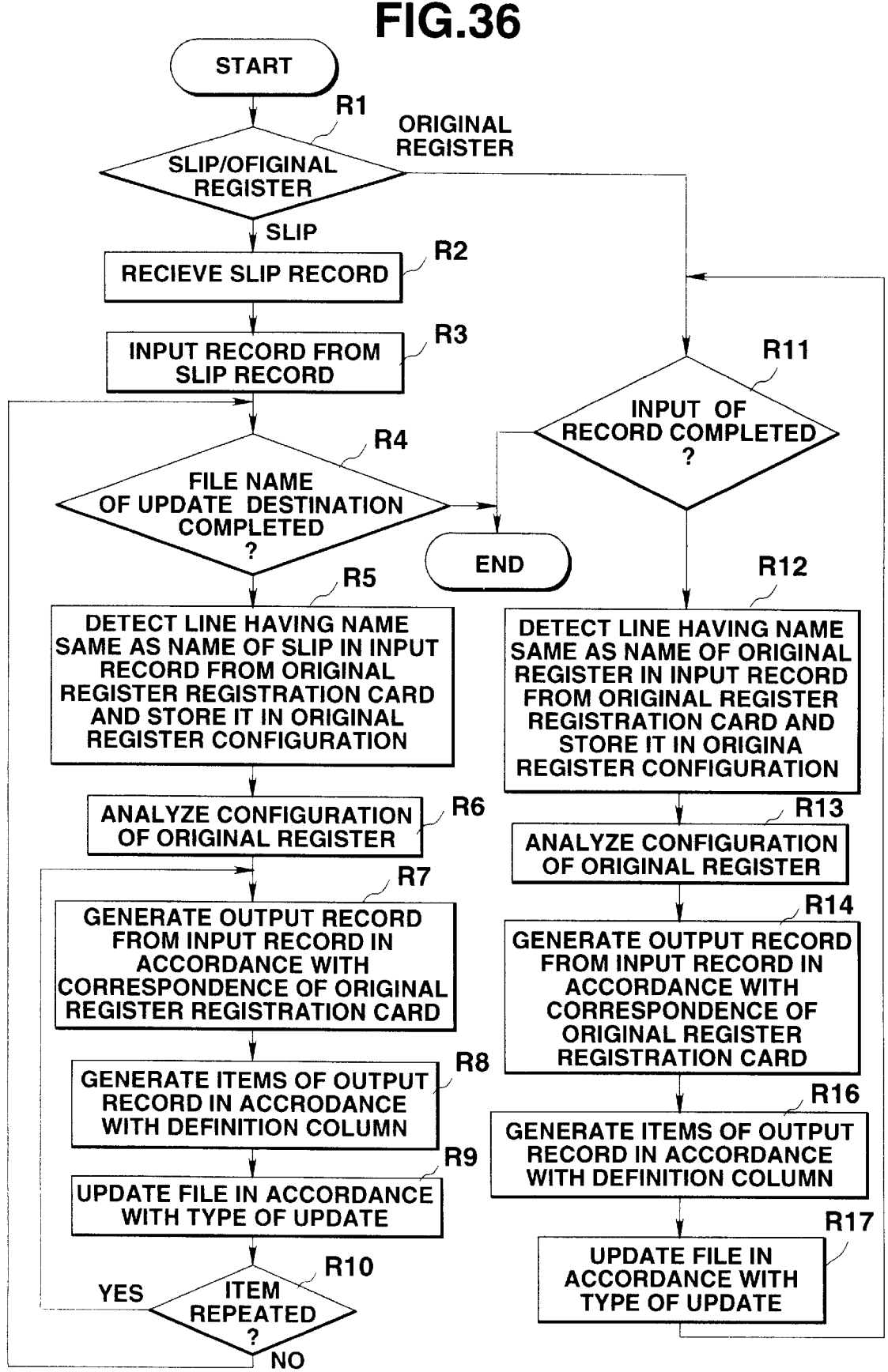
FIG. 36 is a flow chart of a file updating process in the original register processing system 12B-2.

FIG. 36 is a flow chart showing the file updating process. The original register processing system 12B-2 performs the file updating process in accordance with the contents of description in the original register registration card. That is, the original register processing system 12B-2 makes a reference to the input original register names in the original register registration card to determine whether the document is a slip or an original register (step R1). If the document is a slip, a process for updating a file to be updated is performed in accordance with the contents of the description in the original register registration card by using the slip record (steps Q2 and Q10).

That is, the original register processing system 12B-2 receives slip record for one slip transferred from the slip processing system 12B-1 (step R2), converts the recording form of the slip record and obtains an input record (step R3). That is, the slip record consists of "Slip Name", "Name of File to be Updated", following heading data, data item and tailer data, as described above. If data item is repeatedly input for a plurality of lines, data item for the number of lines continuously exist in the slip record. If data item for three items exist and assumptions are made such that heading data is HD, data item for the first line is ID(1), data item for the second line is ID(2), data item for the third line is ID(3) and tailer data is D, the slip record is in the form as "Slip Name, Name of File to be updated, HD, ID(1), HD(2), ID(3) and TD". The slip record formed as described above is converted into a record form as "Slip Name, Name of File to be updated, HD, ID(1), TD, HD, ID(2), TD, HD, ID(3) and TD" to obtain an input record. That is, the record form is converted such that heading data is located in the leading end of each data item for one line and tailer data is located in the trailing end of the same so that the input record is obtained.

Then, the name of the file to be updated in the input record is specified from the leading end, and then whether or not completion of the file name is determined (step R4). Since the name of the first file to be updated is specified, a column of names of input original registers having the same name as that of the slip in the input record is detected from the original register registration card corresponding to the name of the file to be updated to store the contents of the column into an area (not shown) for locating the original registers (step R5). Then, the contents of the area for locating the original registers are analyzed (step R6) to generate an output record from the input record in accordance with the correspondence of the original register registration card. That is, data item corresponding to the slip item name set in the original register registration card is extracted from the input record. In this case, each item in the input record has a data configuration as "item name=data item". By using the item name as the key, data item is extracted. Thus, an output record formed by rearranging each data item extracted from the input record into the order of arrangement of the names of the slip items set in the original register registration card. Then, data of required items is generated in accordance with the contents of description in the definition column of the original register registration card (step R8). Then, the record of the file is updated in accordance with "Type of Update" set to the original register registration card (step R9).

Then, whether or not data item for a plurality of lines is included in the input record, that is, whether or not reception of items exists, is determined (step R10). If data item for three lines is included in the input record as described above, the record is in the form as "HD, ID(1), TD, HD, ID(2), TD, HD, ID(3) and TD". In such a case, an output record is generated to correspond to the first portion "HD, ID(1) and TD" to update the file. Then, repetition of the items is detected in step R10 so that the operation returns to step R7 so that an output record is generated to correspond to "HD, ID(2) and TD" in the input record and thus the file is updated. Then, the operation returns to step R7 so that the output record is generated to correspond to "HD, ID(3) and TD" in the input record so that the file is updated. Since no repetition of the items is detected in step R10, the operation returns to step R4 so that name of the next file to be updated in the input record is specified to determine whether or not file name is ended. If a next file to be updated exists in the input record, steps R5 to R10 are performed.

If a determination is performed in step R1 that the document is an original register, an update process from an original register to an original register is performed (steps R11 to R17). That is, the original register name is, in addition to the slip name, sometimes set to the input original register name of the original register registration card. In such a case, steps R11 to R17 are performed, and an access to a file indicated with name of the original register is made to sequentially extract records from the above mentioned file (step R11). Then, the file updating process is performed (steps R13 to R17) until the record is ended (step R12). Since the file updating process (steps R13 to R17) are basically the same as those in steps R5 to R9, its description is omitted here.

As described above, the slip registration card is previous set to the slip processing system 12B-1, and the original register registration card is set to the original register processing system 12B-2. When data item has been input to correspond to the slip item name set to the slip registration card in the foregoing state, the slip processing system 12B-1, for one slip unit, generates a slip record which includes the slip item name and input data item to transfer it to the original register processing system 12B-2. Therefore, the original register processing system 12B-2 makes an access to an original register registration card corresponding to name of the file to be updated in the slip record so as to extract data item corresponding to the slip item name from the slip record. That is, the slip record includes the item name for each item, reference made to the item name and the slip item name of the original register registration card enables data item corresponding to the slip item name set in the original register registration card to be extracted from the slip record. Since the item name and the slip item name are made to correspond to each other in the original register registration card to correspond to the configuration of the record of the file to be updated, a record corresponding to the configuration of the record of the file to be updated can be generated in accordance with data item extracted from the slip record. In accordance with the generated record, the record of the file can be updated.

Voucher Processing System

Figure 37:
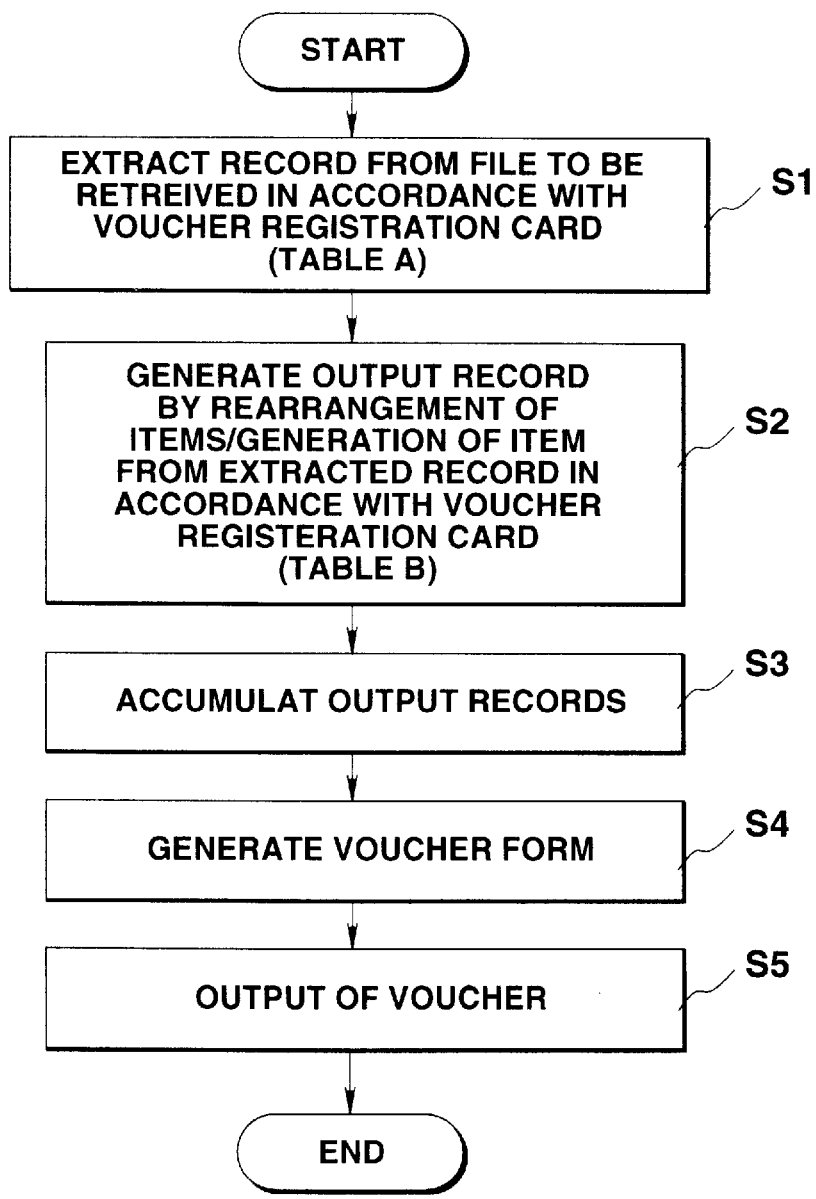
FIG. 37 is a flow chart of a voucher output process in the voucher processing system 12B-3.

FIG. 37 is a flow chart of the voucher output process. The voucher processing system 12B-3 performs the voucher output process in accordance with the voucher registration card. That is, the voucher processing system 12B-3 extracts a record from a file to be retrieved in accordance with the voucher registration card (Table A) (step S1). In this case, "Fine Name" defined in the Table A is used to instruct the file to be retrieved. Moreover, the record is extracted in accordance with name and contents of the item of the subject which have been defined in the Table A and from which the record must be extracted. In the example shown in FIG. 29, only records having the contents of the customer code of "101" and "102" are extracted from the part detail file. Then, records are extracted for each record name defined in the Table A to correspond to the accumulation level.

Then, an output record is generated in accordance with the voucher registration card (the Table B) (step S2). Moreover, the output records are accumulated (step S3). That is, references to "Conditions" and "Condition Values" included in the various records extracted from the files to be retrieved in accordance with the Table A and defined in the Table B to retrieve the subject record. In accordance with the contents defined in the Table B, rearrangement/generation of items is performed to generate the output record. Moreover, a determination is performed that data item in the output record must be accumulated in accordance with "Accumulation Item" defined in the Table B to accumulate the contents of the subject item. At this time, the calculation process is performed in accordance with the output unit and "Equation" in the Table B for defining the accumulation calculation when the results of the accumulation are output.

Then, the voucher form is generated (step S4) so that the voucher is output (step S5). At this time, the items defined in the Table B are located at the corresponding positions in the voucher form. Moreover, a voucher form having a hierarchy configuration corresponding to the accumulation level defined in the Table A is generated so that the output record name is located. Then, the contents of the output record, together with the voucher form, are sequentially printed out so that a voucher as shown in FIG. 31 is obtained.

When printing is specified as the detailed work in the state where the Tables A and B, which are voucher registration cards, have been set, the voucher processing system 12B-3 reads the contents of a predetermined record item from the subject file in accordance with the contents defined in the Tables A and B to accumulate the contents. Moreover, the voucher processing system 12B-3 prints out results of the accumulation in a hierarchy configuration having the arranging order of the defined contents and corresponding to the accumulation level. Therefore, a voucher required by a person in charge can be obtained.

As described above, the data processing apparatus having the above-mentioned configuration enables an ordinary person in charge to easily construct or modify a business processing system only by making a flow diagram indicating the flow of the business to be adaptable to the contents of the business of the department to which the person in charge belongs if the person in charge understands the business system and slips and vouchers which are daily used without a necessity of requesting a system engineer having exclusive knowledge about programming to design the business processing system. Thus, a required business process can be performed.

That is, the person in charge makes and draws a flow diagram (the business role map, the business physical distribution map, the business flow map and the business process map) indicating the flow of the business in accordance with the slips which are used in the own department. Thus, the business constructing system 11 analyzes the flow diagram to generate the basic definition table A. Moreover, the business constructing system 11, from the basic definition table A, generates the slip registration card, the original register registration card and the voucher registration card as the basic definition table B. In the state where the slip registration card, the original register registration card and the voucher registration card have been generated, the business operating system 12 performs the slip input process in accordance with the slip registration card, the file updating process in accordance with the original register registration card and the voucher output process in accordance with the voucher registration card. Since the system for performing the slip input process, the file updating process and the voucher output process can be designed in accordance with the flow diagram made by the person in charge, a business processing system intended by the person in charge can be constructed.

In this case, the person in charge is required to simply select icons graphically indicating names, related slips/files and to input ruler lines for connecting the businesses if necessary to make the flow diagram. Therefore, the flow diagram which can easily be visually recognized can be created.

If the contents of the business is required to be changed, the flow diagram is output as document to change a portion of the flow diagram. Thus, the basic definition table A is changed, and the slip registration card, the original register registration card and the voucher registration card are changed. Therefore, the business processing system can be improved by partially changing the flow diagram. Since a portion, which must be modified can easily be confirmed by simply looking the document-output flow diagram, the modifying operation can efficiently be performed.

Since the construction and modification of the business processing system can completely be performed by the person in charge of the business, a precise and flexible configuration can be designed as compared with the case where the same is required to be designed by a system engineer. Moreover, system maintenance and cost reduction can advantageously be realized.

When the flow diagram is made, the business configuration of the own department can be formed into a hierarchy configuration formed in a descending order. That is, the business role map indicates roles of the business, which is performed by the departments belong to the own department, the business physical distribution map indicates the flow of slips between the own department and relative departments, the business flow map indicates the flow of slips in the own department, and the business process map indicates the specific flow of each business. Therefore, the business configuration can be expressed in the hierarchy form by the flow diagrams. Therefore, the flow diagram can significantly easily be made. When the contents of the flow diagram are output as a document form, the overall business of the own department can easily be understood.

Since the works are connected to one another in accordance with the flow of the operation, a system for organically connecting the works to one another can be constructed in place of the individual and independent system.

Although the foregoing embodiment has the configuration such that four types of flow diagrams (the business role map, the business physical distribution map, the business flow map, and the business process map) are made, the business role map and the business physical distribution map may be omitted. That is, the business role map and the business physical distribution map are used in order to facilitate the person in charge to understand the overall business. After the two types of the flow diagram have been made, the person in charge makes the business flow map and the business process map. Thus, the person in charge is able to easily understand the overall business when each flow diagram is output as a document to confirm the contents of the flow diagrams. In this case, only the business flow map and the business process map are analyzed when the basic definition table A is generated. As a matter of course, the business flow map and the business process map may be indicated by one flow diagram. Although the basic definition table A has been described as one table, it may be sectioned into a plurality of pieces if the items are made to correspond to one another. Moreover, another form may be employed.

Although the flow diagram is made such that the business names, the slip names, names of the original registers, names of the vouchers and icons graphically indicating the foregoing elements are located to enable the elements to be smoothly (visually) determined, other information items may be disposed in place of the above-mentioned configuration if the items correspond to the predetermined businesses, slips, original registers and vouchers.

The slip registration card, the original register registration card and the voucher registration card may be displayed/printed. Although the voucher registration card is divided into Tables A and B, it may be in the form of one registration card. The slip registration card and the original register registration card may be in the form of one registration card.

The above-mentioned processes may be performed by exclusive slip input unit, a file updating unit and a voucher output unit in place of the stand alone type configuration in which the slip input process, the file updating process and the voucher output process are performed by one data processing apparatus. In this case, a network is formed among the units to transfer data or wireless communication, optical communication, or a recording medium, such as a magnetic disc or an optical disc may be employed to communicate data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A data processing method comprising the following steps of:

drawing a business flow diagram for a predetermined department by disposing slips/files in accordance with a flow of businesses in the predetermined department, the slips/files being selected in accordance with the predetermined department;

analyzing the business flow diagram to make slips/files which are input in each business and slips/files which are output in each business to correspond to one another in each business so as to make a basic definition table including the contents to be processed with each of the slips/files; and performing a data processing operation in response to an instruction to perform the business based on the contents of the slips/files which are set in the basic definition table corresponding to the business.

2. A data processing method according to claim 1, in which said business flow diagram drawing step comprises the following substeps of:

dividing the business into a plurality of hierarchies;

drawing a business flow diagram for each of the hierarchies of the business; and modifying the contents of said basic definition table in accordance with any modification of said business flow diagram in each hierarchy and redrawing a business flow diagram for each of the hierarchies in accordance with a modification of said basic definition table so that consistency is established among the business flow diagrams in the respective hierarchies.

3. A data processing method comprising the following steps of:

drawing a business flow diagram for a predetermined department by disposing slips/files in accordance with a flow of businesses in the predetermined department, the slips/files being selected in accordance with the predetermined department;

analyzing said business flow diagram to make a basic definition table indicating a correspondence between the slips/files of a related business and the contents to be processed;

reading and specifying, from said basic definition table, the contents to be processed for the slips/files in accordance an instruction to perform each business; and performing a data processing of the slips/files in accordance with the specified contents to be performed in said basic definition table.

4. A data processing method comprising the following steps of:

making a first basic definition table in which slips/files which are input or output in each business are set to correspond to each business which is performed in a predetermined department;

making a second basic definition table in which the contents to be processed are set to correspond to the slips/files which are defined in said first basic definition table for each business;

reading and specifying slips/files corresponding to said business from said first basic definition table and the contents to be processed which correspond to the slips/files read from said second basic definition table, in response to an instruction to perform a business; and performing a data processing of the slips/files in accordance with the specified contents to be processed in said second basic definition table.

5. A data processing method according to claim 4, in which said first basis definition table making step comprises the following substeps of:

drawing a business flow diagram expressing the flow of each business which is performed in a predetermined department together with related slips/files; and analyzing said business flow diagram to make said first basic definition table by making the slips/files to correspond to the businesses.

6. A data processing method comprising the following steps of:

defining a business flow diagram in which slips relating to businesses are located in accordance with the flow of each business which is performed in a predetermined department;

defining a slip registration card in which an item in the slip and a name of a file to be updated are located corresponding to said slip;

extracting, from said business flow diagram, a slip which is used as data which must be input in each business; and making an original register registration card in which correspondence among item names in said slip registration card corresponding to the slip and the item name in a file which is to be updated is set.

7. A data processing method according to claim 6, further comprising the following steps of:

making a slip record in which the item name in the slip and item data corresponding to the item name in the slip are included in one record when item data has been input corresponding to an item name of the slip defined in said slip registration card; and making reference to the item name in the slip record and the item name in a file defined in said original register registration card and to be updated to make a record which corresponds to the record configuration of the file; and performing updating the record of the file in accordance with the record which corresponds to the record configuration of the file.

8. A data processing method comprising the following steps of:

making a basic definition table in which a name of a slip/file to be updated relating to each business which is performed in a predetermined department are set;

defining a slip registration card in which an item name and a name of a slip/file to be updated are set corresponding to related business corresponding to the slip name in said basic definition table; and making an original register registration card in which correspondence between an item name in the slip and an item name in the file defined in said slip registration card is set corresponding to the related business corresponding to the file name in said basic definition table.

9. A data processing method according to claim 8, further comprising the following steps of:

making a slip record in which the item name in the slip and item data corresponding to the item name in the slip are included in one record when item data has been input corresponding to an item name of the slip defined in said slip registration card; and making reference to the item name in the slip record and the item name in a file defined in said original register registration card and to be updated to make a record which corresponds to the record configuration of the file; and performing updating the record of the file in accordance with the record which corresponds to the record configuration of the file.

10. A data processing method comprising the following steps of:

defining a business flow diagram in which input files/files to be updated are disposed corresponding to each business which is performed in a predetermined department;

defining an original register registration card in which correspondence between each item of the file to be updated and each item in the input file and type of updating is set corresponding to the business; and reading each record of the input file defined in said original register registration card corresponding to the business in response to an instruction to perform the business, and making a record of the file to be updated and performing updating in accordance with the type of updating.

11. A data processing method comprising the following steps of:

locating a voucher to be output in accordance with the flow of the business and corresponding to each business which is performed in a predetermined department;

defining a voucher registration card in which a name of a file to be extracted and a record to be processed and extracted are located to make the voucher corresponding to the business;

reading a record from a file indicated by a name of a file to be extracted and defined in said voucher registration card corresponding to the business in response to an instruction to perform the business and performing a process for extracting and processing the record.

12. A data processing method comprising the following steps of:

defining a business flow diagram in which slips relating businesses are located in accordance with the flow of the business which are performed in a predetermined department;

defining slip information in which an item name in the slip and a name of file to be updated are set corresponding to the slip defined in each business in said business flow diagram;

defining original register information provided corresponding to the file to be updated and including correspondence between a name of each item in the slip and a name of each item in the file in accordance with the defined information of the slip;

inputting slip record data in response to an instruction to perform the business and in accordance with a name of each item in the slip defined in the slip information corresponding to the business; and making a name of each item of input slip record data corresponding to a name of each item defined in original register information to perform a process for updating slip record data to a file indicated by a name of the defined original register to be updated.

13. A data processing method drawing a business role map comprising the following steps of:

arranging names of divisions/sections belong to a predetermined department in a hierarchy configuration;

arranging name of businesses classified into hierarchies in accordance with slips which are used in each division/section;

arranging correspondence information indicating correspondence between the arranged names of the division/section and the names of businesses; and indicating correspondence between each division/section and each business in the specified department.

14. A data processing method according to claim 13, in which correspondence information includes information indicating the flow of the business in each department.

15. A data processing method drawing a physical business distribution map comprising the following steps of:

arranging name of a predetermined department and names of related departments which transmit/receive slips to and from the predetermined department;

connecting, with lines, the arranged departments among which slips are transmitted/received;

arranging slips, which are transmitted/received among the departments, adjacent to the connecting lines; and indicating transmitting/receiving of the slips among the departments relative to the predetermined department.

16. A data processing method drawing a business flow map comprising the following steps of:

arranging a name of businesses and slips of a predetermined department, the businesses being classified in accordance with the slips which are used in the predetermined department;

connecting the names of businesses and slips in each department with lines in accordance with the flow of the business; and indicating the businesses which are performed in the predetermined department relative to the flow of the business and the slip.

17. A data processing method drawing a business process map comprising the following steps of:

fining businesses, which are performed by a predetermined department, in accordance with actual operation and arranging names of a sequence of the fined businesses as detailed business;

connecting the names of the detailed businesses and slips/files which are input/output in the detailed business in accordance with the flow of the detailed business; and indicating the flow of the sequential detailed businesses for each business which is performed by the department belonging to the predetermined department.

18. A data processing method comprising the following steps of:

classifying objects including a business name and a slip which is processed and used in a predetermined department, into objects in said predetermined department and objects out of said predetermined department and arranging the slip while making the slip corresponding to a business;

connecting the arranged objects with lines in accordance with the flow of the slip in each business; and making a business flow diagram on the basis of the flow of the slips.

19. A data processing method according to claim 18, in which said business flow diagram is output as a document for each predetermined department to make the business flow diagram.

20. A data processing apparatus comprising:

means for drawing a business flow diagram for a predetermined department by disposing slips/files in accordance with a flow of businesses in the predetermined department, the slips/files being selected in accordance with the predetermined department;

means for making a basic definition table in which slips/files which are input and output in each business are made to correspond for each business by analyzing said business flow diagram and the contents of each of the slips/files to be processed are set; and means for performing a data processing operation in response to an instruction to perform the business in accordance with the contents to be processed with the slips/files which have been set in said basic definition table corresponding to said business.

21. A data processing apparatus comprising:

means for making a first basic definition table in which slips/files which are input and output in each business are set corresponding to each business which is performed in a predetermined department;

means for making a second basic definition table in which the contents to be processed are set corresponding to the slips/files which are defined in said first basic definition table for each business;

means for in response to an instruction to perform a business, reading slips/files corresponding to said business from said first basic definition table and reading the contents to be processed which correspond to the read slips/files from said second basic definition table and specifying the contents to be processed; and means for performing a data processing of the slips/files in accordance with the specified contents to be processed in said second basic definition table.

22. A data processing apparatus comprising:

means for defining a business flow diagram in which slips relating to businesses are located in accordance with a flow of each business which is performed in a predetermined department;

means for defining a slip registration card in which an item name in the slip and a name of a file to be updated are located corresponding to said slip;

means for extracting, from said business flow diagram, a slip which is used as data which must be input in each business and making an original register registration card in which correspondence among an item name in said slip registration card corresponding to the slip and an item name in a file which is a subject to be updated is set;

means for making a slip record in which the item name in the slip and data supplied corresponding to the item name in the slip are included in one record when data has been supplied corresponding to an item name of the slip defined in said slip registration card; and means for making references to the item name in the slip record and the item name in a file defined in said original register registration card and to be updated to make a record which corresponds to the record configuration of the file so as to update the record of the file in accordance with the record which corresponds to the record configuration of the file.

23. A computer program product for operating a computer, said computer program product comprising:

a computer readable medium;

first program instruction means for drawing a business flow diagram for each business which is performed in a predetermined department, said business flow diagram including related slips/files arranged in accordance with a flow of the business;

second program instructing means for making a basic definition table in which slips/files which are input and output in each business are made to correspond for each business by analyzing said business flow diagram and the contents of each of the slips/files to be processed are set; and third program instructing means for performing a data processing operation in response to an instruction to perform the business in accordance with the contents to be processed with the slips/files which have been set in said basic definition table corresponding to said business; and wherein each of said program instructing means is recorded on said medium in executable form and is loadable into a computer memory for execution by the computer.

24. A computer program product for operating a computer, said computer program product comprising:

a computer readable medium;

first program instructing means for making a first basic definition table in which slips/files which are input and output in each business are set corresponding to each business which is performed in a predetermined department;

second program instructing means for making a second basic definition table in which the contents to be processed are set corresponding to the slips/files which are defined in said first basic definition table for each business;

third program instructing means for, in response to an instruction to perform a business, reading slips/files corresponding to said business from said first basic definition table and reading the contents to be processed which correspond to the read slips/files from said second basic definition table and specifying the contents to be processed; and fourth program instructing means for performing a data processing of the slips/files in accordance with the specified contents to be processed in said second basic definition table; and wherein each of said program instructing means is recorded on said medium in executable form and is loadable into a computer memory for execution by the computer.

25. A computer program product for operating a computer, said computer program product comprising:

a computer readable medium;

first program instructing means for defining a business flow diagram in which slips relating to businesses are located in accordance with a flow of each business which is performed in a predetermined department;

second program instructing means for defining a slip registration card in which an item name in the slip and a name of a file to be updated are located corresponding to said slip;

third program instructing means for extracting, from said business flow diagram, a slip which is used as data which must be input in each business and making an original register registration card in which correspondence among an item name in said slip registration card corresponding to the slip and an item name in a file which is a subject to be updated is set;

fourth program instructing means for making a slip record in which the item name in the slip and data supplied corresponding to the item name in the slip are included in one record when data has been supplied corresponding to an item name of the slip defined in said slip registration card; and fifth program instructing means for making references to the item name in the slip record and the item name in a file defined in said original register registration card and to be updated to make a record which corresponds to the record configuration of the file so as to update the record of the file in accordance with the record which corresponds to the record configuration of the file; and wherein each of said program instructing means is recorded on said medium in executable form and is loadable into a computer memory for execution by the computer.

* * * * *